United States Patent
Celli et al.

(10) Patent No.: US 10,834,937 B2
(45) Date of Patent: Nov. 17, 2020

(54) METHODS FOR PREPARING BIOMATERIALS IN THE ABSENCE OF ATMOSPHERIC OXYGEN

(71) Applicant: The Whole Coffee Company, LLC, Miami, FL (US)

(72) Inventors: Giovana Bonat Celli, Miami, FL (US); Luiz Fernando Ribeiro de Miranda, North Miami Beach, FL (US)

(73) Assignee: THE WHOLE COFFEE COMPANY, LLC, Miami, FL (US)

( * ) Notice: Subject to any disclaimer, the term of this patent is extended or adjusted under 35 U.S.C. 154(b) by 0 days.

(21) Appl. No.: 16/687,673

(22) Filed: Nov. 18, 2019

(65) Prior Publication Data

US 2020/0154727 A1  May 21, 2020

Related U.S. Application Data

(60) Provisional application No. 62/768,604, filed on Nov. 16, 2018, provisional application No. 62/779,100, filed on Dec. 13, 2018, provisional application No. 62/881,690, filed on Aug. 1, 2019.

(51) Int. Cl.
*A23F 5/02* (2006.01)
*A23F 5/04* (2006.01)
*A23F 5/24* (2006.01)

(52) U.S. Cl.
CPC .............. *A23F 5/043* (2013.01); *A23F 5/02* (2013.01); *A23F 5/243* (2013.01)

(58) Field of Classification Search
CPC ............. A23F 5/02; A23F 5/043; A23F 5/243
See application file for complete search history.

(56) References Cited

U.S. PATENT DOCUMENTS

| | | | | |
|---|---|---|---|---|
| 3,261,689 A | * | 7/1966 | Ponzoni | A23F 5/405 426/310 |
| 3,406,074 A | * | 10/1968 | Klein | A23F 5/486 426/478 |
| 3,535,119 A | * | 10/1970 | Herrera | A23F 5/486 426/651 |
| 4,591,508 A | | 5/1986 | Pultinas | |
| 5,399,368 A | * | 3/1995 | Garwood | A23F 5/486 426/307 |

(Continued)

FOREIGN PATENT DOCUMENTS

| WO | 199909587 A1 | 8/1999 |
|---|---|---|
| WO | 2016102335 A1 | 6/2016 |

OTHER PUBLICATIONS

International Search Report and Written Opinion dated Jul. 1, 2016 for International Pat. Appl. No. PCT/US16/025628.

(Continued)

*Primary Examiner* — Anthony J Weier
(74) *Attorney, Agent, or Firm* — Morris, Manning & Martin, LLP; Bryan D. Stewart; Adam J. Thompson

(57) ABSTRACT

Aspects of the present invention generally relate to systems and methods for processing biomaterials in the absence of atmospheric oxygen and products resulting from such processes. Such processing techniques may dramatically increase the shelf-life expectancies of roasted and milled biomaterial products when the roasted and milled biomaterial products are not exposed to oxygen during processing.

20 Claims, 12 Drawing Sheets

(56) References Cited

U.S. PATENT DOCUMENTS

| | | | |
|---|---|---|---|
| 5,496,574 A * | 3/1996 | Rushmore | A23F 5/46 426/285 |
| 5,580,593 A * | 12/1996 | Liu | A23F 5/48 426/594 |
| 5,750,178 A * | 5/1998 | Cheng | A23F 5/48 426/388 |
| 6,177,119 B1 * | 1/2001 | Zeller | A23F 5/34 426/471 |
| 7,713,565 B2 | 5/2010 | Zeller et al. | |
| 9,314,042 B2 | 4/2016 | Abaurre | |
| 2002/0119235 A1 * | 8/2002 | Zeller | A23F 5/40 426/594 |
| 2002/0127302 A1 * | 9/2002 | Zeller | A23F 3/405 426/89 |
| 2003/0091696 A1 * | 5/2003 | Panesar | A23F 5/48 426/93 |
| 2004/0076737 A1 * | 4/2004 | Zheng | A23F 3/42 426/650 |
| 2004/0081737 A1 * | 4/2004 | Zheng | A23F 5/243 426/548 |
| 2004/0137136 A1 * | 7/2004 | Zheng | A23F 5/243 426/654 |
| 2005/0112265 A1 * | 5/2005 | Ceriali | A23F 5/24 426/594 |
| 2005/0181107 A1 * | 8/2005 | Naef | A23F 5/02 426/594 |
| 2006/0222753 A1 | 10/2006 | Harshberger | |
| 2010/0009039 A1 * | 1/2010 | Robinson | A23F 5/405 426/72 |
| 2010/0247716 A1 * | 9/2010 | Castro | A23F 5/14 426/93 |
| 2010/0316785 A1 | 12/2010 | Morinaga et al. | |
| 2011/0059224 A1 | 3/2011 | Harrison | |
| 2011/0135802 A1 * | 6/2011 | Robinson | A23C 9/142 426/595 |
| 2011/0135803 A1 * | 6/2011 | Robinson | A23C 9/142 426/595 |
| 2012/0128851 A1 | 5/2012 | Brooks et al. | |
| 2012/0164277 A1 * | 6/2012 | Robinson | A23C 1/00 426/72 |
| 2012/0164298 A1 * | 6/2012 | Robinson | A23C 9/14 426/580 |
| 2012/0164299 A1 * | 6/2012 | Robinson | A23C 9/1422 426/588 |
| 2013/0177672 A1 * | 7/2013 | Robinson | A23F 5/28 426/72 |
| 2013/0202748 A1 | 8/2013 | Fountain et al. | |
| 2013/0260004 A1 | 10/2013 | Robinson et al. | |
| 2014/0147572 A1 | 5/2014 | Abaurre | |
| 2014/0272077 A1 * | 9/2014 | Robinson | A23F 5/18 426/594 |
| 2015/0118380 A1 * | 4/2015 | Doleyres | A23F 5/40 426/569 |
| 2016/0051613 A1 | 2/2016 | Vella et al. | |
| 2016/0198732 A1 * | 7/2016 | Charles | B65B 29/022 426/115 |
| 2016/0235095 A1 * | 8/2016 | Hilmer | A23F 5/465 |

OTHER PUBLICATIONS

International Search Report and Written Opinion dated Jan. 5, 2018 for International Pat. Appl. No. PCT/US17/057295.

Turchiuli et al. "Aroma Encapsulation in Powder by Spray Drying, and Fluid Bed Agglomeration and Coating", 2013 Advances in Food Processing Research and Applications, Food Engineering Series, pp. 255-265 pg. 264, full para [1]; p. 256, para [1]; p. 256, full para [2]; p. 257, full para [1]; p. 259, para [1]; p. 260, full para.

Sanjeev et al. "Low Oxygen and Inert Gas Processing for Foods", Apr. 26, 2007, Clinical Reviews in Food Science and Nutrition, pp. 423452, pp. 423, para [4].

International Search Report and Written Opinion dated Jan. 30, 2020 for International Pat. Appl. No. International PCT/US19/062074.

* cited by examiner

METHODS FOR PREPARING BIOMATERIALS IN THE ABSENCE OF ATMOSPHERIC OXYGEN

CROSS REFERENCE TO RELATED APPLICATIONS

This application claims the benefit of and priority under:
U.S. Patent Application No. 62/768,604, filed Nov. 16, 2018, entitled "SYSTEMS AND METHODS FOR PREPARING BIOMATERIALS IN THE ABSENCE OF ATMOSPHERIC OXYGEN";
U.S. Patent Application No. 62/779,100, filed Dec. 13, 2018, entitled "SYSTEMS AND METHODS FOR PREPARING BIOMATERIALS IN THE ABSENCE OF ATMOSPHERIC OXYGEN"; and
U.S. Patent Application No. 62/881,690, filed Aug. 1, 2019, entitled "SYSTEMS AND METHODS FOR PREPARING BIOMATERIALS IN THE ABSENCE OF ATMOSPHERIC OXYGEN,"
all of which are incorporated herein by reference in their entireties.

This application further incorporates by reference the following patents and patent applications in their entireties:
U.S. Pat. No. 9,314,042, filed Nov. 26, 2012, entitled "METHOD AND COMPOSITION USED FOR THE MANUFACTURE OF COFFEE LIQUOR"; and
U.S. patent application Ser. No. 16/309,674, filed Mar. 20, 2019, entitled "WHOLE COFFEE BASED PROCESSES AND PRODUCTS."

Any incorporation by reference is not intended to give a definitive or limiting meaning of a particular term. In the case of a conflict of terms, this document governs.

BACKGROUND

Typically, biomaterials are processed under atmospheric conditions, where the oxygen component of the atmospheric air (around 21-23%) may be free to interact, as a component of the pre-heated air with the biomaterials, as conductive heat to promote the roasting process. It is generally assumed that oxygen present in the air is either required to eliminate off-flavors or does not cause any harm to the thermolysis process. However, in some processes, the oxidation process is irreversible, self-replicating, and, self-accelerated, and such oxidation can decrease flavor, aroma, and shelf-life of certain products.

In particular embodiments, when preparing roasted and ground biomaterials such as coffee beans, the oxidation process may begin as early as the very initial unit operations (i.e., the roasting and subsequently the milling), and even at the green bean level, depending on the elapsed time between harvesting and storage and/or storage and roasting. One of ordinary skill in the art will recognize that the shelf-life of processed biomaterials, particularly coffee beans, generally do not exceed one year even under ideal storage conditions (e.g., frozen and vacuum sealed), and it typically ranges from a few days to a few weeks under usual conditions.

Moreover, conventional milling techniques may further exacerbate the oxidation process by increasing the exposed surface area of coffee beans. In a complex oxidation process, primarily PUFA oils (such as the natural coffee oil present) are subjected to a lipid peroxidation, through mechanisms of hydrogen abstraction, formation of conjugated diene, followed by oxygen uptake, due to several factors, including: 1) the presence of oxygen and free-radicals; 2) the presence of pro-oxidants; 3) the absence of antioxidants (in quantity or in concentration); 4) the high temperature conditions of the process; 5) through the high heat supplied by the process, which provides high energy of activation for reactions, and the potential to overcome inter-atomic bond strength; 6) the presence of moisture (if over 2%), due to its hydrolytic effect in certain components; and 7) the presence of catalysts, such as: iron, copper, magnesium, nickel, and others.

Potential consequences of traditional roasting and milling techniques include the formation of peroxyl radicals that are self-replicated through repeating sequence and cycles of oxidation reactions, thus accelerating the initiation process of oxidation. Once oxidation is established, the sequence of events passes through propagation and termination of the oxidative reactions, which may make the oxidation process irreversible, self-replicating, and self-accelerated, in the absence of antioxidant agents.

In addition, milling can accelerate the oxidation process by increasing the total surface (exposed) area of the biomaterial. For example, when biomaterials are milled to an average particle size of around 20 microns, one gram of product is equivalent to about 190.3 sq. m (e.g., about 2,050.0 sq. ft.) of total surface (exposed) area. The surface increase related to the number of particles may be from around 1,920 particles/g to over 100.3 million particles/g in the milled product, with respective increase of surface area.

Therefore, there is a long-felt but unresolved need for a system or method for roasting coffee beans, tea leaves, cannabis, and other biomaterials and/or derivative products, including their by-products, in complete absence of atmospheric air (e.g., in the absence of oxygen).

BRIEF SUMMARY OF THE DISCLOSURE

Aspects of the present disclosure generally relate to systems and methods for processing biomaterials in the absence of atmospheric oxygen and products resulting from such processes. Such processes may increase the shelf-life expectancies and organoleptic characteristics of roasted and/or milled biomaterial products, including, but not limited to, coffee, cocoa, chocolate derivatives, edible nuts and related drinkable herbs products. In particular embodiments, biomaterials processed according to the systems and methods described herein generally exhibited shelf-life greater than one year, either in opened or unopened containers, or under various acceptable storing conditions.

In various embodiments, the systems and methods disclosed herein prevent oxidation during the processing of biomaterials, via novel techniques for preparing, roasting, and milling biomaterials in an inert gas environment, in a closed or semi-closed loop, or other environments absent of atmospheric oxygen. According to various aspects of the present disclosure, the systems and methods described herein may operate in absence of oxygen, including, but not limited to processing in a vacuum, under normal atmospheric pressure, or pressurized conditions.

In some embodiments, the present disclosure aims to improve systems and methods for preserving roasted biomaterials by converting biomaterials into the form of a liquid, paste and/or powder. Particularly, the present systems and methods aim to preserve coffee beans, cocoa beans and its chocolate derivatives, edible nuts (including: Brazil nuts, almonds, cashew nuts, hazelnuts, macadamias, walnuts, peanuts, and the like), tea, matte and related drinkable herbs, biomaterial by-products, among others, in their roasted forms.

In some embodiments, the present systems and methods may produce biomaterial compositions in various forms, such as liquid, paste, powder, and other fat- and/or water-based soluble/dispersible forms. In particular embodiments, the approximate average size for final milled coffee particles (or any other milled biomaterial discussed herein) may range from about 0.1-40.0 microns, less than about 40.0 microns, less than about 30.0 microns, or less than about 0.1 microns.

In particular embodiments, the systems and methods discussed herein facilitate the end-product wettability, water-solubility, and/or overall dispersibility (as well as other physical, chemical and/or rheological properties). According to various aspects of the present disclosure, enhanced dispersion and stabilization of biomaterials may be achieved by agglomeration, microencapsulation, coating, and hardening of the coating material of the biomaterials with additives (e.g., dispersants, emulsifiers, thickeners, stabilizers, antioxidants, etc.), and combinations thereof.

In particular embodiments, the system may include customized equipment, such as: 1) a special roaster designed to operate in absence of oxygen, which in at least one embodiment, may use an inert gas to act as a heat transfer medium; 2) a modified two-stage fluid bed cooler, equipped with quenching and "torrefacto" capabilities and for operating in absence of oxygen; and 3) a cryogenic ball mill for ultra-milling of coffee beans, cocoa beans, edible nuts, teas and similar drinkable herbs, and their derivatives (including by-products) to a particle size of less than about 40.0 microns, and as a method of wet milling for improving dispersibility of insoluble particles of biomaterials.

In certain embodiments, the operational conditions of the present systems and methods use inert gases as a heat medium (e.g., in form of superheated steam (SHS), or through any of the in-process heated commercial inert gases, such as nitrogen, helium, neon, argon, carbon dioxide, or any other suitable inert gas). The atomic structure of an inert gas may provide a stable environment for the disclosed systems and methods, such that inert gases include a full set of outer valence electrons (e.g., eight valence electrons) and are thus not prone to reactions (e.g., formation of covalent bonds) with other atoms and/or molecules, such as oxygen, that do not have full sets of valence electrons. Particularly, oxygen atoms include six valence electrons and thus generally react with other atoms and/or molecules to fill its outer set of valence electrons (while also satisfying the other atoms or molecules outer set of valence electrons). One having ordinary skill in the art will recognize these types of reactions as covalent bonding and oxidation-reduction reactions. In certain embodiments, complementary and/or additional/optional processing technologies may be included in the disclosed systems and methods, such as the direct microencapsulation of the ultra-fine powder generated or, alternatively, the preliminary agglomeration of ultra-fine particles and subsequent coating of the formed granules to uniquely allow the powdered version of finished product to satisfy many of the above properties and features, while also ensuring that the particles of the end-products may be completely protected against oxidation.

In a particular embodiment, packaging the resulting biomaterial preparation in an inert gas environment, rather than an atmospheric environment, may further extend the preparation's shelf-life.

According to various aspects of the present disclosure, the systems and methods discussed herein provide benefits such as: improve quality and safety of consumption of food and beverages prepared with these biomaterials, provide shelf-life extension, enhanced convenience of preparation, improved yield extension, and extended storage and utilization without the use of chemical preservatives or refrigeration.

In various embodiments, the systems and methods disclosed herein allow for the biomaterials to be processed while maintaining some, all, or most of volatile and non-volatile components, and without damaging aroma components. For example, roasted coffee beans, cocoa beans, edible nuts, tea and similar drinkable herbs exhibit volatile and non-volatile aroma components. In the case of roasted coffee beans, around 14% of the bean content is coffee essential oil, which could be processed, through pre-extraction, storage, and preservation under cryogenic conditions until it is ready to be eventually added back to the coffee mass-based products, just before the process is completed. In particular embodiments, the system discussed herein includes supercritical fluid extraction ("SCFE"), a process for selective extraction of essential oils from biomaterials (e.g., such as coffee oil from coffee beans). According to various aspects of the present disclosure, extracted fluids may include polyunsaturated fatty acids ("PUFAs") which may be more prone to oxidation, and thus removing PUFA may reduce risk of biomaterials becoming oxidized during roasting and milling processes and allows for greater shelf-life of the biomaterials. In various embodiments, the PUFAs may be added back into the roasted and milled biomaterials, if desired, after both the de-oiled biomaterial (e.g., coffee stripped of coffee oil) and the essential oil (e.g., coffee oil) are protected from oxidation.

Aspects of the present disclosure aim to provide products that efficiently retain the volatile and non-volatile chemicals and flavor components of biomaterials during roasting and milling, resulting in foods and/or beverages with improved sensory characteristics, presented in liquid, paste and/or in solid forms.

According to a first aspect, a process for producing a coffee fraction is disclosed including: cleaning and drying green coffee beans; roasting the cleaned and dried green coffee beans to produce roasted coffee beans via a roasting chamber, wherein the cleaned and dried green coffee beans are roasted in the absence of oxygen at a temperature of about 100-230 degrees Celsius at a pressure of about 1-10 bar for about 2-60 minutes; cooling and transporting the roasted coffee beans via a two-stage vibratory fluid bed cooler in the absence of oxygen, wherein cooling the roasted coffee beans includes spraying the roasted coffee beans with a solution to quench thermolysis reactions; cryogenically dry milling the roasted coffee beans in the absence of oxygen to a particle size of approximately 75-100 microns at a temperature of about −190 to 10 degrees Celsius; extracting fluids from the milled, roasted coffee beans in the absence of oxygen via a supercritical fluid extraction (SCFE) system to produce a coffee product, wherein the SCFE system includes: two or more extraction columns, each extraction column configured to introduce supercritical liquid carbon dioxide to a permeation column; and each permeation column configured to introduce the supercritical liquid carbon dioxide to the milled, roasted coffee beans thereby causing separation and extraction of the fluids from the milled roasted coffee beans; wet milling the coffee product in the absence of oxygen at a temperature below about 10 degrees Celsius to produce a coffee powder including particles of less than about 40.0 microns; and mixing the coffee powder with one or more oils and/or fats in the absence of oxygen at a temperature of about 10-80 degrees Celsius and at a pressure of about 1-5 bar to produce a coffee fraction including the coffee powder particles microencapsulated in the one or more oils and/or fats.

According to a second aspect, the process of the first aspect or any other aspects disclosed herein, wherein the cleaned and dried green coffee beans are roasted in the presence of an inert gas. According to a third aspect, the process of the second aspect or any other aspects disclosed herein, wherein the roasting chamber is surrounded by a heating media for roasting the cleaned and dried green coffee beans. According to a fourth aspect, the process of the third aspect or any other aspects disclosed herein, wherein the heating media includes super-heated steam. According to a fifth aspect, the process of the third aspect or any other aspects disclosed herein, wherein the heating media includes an inert gas. According to a sixth aspect, the process of the third aspect or any other aspects disclosed herein, wherein the process further includes coating the coffee fraction via a coating sprayer. According to a seventh aspect, the process of the sixth aspect or any other aspects disclosed herein, wherein the coating sprayer is operatively connected to a coating vibratory fluid bed. According to an eight aspect, the process of the seventh aspect or any other aspects disclosed herein, wherein the solution includes water. According to a ninth aspect, the process of the eighth aspect or any other aspects disclosed herein, wherein the solution includes about 1-60% sugar. According to a tenth aspect, the process of the ninth aspect or any other aspects disclosed herein, wherein the inert gas is nitrogen.

According to a eleventh aspect, a process for producing a coffee fraction is disclosed including: cleaning and drying green coffee beans; roasting the cleaned and dried green coffee beans to produce roasted coffee beans via a roasting chamber, wherein the cleaned and dried green coffee beans are roasted in the presence of an inert gas and in the absence of oxygen at a temperature of about 100-230 degrees Celsius at a pressure of about 1-10 bar for about 2-60 minutes; cooling and transporting the roasted coffee beans via a two-stage vibratory fluid bed cooler in the absence of oxygen, wherein cooling the roasted coffee beans includes spraying the roasted coffee beans with solution; cryogenically dry milling the roasted coffee beans in the absence of oxygen to a particle size of approximately 75-100 microns at a temperature of about −190 to 10 degrees Celsius; extracting fluids from the milled, roasted coffee beans in the absence of oxygen via a supercritical fluid extraction (SCFE) system to produce a coffee product, wherein the SCFE system includes: two or more extraction columns, each extraction column configured to introduce supercritical liquid carbon dioxide to a permeation column; and each permeation column configured to introduce the supercritical liquid carbon dioxide to the milled, roasted coffee beans thereby causing separation and extraction of the fluids from the milled roasted coffee beans; wet milling the coffee product in the absence of oxygen at a temperature below about 10 degrees Celsius to produce a coffee powder including particles of less than 40.0 microns; and mixing the coffee powder with one or more oils and/or fats in the absence of oxygen at a temperature of about 10-80 degrees Celsius and at a pressure of about 1-5 bar to produce a coffee fraction including the coffee powder microencapsulated in the one or more oils and/or fats.

According to a twelfth aspect, the process of the eleventh aspect or any other aspects disclosed herein, wherein the roasting chamber is surrounded by a heating media for roasting the cleaned and dried green coffee beans. According to a thirteenth aspect, the process of the twelfth aspect or any other aspects disclosed herein, wherein the heating media includes super-heated steam. According to a fourteenth aspect, the process of the thirteenth aspect or any other aspects disclosed herein, wherein the heating media includes an inert gas. According to a fifteenth aspect, the process of the thirteenth aspect or any other aspects disclosed herein, wherein the process further includes coating the coffee fraction via a coating sprayer. According to a sixteenth aspect, the process of the fifteenth aspect or any other aspects disclosed herein, wherein the coating sprayer is operatively connected to a coating vibratory fluid bed. According to a seventeenth aspect, the process of the sixteenth aspect or any other aspects disclosed herein, wherein the solution includes water. According to an eighteenth aspect, the process of the seventeenth aspect or any other aspects disclosed herein, wherein the solution includes about 1-60% sugar. According to a nineteenth aspect, the process of the eighteenth aspect or any other aspects disclosed herein, wherein the process further includes agglomerating the coffee powder under the inert gas conditions and in the absence of oxygen. According to a twentieth aspect, the process of the nineteenth aspect or any other aspects disclosed herein, wherein the process further includes coating the coffee powder under the inert gas conditions and in the absence of oxygen.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
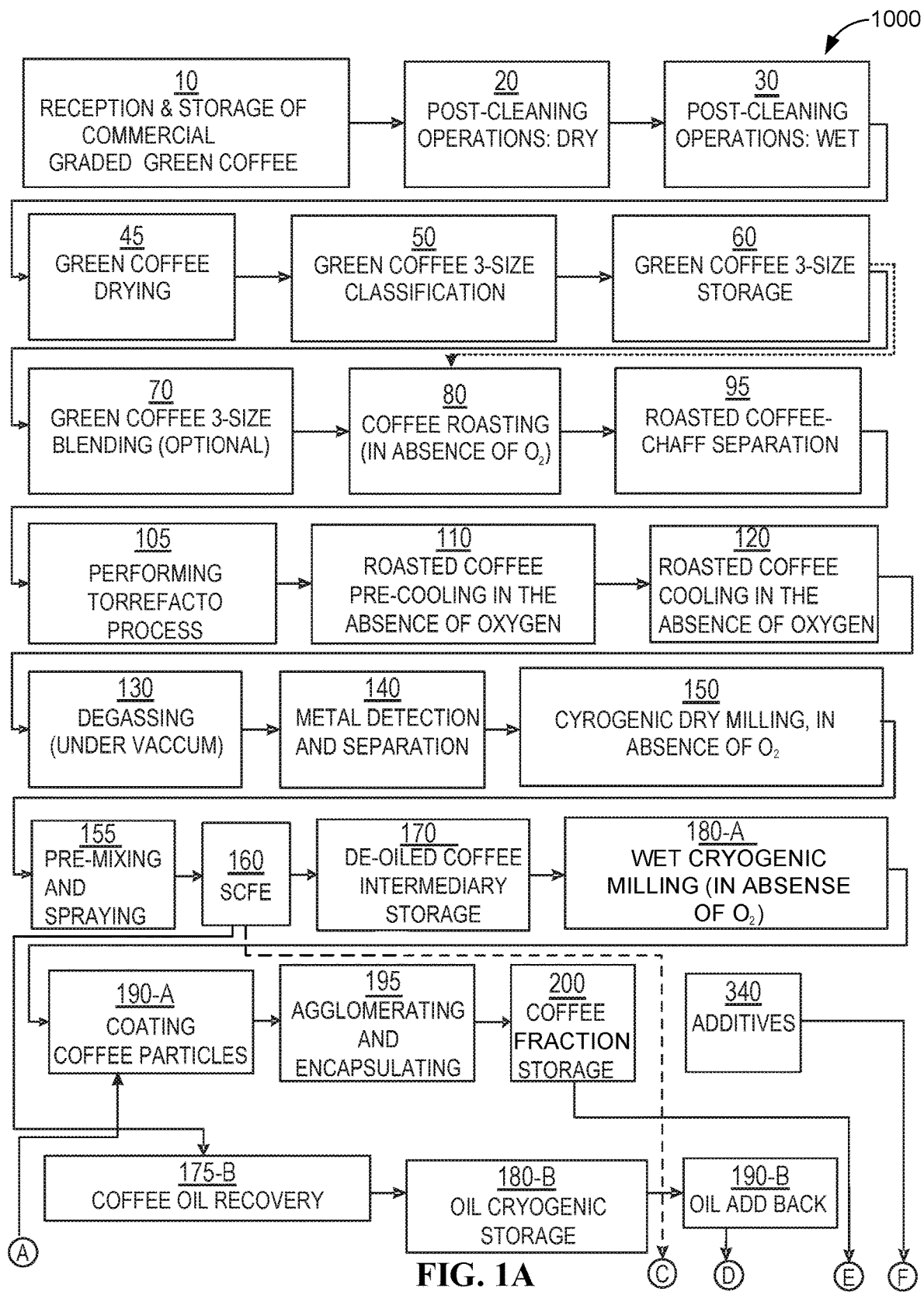
FIGS. 1A, 1B, and 1C illustrate a flowchart showing a biomaterial mass manufacturing process, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As described herein, "heating" can be performed by one or a plurality of heating elements such as, for example, electric heaters, radiative heater, heat exchangers, and other mechanisms for generating and transmitting heat to a substance.

As described herein, "cooling" can be performed by one or a plurality of cooling elements such as, for example, refrigerated gas systems, cryogenic gas systems, heat exchangers, and other mechanisms for cooling (e.g., removing heat from) a substance.

As described herein, "pressurizing" can be performed by one or a plurality of pressurizing elements such as, for example, inert gas compressors, heat- and/or volume-based pressurization chambers, and other mechanisms for pressurizing a substance or structure containing the substance.

Overview

Aspects of the present disclosure generally relate to systems and methods for processing biomaterials in the absence of atmospheric oxygen and products resulting from such processes. Such processes may increase the shelf-life expectancies and organoleptic characteristics of roasted and/or milled biomaterial products, including, but not limited to, coffee, cocoa, chocolate derivatives, edible nuts and related drinkable herbs products. In particular embodiments, biomaterials processed according to the systems and methods described herein generally exhibited shelf-life greater than one year, either in opened or unopened containers, or under various acceptable storing conditions.

In various embodiments, products contemplated herein include a water activity of less than 0.6 (e.g., products produced by the processes discussed herein). In some embodiments, final products (e.g., spreads, bars, chunks, thins, etc.) and masses of biomaterials may have a viscosity at least partially dependent upon particle size (e.g., of powdered coffee) and amount of biomaterial mass (e.g., coffee mass or coffee fraction).

In various embodiments, to ensure effective protection and longer shelf-life of the flavor of roasted coffee beans (or other biomaterials), preparation of the coffee in an edible format may include, but is not limited to: 1) roasting and cooling using inert gas as heating or cooling medium; 2) "torrefacto" (in absence of oxygen); 3) cryogenic or refrigerated inert gas pre- and post-cooling (in absence of oxygen); 4) metal detection (and removal) (under inert gas conditions); 5) cryogenic or refrigerated inert gas dry pre-milling (in absence of oxygen), to a particle size of about 75 to 500 microns or 300 to 400 microns); 6) total or partial extraction of coffee oil by supercritical fluid extraction (SCFE) and recovery of the oil under cryogenic conditions; 7) coating of de-oiled coffee micro-particles (e.g., in form of a mass) with specialty fats and/or oils (e.g., ghee, butter oil, palm (or fractions), palm kernel (or fractions), coconut oil (or fractions), and/or natural and/or deodorized cocoa butter); 8) special conching (in the absence of oxygen), to develop a specific flavor profile for the mass; 9) second (wet) cryogenic milling for fine-milling (in the absence of oxygen), to reduce the particle size to less than 40 microns; 10) blending and/or homogenization of the coffee mass with specialty oils and/or fats, using refined, bleached, and deodorized (RBD) and/or cold pressed oil products, such as fractionated coconut (e.g., medium chain triglycerides, MCT), other drupe-based oils, as well as fruits-, nuts-, and/or cereals-based oil extractions; and 11) storage of the coffee mass for further processing.

An exemplary, non-limiting processes is as follows, according to one embodiment (in the absence of oxygen). First, the system may pre-processes the biomaterials by dry cleaning and wet cleaning and drying, as described herein. Second, the system may roast the biomaterial for between about two (2) and sixty (60) minutes under conditions of an inert gas atmosphere inside a roasting chamber at a temperature between about 100-230 degrees Celsius and under vacuum or at a pressure between about 0.01-10 bars (with optional mechanical vibration). Third, the system may process the biomaterials in a two-stage fluid bed cooler (FBC) chamber configured to operate under an inert gas atmosphere conditions and where the hot roasted biomaterial may be kept at a temperature between 65-75 degrees Celsius for a minimum of one (1) minute, and subsequently, the temperature of the roasted biomaterial may be lowered to between about 15-30 degrees Celsius for a minimum of about five (5) minutes, while the biomaterials are exposed to a pressurized blow of cooled or cryogenic inert gas. Next, the FBC may deliver cool water to quench the thermolysis of the roasted biomaterials and/or deliver various sugar and/or sweetener solutions (from 10-60% w/w) via one or more sprayers (e.g., if a "torrefacto" process is desired). Fifth, the system may mill the roasted and cooled biomaterial (after passing through metal detection) to a size between about 75 and 500 microns at a temperature range between 10 to −190 degrees Celsius. Sixth, the system may mix the roasted and milled biomaterials with natural cocoa butter or other suitable (edible) vegetable food oil or fat (from 0.5 to 10%) of the weight of the roasted and milled biomaterial, by utilizing an industrial ribbon (or sigma type) mixer (adapted to operate under close- or semi-closed loop and using any source of inert gas, in order to exclude completely the oxygen from the process, while incorporating the fat/oil onto the milled biomaterials). Seventh, the system may fully or partially extract fats/oils, through super critical fluid-extraction (SCFE) via two or three stage extraction columns, where carbon dioxide in liquid form (i.e., under super critical state) is introduced into a permeation (filter) column at a temperature of about 30-90 degrees Celsius.

In some embodiments, the liquid carbon dioxide may be introduced at a pressure between about 150 to 450 bars to extract at least a portion of oil and fat of the milled coffee beans (or other biomaterial). In some embodiments, the extraction operation may be interrupted when the biomaterial reaches a residual of seven percent (7%) or less of fat/oil. In at least one embodiment, if the SCFE equipment is equipped with two-fluid collectors, it may then separate the natural essential oil from the added or natural fat present in the material. According to particular embodiments, fat and oil (natural essential oil) might be optionally sprayed back at the fluid bed stage during a microencapsulation phase (of a powder), or to the agglomerated granules, during a coating and hardening phase. In further embodiments, natural extracted cocoa butter, or other vegetable fat(s), may also be recovered in pure form during the SCFE phase and may be re-utilized to prepare a new biomaterial product batch, during a mixing phase.

According to various embodiments, roasted, milled and carbon dioxide defatted biomaterial may be ultra-milled through means of a cryogenic, vertical ball mill, after the material is initially covered with liquid Nitrogen or liquid inert gas, following by a batch processing milling under cryogenic conditions to a particle size of less than 40 microns and, in one embodiment, with a narrow distribution range and an average particle size of between about 0.5-1.0 microns.

In one embodiment, milled, roasted biomaterials may be mixed with other food ingredients, and/or additives (under inert gas conditions), to yield liquid, paste or solid products or forms. In at least one embodiment, the milled, roasted biomaterials are mixed with other substances via an industrial ribbon (or sigma type) mixer, adapted to operate in a closed- or semi-closed loop in the absence of oxygen (e.g., with inert gas).

In a particular embodiment, roasted biomaterials are conched, under specific processing conditions, e.g., through a solid phase batch reactor (or conche). As will be understood, a conche process (in absence of oxygen), may be utilized to develop secondary flavor-related reactions, such as those caused by, for example, Maillard reactions, Strecker degradation, and/or Schiff compound formation through reactants, friction, shearing, and impact (which generate heat) and processing timing. In some embodiments, the process may include recovering volatiles that escape from the biomaterials during the conche process, using a cryogenic-type aroma condenser. Exemplary machinery may include several types of solid phase reactors, such as an extruder, and/or modern industrial conches, such as those employed in the manufacturing of chocolates, adapted for the following conditions: 1) operation in the absence of oxygen; 2) temperatures of about 10 to 80 degrees Celsius; 3) pressure of about 1 to 20 bars; 4) a processing cycle or time of about 1 to 8 hours; and 5) a shaft rotation speed of about 25 to 100 rpm.

In some embodiments, the exemplary conche machinery may be operatively connected to an additional apparatus for injecting condensable stripping inert gases and using overheated steam at a minimum of about 1-5% of the initial product mass used in combination with a cryogenic-type aroma condenser for the recovery of flavor volatiles under cryogenic conditions.

Exemplary Embodiments

Among other things, this disclosure is related to various embodiments of processing biomaterials in the absence of oxygen. Further, this disclosure discusses various novel embodiments of machinery and systems for carrying out certain processing steps. As will be understood from discussions herein, in some embodiments, biomaterials may be produced in the absence of oxygen via machinery and systems that are closed-loop and include inert gas (or a vacuum if possible), where such machinery/system is sealed from outside air. In at least one embodiment, biomaterials may be produced in the absence of oxygen via machinery and systems that are completely enclosed in an oxygen-free environment (e.g., machinery/systems are housed in an oxygen-free room, facility, floor of a facility, container, or other enclosure). According to one embodiment, biomaterials are produced via machinery or systems that have traditionally run with oxygen, but the machinery or systems are modified to be sealed from oxygen and any oxygen in the machinery or systems is pumped out or otherwise replaced with an inert gas.

Figure 1B:
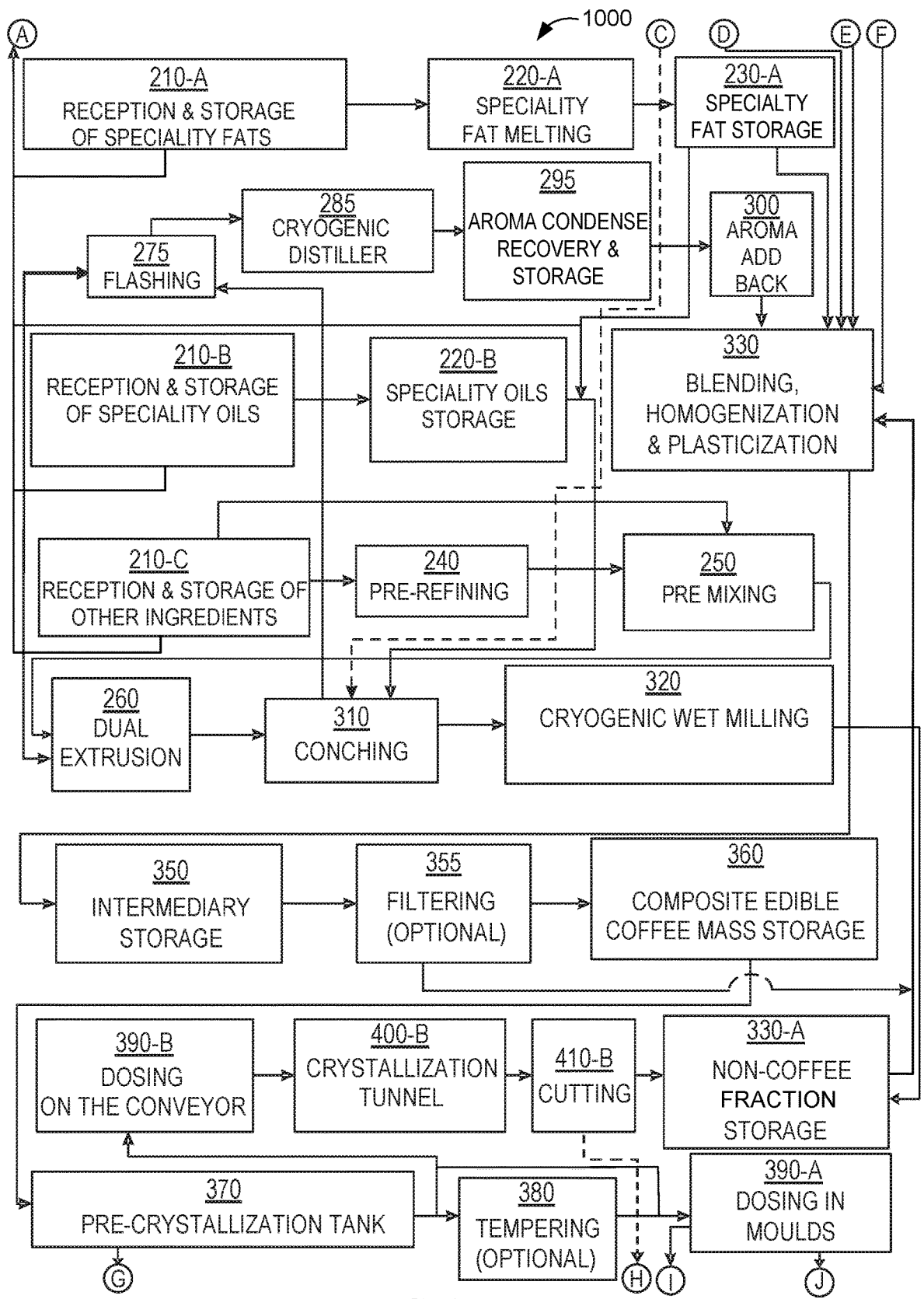
Figure 1C:
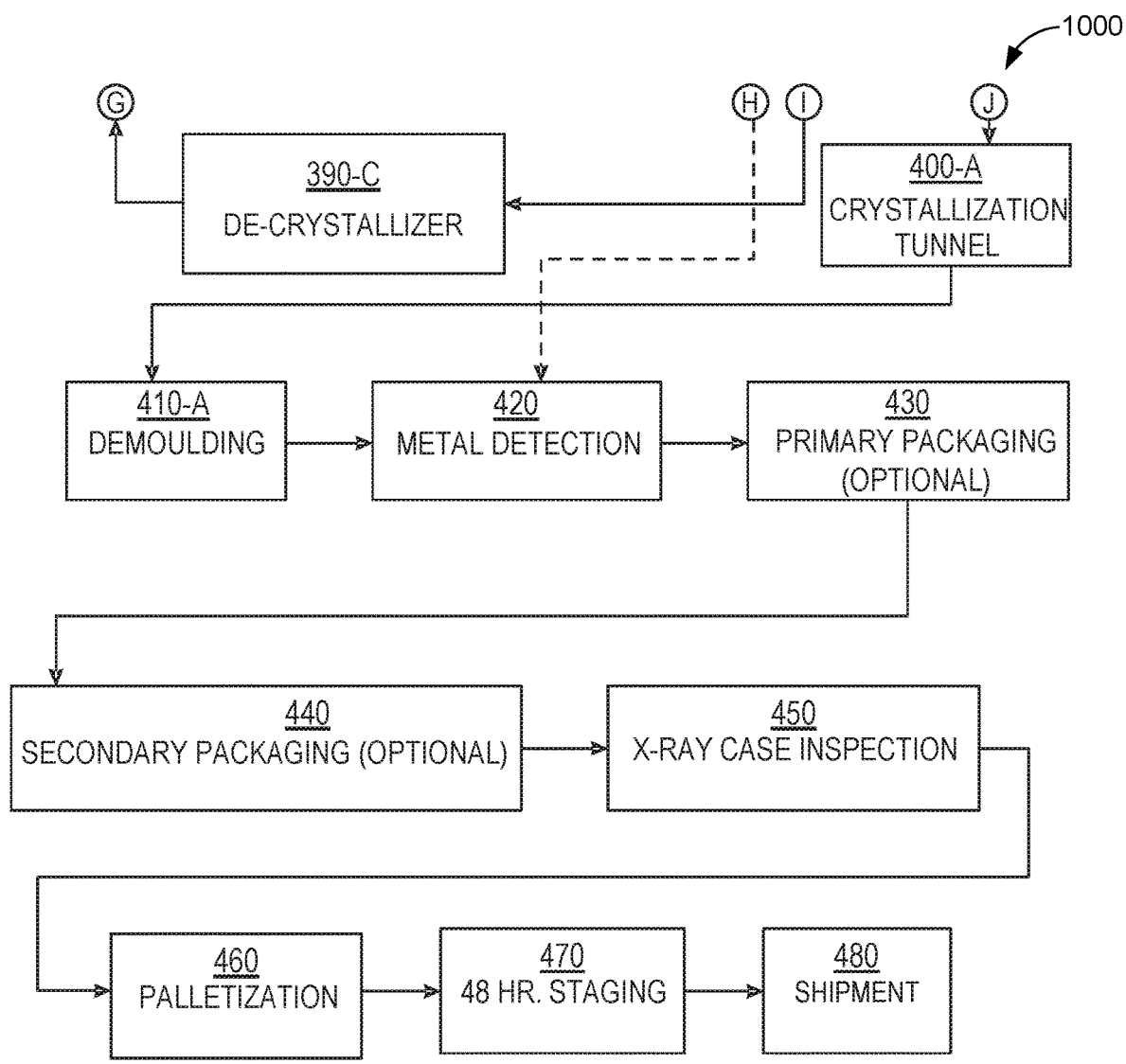

Referring now to the figures, for the purposes of example and explanation of the fundamental processes and components of the disclosed systems and methods, reference is made to FIGS. 1A-1C, which illustrates a flowchart showing an exemplary manufacturing process 1000. As will be understood by one having ordinary skill in the art, the steps and processes shown in FIGS. 1A-1C (and those of all other flowcharts and sequence diagrams shown and described herein) may operate concurrently and continuously, are generally asynchronous and independent, and are not necessarily performed in the order shown.

At step 10, the process 1000 includes receiving and storing commercial grade green coffee beans. In various embodiments, green coffee beans, edible nuts, cocoa beans, or other biomaterials may be received under commercial (exporting) phytosanitary conditions in bulk or bags. In certain embodiments, the green coffee beans may be checked for weight and residual moisture for classification and sorting purposes.

In one or more embodiments, for tea and/or similar drinkable herbs, both the dry and wet cleaning processes described herein may be adapted to accommodate the physical conditions of the dried leaves and/or buds, and specialized commercial equipment may be used to ensure complete cleaning and removal of solid impurities before the coffee (tea) mass, coffee (tea) fraction, and/or non-coffee (non-tea) fraction manufacturing processes. In at least one embodiment, the biomaterials can be prepared according to steps and processes described herein and using parameters selected based on characteristics of each biomaterial.

At step 20, the process 1000 includes performing dry post-cleaning processes on the green coffee beans. According to one embodiment, step 20 of the process 1000 can include performing steps 2001-2070 of the process 2000 described herein. In at least one embodiment, the dry post-cleaning processes include removing elements from the green coffee beans including, but not limited to: 1) coarse impurities; 2) dust; 3) sand; 4) chaff; 5) light (e.g., lessdense) coffee beans; 5) heavy impurities; 6) stones and pebbles; 7) metal contaminants; 8) defective beans; and 9) other impurities. In various embodiments, dry post-cleaning processes generally includes manual, automatic, or a combination thereof of opening and emptying bags of green coffee beans and passing the green coffee beans through a sequence of unit operations to eliminate impurities and clean the green coffee beans.

In one or more embodiments, the green coffee beans may be passed through and treated by unit operations including, but not limited to: 1) a two-sieve separator and classifier (also referred to as "Scalpelator" or "Dirt Wheel") to eliminate coarse impurities; 2) an aspiration channel, to eliminate dust, sand, light beans and chaff; 3) a separator and destoner, to eliminate heavy impurities, stones and/or pebbles; 4) a vibratory, multi-sieves sorter, to eliminate other impurities; 5) a magnetic separator, to separate metal contamination; and 6) a cluster, cutter, snipper and un-snipped bean remover, to separate defective beans for partial recovery. In at least one embodiment, by passing the green coffee beans through the above unit operations, the dry post-cleaned coffee beans may demonstrate an average reduction in defects by ten-fold.

At step 30, the process 1000 includes performing wet post-cleaning processes on the dry post-cleaned coffee beans. According to one embodiment, step 30 of the process 1000 can include performing steps 2072-2093 of the process 2000 described herein. In various embodiments, the wet post-cleaning processes may include, but are not limited to, passing the dry post-cleaned coffee beans through a second sequence of unit operations. As will be understood by one of ordinary skill in the art, conventional methods for cleaning biomaterials such as coffee beans rely on dry cleaning (e.g., sifting, gas-blowing, etc.). According to one embodiment, the wet post-cleaning processes may improve cleanliness of the dry post-cleaned coffee beans by removing impurities typically ignored by dry cleaning methods, thereby allowing for the entirety of the dry post-cleaned coffee beans (e.g., the entirety of the coffee beans) to be included in a coffee liquor product. In at least one embodiment, the sequence of unit operations for wet post-cleaning may include, but are not limited to: 1) a continuous counter-current (cool) water washer (to prevent excess water absorption by the beans), where coarse particles may be initially rejected by horizontal centrifuge during primary cleaning, and where potable water used therein may be sent to the primary water treatment and subsequently to the secondary water treatment, before it is returned to the process; and 2) a wire mesh (vibratory) de-waterer, where further water recovery may be achieved, and continuously returned to the primary water treatment. In various embodiments, the wire mesh may be adaptable (e.g., change mesh/screen sizes) to accommodate various types of biomaterials (e.g., in addition to the dry post-cleaned coffee beans). In at least one embodiment, passing the dry post-cleaned coffee beans through the second sequence of unit operations yields wet post-cleaned coffee beans.

At step 45, the process 1000 includes performing post-cleaning drying processes on the wet post-cleaned coffee beans. According to one embodiment, the wet post-cleaned coffee beans may demonstrate an initial average residual moisture of around 25 to 40%, and the post-cleaning drying processes reduce the residual moisture percentage to about 7-8.5%. In at least one embodiment, the post-cleaning drying processes may include transferring the wet post-cleaned coffee beans to a bean drier that includes a two-stage vibratory stainless steel, mesh-type fluid bed chamber. In various embodiments, in a first stage, the wet post-cleaned coffee beans may be received onto a vibratory bed within a chamber, the vibratory bed configured to vibrate throughout the first stage. In one or more embodiments, to dry the wet post-cleaned coffee beans, HEPA-type pre-filtered sanitary super-heated steam (SHS) may be continuously injected upward into the first chamber at a constant, relatively low pressure and at a controlled volume and temperature. According to one embodiment, from the wet post-cooled coffee beans, the first stage can yield dried, heated coffee beans. In one or more embodiments, the combination of the vibratory bed and SHS impingement can cause a fluid bed effect, resulting in the dried, heated coffee beans forming a fluid bed. In one or more embodiments, the fluid bed effect (demonstrated by all fluid beds described herein) allows for increased contact between the inert gas(es) and the coffee beans (or derivative thereof, or other biomaterials), thereby improving heat transfer (e.g., in heating and cooling related processes and steps described herein). In at least one embodiment, at the top portion of the chamber, humid air may be forcefully extracted and passed through a cyclone configuration to recover any solid particulates from the dried, heated coffee beans.

In various embodiments, in a second stage, cool, HEPA-type pre-filtered inert gas may be continuously injected upwards into the fluid bed (e.g., while the humid air exists through the top of the chamber through forced extraction and subsequently passing through the cyclone configuration to collect solid particulates). In at least one embodiment, the system may operate under closed-loop, where the humid inert gas passes through a condenser and absorbent filter, followed by a re-conditioning of the inert gas, in order to return to the loop. In one or more embodiments, while a small portion of the inert gas may exit the system, there may also be a secondary (automated) injection gas valve that may maintain the constant level of circulating inert gas. According to one embodiment, from the dried, heated coffee beans, the second stage can yield clean coffee beans. In various embodiments, the clean coffee beans may demonstrate an average residual moisture of 7-8.5%, and may be transported and stored in metallic silos (e.g., for preserving cleanliness of the clean beans).

At step 50, the process 1000 includes performing classification and selection processes on the clean coffee beans. In various embodiments, the clean coffee beans can be sorted and classified based on factors including, but not limited to, bean size, bean density, and/or bean color. In at least one embodiment, an objective of the classification and selection processes may be to ensure homogenous roasting levels (e.g., based on approximate similar size of beans of the clean coffee beans). According to one embodiment, the classification and selection processes may improve the overall quality of the final roasted product by providing size and shape-conformed coffee beans, thereby ensuring even and consistent roasting (e.g., whereas roasting beans of different sizes and shapes may produce inconsistent and irregular roasting). In at least one embodiment, the classification and selection processes may include passing the clean coffee beans through a third sequence of unit operations that yield sorted quantities of clean coffee beans. In one or more embodiments, the third sequence of unit operations includes, but is not limited to: 1) a bean size sorter to classify the clean coffee beans by size into small, medium, and large bean categories; 2) a bean density sorter (e.g., gravity separator) to eliminate light, perforated beans from the clean coffee beans for partial subsequent recovery; 3) an optical color sorter to ensure homogeneity in color of the clean coffee beans; 4) a peeler-polisher to peel and polish the clean coffee beans (e.g., to provide a better bean presentation of the clean coffee beans); and 5) if desired, a blender to blend the like-sized beans of the clean coffee beans with like-sized beans of other clean and, in some embodiments, flavored coffees beans. In at least one embodiment, the third sequence of unit operations sorts the clean coffee beans based on size, color, and density into sorted quantities of clean coffee beans. In one example, the third sequence of unit operations yields small-, medium-, and large-sized quantities of clean coffee beans, each quantity also being substantially similar in color. In the same example, the small-sized quantity of clean coffee beans may demonstrate an average bean size measuring less than about 5.5 mm, the medium-sized quantity of clean coffee beans may demonstrate an average bean size measuring less than about 6.5 mm (e.g., and greater than about 5.5 mm), and the large-sized quantity of clean coffee beans may demonstrate an average bean size measuring less than about 8.0 mm (e.g., and greater than about 6.5 mm).

At step 60, the process 1000 includes storing the sorted quantities of clean coffee beans. In various embodiments, the sorted quantities of clean coffee beans may be stored in distinct silos (e.g., distinction defined by size of coffee beans stored therein) and, thus, may be processed separately. For example, at step 60, a small-sized quantity of clean coffee beans may be stored in a small bean silo, a medium-sized quantity of clean coffee beans may be stored in a medium bean silo, and a large-sized quantity of clean coffee beans may be stored in a large bean silo. In at least one embodiment, clean coffee beans of dissimilar sizes may be recombined during or after one or more milling processes described herein.

At step 70, the process 1000 includes blending the sorted quantities of clean coffee beans of different sizes into a blended quantity of clean coffee beans. For example, small-, medium-, and large-sized quantities of clean coffee beans can be blended into a blended quantity (e.g., prior to further processing).

Figure 4:
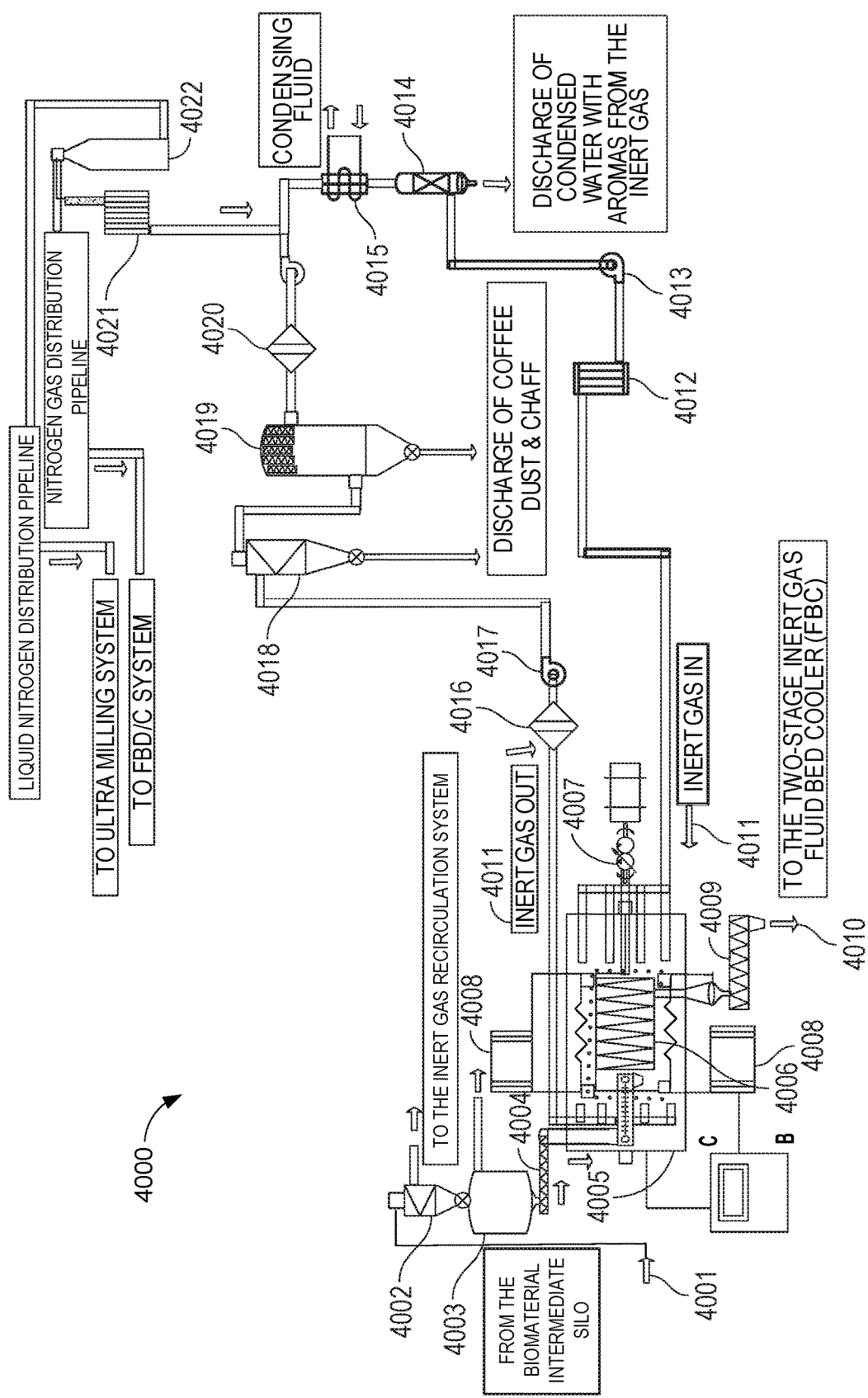
FIG. 4 illustrates an exemplary roasting system, according to one embodiment of the present disclosure.

At step 80, the process 1000 includes roasting a size-sorted (or, in some embodiments, a size-combined/blended) quantity of clean coffee beans to obtain roasted coffee beans. In one or more embodiments, to obtain the roasted coffee beans, the quantity of clean coffee beans can be pressurized to about 1-10 bar and heated to about 100-230 degrees Celsius for a predetermined time period of about 2-60 minutes. In various embodiments, the roasting may be performed on whole coffee beans (e.g., prior to any milling of the coffee beans described herein). According to one embodiment, the roasting may be performed within a roasting system 4000 (FIG. 4). In one or more embodiments, the roasting may be conducted under an inert gas atmosphere, in a closed or semi-closed loop system, under pressure, vacuum, or normal pressure, and in the absence of oxygen.

In at least one embodiment, the inert gas may be nitrogen ($N_2$) or another suitable inert gas. In various embodiments, heating media may be used to raise the temperature in an enclosed chamber that houses a rotary cylinder and/or fluid bed containing the clean coffee beans. In one or more embodiments, the coffee roasting can be performed in batch or continuous modes (e.g., depending on the volume of clean coffee beans to be processed).

In at least one embodiment, a roasting chamber may be initially filled with an inert gas and maintained at a predetermined safe pressure, using a relief valve to regulate the pressure. In various embodiments, a roasting pressure inside the roasting chamber may be kept between about 1-10 bar, while a roasting temperature inside the rotary cylinders and/or or fluid bed chamber may be kept between about 100-230 degrees Celsius, in absence of oxygen. In one or more embodiments, the roasting may extend over a predetermined roasting time period. In at least one embodiment, the roasting time period may be about 2-60 minutes, and may depend on a type of roasting profile desired. In various embodiments, a roasting level could be low, medium, or high. For example, a high roasting profile may include a longer roasting time period, higher roasting temperature, and higher roasting pressure, while a low roasting profile may include a shorter roasting time period and lower roasting temperature and pressure.

According to various aspects of the present disclosure, the systems discussed herein can perform the roasting of biomaterials in the absence of atmospheric oxygen. In various embodiments, roasting equipment may be manufactured to function in both batch and continuous modes. In at least one embodiment, the roasting may occur in various capacities, from 0.1 kg up to 20,000 kg/batch or run. In various embodiments, the roasting equipment may be fabricated to operate sealed and in case of using any suitable inert gas, may be built in closed- or semi-closed loop configuration (e.g., to minimize inert gas losses to the environment).

In at least one embodiment, roasting may occur under vacuum (0.1 bar), and/or atmospheric conditions (1 kg/sq. cm), and/or to medium-high pressure (up to 10 kg/sq. cm). In one or more embodiments, heating media can be used to heat and roast the clean coffee beans. In various embodiments, the heating media can include, but is not limited to, super-heated steam (SHS) and/or any other suitable pre-heated inert gas, such as nitrogen, carbon dioxide, helium, argon, and the like. According to one embodiment, the heating media can be in direct or indirect contact with the clean coffee beans (or other biomaterials). In at least one embodiment, the heating media can be heated by any type of heating source, including, but not limited to, electric sources, electromagnetic sources, combustion-based sources. In one or more embodiments, the heating source can be located either internally or externally to the roasting equipment.

In various embodiments, upon roasting, the clean coffee beans can be converted to roasted coffee beans. In one or more embodiments, coffee bean skins may be automatically or manually collected from the roasting equipment during or after the roasting of the clean coffee beans. According to one embodiment, the collected coffee bean skins can be converted into pellets through one or more pelletizing techniques and/or mechanisms, and the pellets can be added to a burning boiler apparatus. Alternatively, coffee bean skins can be further processed for the preparation of value-added products.

Precision, accuracy, and duration of coffee roasting can greatly influence coffee flavor, and minor deviations in roasting level and roasting duration can introduce undesirable off-flavors into the roasted coffee. Previous approaches to coffee roasting utilize on-flame roasting equipment and roasting time periods of up to 9 minutes. The on-flame roasting equipment reduces the precision and accuracy of roasting processes, thereby leading to improper roasting levels and/or roasting periods (e.g., resulting in roasting for less than 9 minutes) that introduce undesirable off-flavors into the roasted coffee. In at least one embodiment, the roasting of process 1000 is performed using off-flame roasting equipment that allows for more controlled and uniform heating, thereby improving roasting precision and accuracy and providing for improved flavor in the roasted coffee. In one or more embodiments, the roasting may be performed for a predetermined roasting period greater than about 9.0 minutes. In various embodiments, the predetermined roasting period can be about 9.5-13.0 minutes, about 9.0-9.5 minutes, about 9.5-10.0 minutes, about 10.0-10.5 minutes, about 10.5-11.0 minutes, about 11.0-11.5 minutes, about 11.5-12.0 minutes, about 12.0-12.5 minutes, about 12.5-13.0 minutes, or about 13.0-13.5 minutes, In at least one embodiment, the combination of off-flame roasting equipment and precisely and accurately controlled roasting periods provide for roasted coffee (or other biomaterials) with improved flavor (e.g., less off-flavors) compared to roasted coffee produced by previous approaches.

At step 95, the process 1000 includes separating chaff from the roasted coffee beans. In at least one embodiment, the roasted coffee beans can be transported and/or fed into one or more chaff separators. In various embodiments, the one or more chaff separators may continuously aspirate chaff from the roasted coffee beans. In one or more embodiments, the chaff aspiration can occur through a separation cyclone operating under inert gas conditions and in the absence of oxygen. According to one embodiment, the one or more chaff separators can return clean inert gas back to the roasting equipment (e.g., to the roasting chamber), while continuously separating the chaff from the roasted coffee beans.

At step 105, the process 1000 includes performing a "torrefacto" process on the roasted (and chaff-separated) coffee beans under inert gas conditions and in the absence of oxygen. In at least one embodiment, the roasted coffee beans can be sprayed with a 1-60% sugar solution heated to about 1-90 degrees Celsius for a predetermined time period of about 1-20 minutes. In one or more embodiments, the sugar solution forms a coating around each of the roasted coffee beans that improves resistance to oxidation and/or provides a caramel-like flavor thereto.

In various embodiments, the torrefacto process may utilize a two-stage vibratory fluid bed cooler with a spraying mechanism to transport the roasted coffee beans. In one or more embodiments, a closed-loop inert gas, two-stage fluid bed cooler that can be used may be based on the Std. Model of the Food and Pharma Line, manufactured by Witte, 507 Rt. 31 S. Washington, N.J. 07882.

In at least one embodiment, the torrefacto process can include a spray device. In at least one embodiment, step 105 may occur simultaneously with step 110 (e.g., and the pre-cooling process described herein). In various embodiments, the torrefacto process may include controllably spraying a solution onto the roasted coffee beans, thereby substantially encapsulating the roasted coffee beans with the solution. In one or more embodiments, the solution can be sprayed through one or more nozzles of the spraying mechanism. In various embodiments, the solution may include sugars from about 1-60% by weight of the solution, and the solution may be sprayed at a temperature between about 1-90 degrees Celsius for a torrefacto time period of about 1-20 minutes. In one or more embodiments, the solution imparts to the roasted coffee beans a caramel-like associated taste. In various embodiments, as a result of the encapsulation, the solution protects the roasted coffee beans against oxidation processes.

Figure 5:
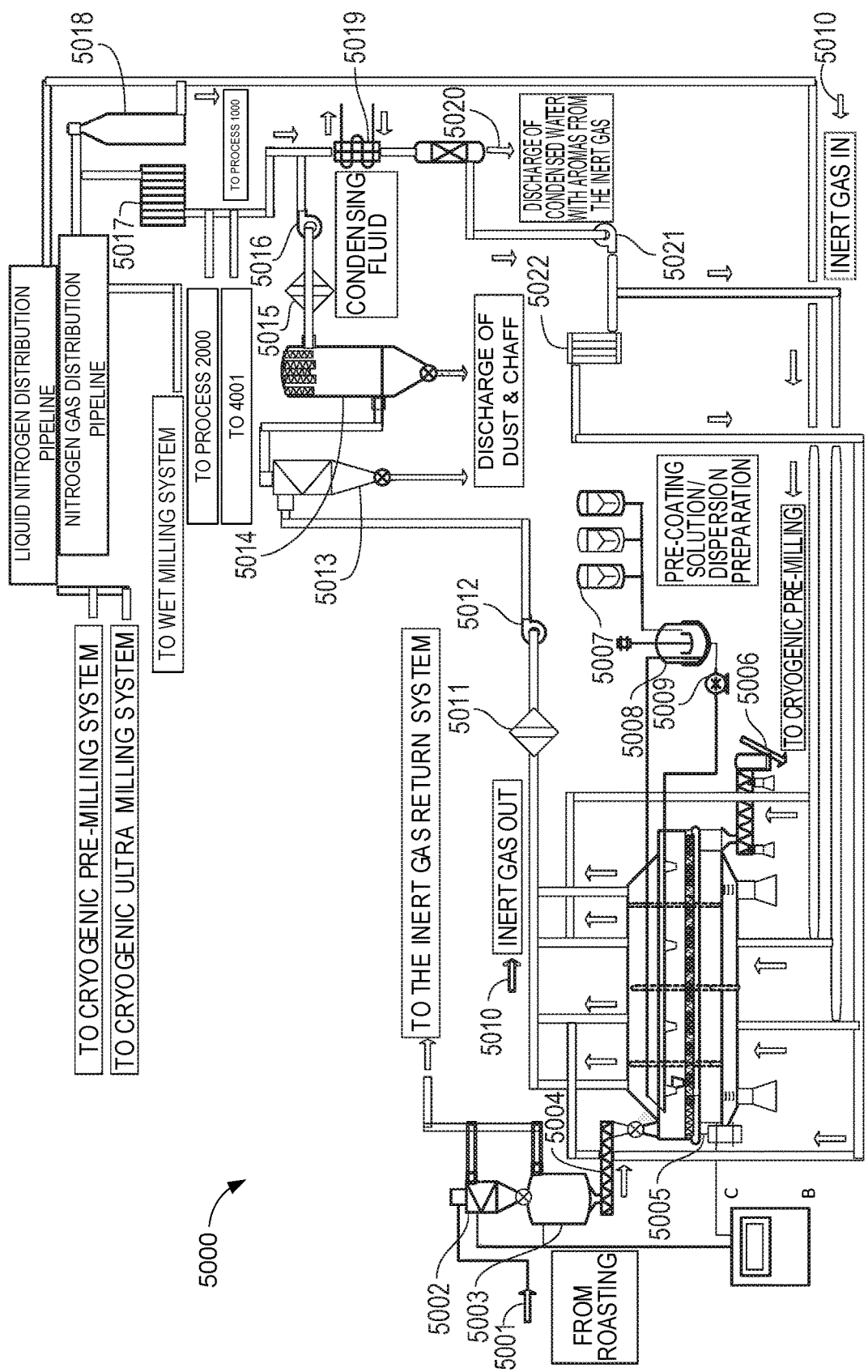
FIG. 5 illustrates an exemplary cooling system, according to one embodiment of the present disclosure.

In at least one embodiment, the torrefacto process of step 105 may be performed in a cooling system 5000 (FIG. 5). In various embodiments, in a first stage, the solution may be sprayed onto the roasted coffee beans through a spraying apparatus integrated within a two-stage closed- or semi-closed loop fluid bed cooler operating under inert gas conditions. In at least one embodiment, the spraying apparatus may allow for incorporation of a variable amount of water, sugars and/or sweeteners to the solution. In one or more embodiments, in the torrefacto process can quench the roasted coffee beans as they exit from the roasting process. According to one embodiment, in a second stage, the torrefacto process quenches thermolysis reactions occurring in the exiting roasted coffee beans. In one example, the torrefacto process quenches the thermolysis reactions through latent heat of condensation that removes heat from the roasted coffee beans. In some embodiments, the spraying apparatus may also incorporate variable amounts of sweeteners at the surface of the roasted coffee beans, which may impart various tastes and special flavoring to the roasted coffee beans under processing.

In embodiments where the "torrefacto" process in not performed, the spraying effect can be utilized to quench the thermolysis reaction of the roasted coffee beans. For example, the spraying apparatus can be configured to spray water (e.g., instead of the solution described herein). In various embodiments, for quenching purposes, the system may deliver finely spread cool and/or hot water through a spray nozzle (e.g., configured for single fluid or double fluid spray). According to one embodiment, the water may be at a temperature between about 1-90 degrees Celsius and may be sprayed for a time period of about 1-20 minutes.

At step 110, the process 1000 includes pre-cooling the roasted coffee beans under inert gas conditions and in the absence of oxygen. In various embodiments, pre-cooling the roasted coffee beans may be carried out through direct contact of the roasted coffee beans with refrigerated inert gas (e.g., in total absence of oxygen). In one or more embodiments, the roasted coffee beans may be cooled down in a first stage to a pre-cooling temperature between about 50-100 degrees Celsius or about 65-70 degrees Celsius. In at least one embodiment, the roasted coffee beans may be cooled down for at least 1 minute to interrupt and/or quench the thermolysis processes of the roasted coffee beans.

At step 120, the process 1000 includes post-cooling the roasted coffee beans under inert gas conditions and in the absence of oxygen. In various embodiments, post-cooling includes a second stage including contacting the roasted coffee beans with inert gas(es) at ambient temperature to bring the temperature of the roasted coffee beans down to ambient temperature (e.g., in total absence of oxygen). In one or more embodiments, the roasted coffee beans may be post-cooled indefinitely (e.g., until the roasted coffee beans are further processes as described herein).

In various embodiments, both the pre-cooling of step 110 and the post-cooling of step 120 may be performed in a two-stage vibratory fluid bed cooler that simultaneously transports and cools the roasted coffee beans. In at least one embodiment, a closed-loop inert gas customized two-stage fluid bed cooler may be similar in part to the standard cooler model of the Food and Pharma Line, manufactured by Witte, 507 Rt. 31 S. Washington, N.J. 07882—USA. In at least one embodiment, the pre-cooling may occur in a first stage of the fluid bed cooler and the post-cooling may occur in a second stage thereof. In one or more embodiments, the torrefacto process of step 105 may occur prior to, following, or simultaneously to the first stage of the fluid bed cooler (and/or the pre-cooling or processes described herein).

At step 130, the process 1000 includes degassing the roasted coffee beans under vacuum and in the absence of oxygen. In various embodiments, the degassing may include, but is not limited to, keeping the roasted coffee beans at ambient temperature and controlled pressure for a predetermined degassing period (e.g., about 1 day) to ensure completion of the degassing. In one or more embodiments, the present processing technology may include intermediary silos for storing the roasted coffee beans while under degassing stage (e.g., to optimize the processing time).

In various embodiments, all pre-cooling, post-cooling and de-gassing may be performed under an inert gas environment by receiving a pressurized blow of cooled inert gas together with a mechanical vibratory screen to transport the roasted coffee beans (e.g., in absence of oxygen).

According to various aspects of the present disclosure, the roasted coffee beans may be kept at the pre-cooling temperature for a degassing time period between about 5-30 minutes (or another appropriate amount of time that allows for substantial degassing to occur). In at least one embodiment, during the post-cooling stage of step 120, a temperature of the roasted coffee beans temperature may be brought down to a post-cooling temperature between about 20-30 degrees Celsius (e.g., ambient temperature) in the second stage of the fluid bed. In various embodiments, the roasted coffee beans may remain at the post-cooling temperature indefinitely (e.g., the roasted coffee beans may be stable as the inert atmosphere is maintained). In at least one embodiment, the degassing can include transporting the roasted coffee beans to one or more holding tanks to undergo further degassing. In one or more embodiments, the roasted coffee beans may remain in the one or more holding tanks for a predetermined degassing period (e.g., up to about 2 days), and may be held under compensated inert gas partial vacuum until the degassing is completed.

At step 140, the process 1000 includes detecting and separating metal from the roasted coffee beans. In various embodiments, the roasted coffee beans may be submitted to a metal detection apparatus that detects and removes metal particles from the roasted coffee beans. In at least one embodiment, the metal detection apparatus can utilize magnetic elements (e.g., electromagnets, etc.) for detecting and selectively removing the metal particles from the roasted coffee beans. In one or more embodiments, detecting and removing contaminant metal from the roasted coffee beans may prevent damage to other system elements, such as, for example, a mill utilized during milling processes and steps described herein.

At step 150, the process 1000 includes dry milling the roasted coffee beans to a size of about 75-500 microns to create dry-milled coffee particles. In various embodiments, dry milling can be performed under cryogenic and inert gas conditions in the absence of oxygen. In various embodiments, dry milling may be performed utilizing suitable equipment including, but not limited to, commercial cryogenic or refrigerated inert gas-type dry mills.

In one or more embodiments, the suitable equipment may be similar to the pin- or turbo-mill, and other suitable impact milling models manufactured by companies such as Pallmann, Wolfstrasse 51, D-66482, Zweibrueken, Germany and Hosokawa Alpine, Peter Doerfler Strassel3-25, D-86199, Germany,—the latter marketed as model MP.

In various embodiments, the roasted coffee beans can be dry-milled down to a first predetermined particle size. In at least one embodiment, the first predetermined particle size may be between about 75-500 microns. In various embodiments, the first predetermined particle size may be between about 75-100 microns, about 100-150 microns, about 150-200 microns, about 200-250 microns, about 250-300 microns, about 300-350 microns, about 350-400 microns, about 400-450 microns, about 450-500 microns, or about 500-550 microns. In one or more embodiments, narrow particle size distribution may prevent blockages (e.g., filter plugging, etc.) in subsequent steps of the process 1000.

In various environments, the dry milling may be performed at a temperature range between 10 degrees Celsius and −190 degrees Celsius to ensure suitable brittleness that improves efficiency of the dry milling.

At step 155, the process 1000 includes pre-mixing the dry-milled coffee particles with one or more specialty fats and/or oils in a quantity about 0.5-15.0% by weight of the coffee particles while under inert gas conditions and in the absence of oxygen. In various embodiments, the pre-mixing can be performed in a closed- or semi-closed-loop ribbon- or sigma-type blender or mixer, or in another suitable blender or mixer. In one or more embodiments, the ribbon- or sigma-type blender can include spraying mechanisms for spraying one or more specialty fats and/or oils (and other substances) onto the dry-milled coffee particles. As would be understood by one of ordinary skill in the art, multiple mixers and/or blenders can be used for the pre-mixing.

In one or more embodiments, one or more specialty fats and/or oils can include, but are not limited to: 1) fats and oils of vegetable origin, such as natural and/or deodorized cocoa butter; 2) medium chain triglyceride (MCT) oil and/or other coconut fractionated and drupe-based oils (fractionated or not); 3) fats from fruits, nuts, seeds; 4) cereal-based oils and/or fat extractions; 5) fats and/or oils of animal origin, such as, for example, butter oil and/or ghee; and 6) other suitable oils and/or fats. In at least one embodiment, the one or more specialty fats and/or oils may be pre-mixed with the dry-milled coffee particles in a predetermined total content added from about 0.5-15% percent by weight of the dry-milled coffee particles. In at least one embodiment, the total content added may be determined based on the amount and general stability of naturally occurring fats and/or oils within the dry-milled coffee particles (or a desired amount of fats and/or oils in a product derived therefrom).

In various embodiments, parameters of the pre-mixing (e.g., the predetermined total content, added content, pre-mixing speed, pre-mixing duration, etc.) may be based on the weight of the milled coffee particles. In one or more embodiments, the pre-mixing may incorporate the specialty fats and/or oils with the dry-milled coffee particles, and, during the pre-mixing, fatty acids can crystallize, harden, and encapsulating the dry-milled coffee particles, thereby further preventing oxidation thereof.

At step 160, the process includes performing a supercritical fluid extraction (SCFE) process on the dry-milled coffee particles (under inert gas conditions and in the absence of oxygen) to extract and recover fats and oils therefrom. In various embodiments, the SCFE process can partially or totally extract fats and oils from the dry-milled coffee particles. In one or more embodiments, the SCFE process can utilize SCFE equipment to perform the partial and/or total extraction of fats/oils. According to one embodiment, the SCFE equipment may be similar to a unit manufactured by Thyssenkrupp GmbH, Buschmuellen Strasse 20, D-58093, Hagen, Germany, under the UHDE brand, Germany Model No. 3x3100. In various embodiments, the SCFE equipment can include extraction cells and/or loading and discharging systems for ensuring the absence of oxygen during the SCFE process.

In at least one embodiment, the SCFE equipment may include two or more extraction columns (e.g., load-charge cylinders) and one or more permeation (filter) columns connected to the two or more extraction columns. In one or more embodiments, the dry-milled coffee particles are loaded into the two or more extraction columns and may be kept at a predetermined SCFE temperature between about 30-90 degrees Celsius. According to one embodiment, the SCFE temperature may be about 40 degrees Celsius.

In various embodiments, the supercritical carbon dioxide may be introduced into the one or more permeation columns at a predetermined SCFE pressure between about 150-450 bar. According to one embodiment, the SCFE pressure may be about 250-350 psig. In at least one embodiment, the supercritical carbon dioxide permeates into the two or more extraction columns and dissolves the dry-milled coffee particles. In various embodiments, the dissolved coffee particles are received by one or more fraction collectors that are pressured and heated to suitable temperatures and pressures that cause fats and oils to precipitate, thereby enabling their extraction from the dissolved coffee particles. Thus, in one or more embodiments, introduction of the supercritical, liquid carbon dioxide causes extraction of the oils and fats from the dry-milled coffee particles. In at least one embodiment, the SCFE process may conclude when the dry-milled coffee particles reach a residual oil percentage at or below a predetermined SCFE threshold. According to one embodiment, the predetermined SCFE threshold may be about 1-7%.

In various embodiments, coffee oil can be separated from the extracted fats and oils. In at least one embodiment, the coffee oil, extracted fats, and other extracted oils can be individually stored under inert gas conditions and in the absence of oxygen. In one or more embodiments, separation may be achieved by the SCFE equipment, for example, via one or more separation mechanisms and one or more fluid collectors. In at least one embodiment, the two or more fluid collectors separate the coffee oil from the extracted fats and oils (including natural and added fats and oils) so that the coffee oil and the extracted fats and oils can be individually stored (e.g., under frozen conditions).

In at least one embodiment, the SCFE equipment can include two or more separation mechanisms that operate under internal, differential and critical (controlled) pressures to separate oils and fats based on differing properties thereof. In one or more embodiments, the separation may be completed due the internal, differential and critical pressures that allow for separation of the supercritical liquid carbon dioxide from the oil due to changes in the pressure inside of the two or more extraction columns.

In various embodiments, the recovered fats and oils (e.g., coffee essential oil and natural or added fats and oils), may be stored under cryogenic conditions and may then be then sprayed back, either at the fluid bed stage during microencapsulation/coating processes (e.g., coating of the wet-milled coffee particles), or to the agglomerated coffee particles during the mixing, homogenization, blending, and/or plasticization processes. In one or more embodiments, previously added fats and oils, or other natural vegetable fat(s) and oil(s) present may also be recovered in pure form during the SCFE and may be reutilized to prepare a new product batch.

According to various aspects of the present disclosure, the fats and oils of the roasted pre-milled biomaterials (e.g., natural essential oil), which have been preserved under cryogenic conditions, may be sprayed back to the product particles at the fluid bed drying stage, during the microencapsulation of the ultra-fine powder, or to the agglomerated granules during the coating phase. In at least one embodiment, extracting the natural essential oils at the beginning of the process and furthermore adding the oils back, after roasting, allows for the taste and flavor provided by the natural essential oils to be preserved, rather than destroyed or degrading during roasting or heating. In some embodiments, essential oils totaling about 14% of the bean (or other biomaterial) mass may be added back to the beans (or biomaterial mass), when appropriate (e.g., during fluid bed coating). In some embodiments, the amount may be less than 14% if less oil is extracted. In other embodiments, the percentage may be based on a type of bean or biomaterial used. As an example, essential oils totaling about 50% fat as cocoa butter may be added back to the beans if cocoa beans are used.

In some embodiments, extracted cocoa butter or other vegetable fat(s) and oil(s) may also be added. In various embodiments, these butters and/or fats and/or oils may be recovered in approximately pure forms during the SCFE phase, through appropriated variations in the system pressure. In certain embodiments, the separated fat may be reutilized in the ribbon blender, whereas the oil may be protected from the process steps until it can be added back at the end of the process, during the fluid bed coating.

At step 170, the process 1000 includes removing the SCFE-treated coffee particles from the SCFE equipment (e.g., the coffee particles located inside of load charge cylinders therein) and storing of the SCFE-treated coffee particles. In one or more embodiments, the removal of the coffee particles may be performed utilizing a scraping device configured to operate under inert gas conditions and in the absence of oxygen. In at least one embodiment, following removal, the SCFE-treated coffee particles may be deposited and stored in intermediary storage tanks.

At step 175-B, the process 1000 includes recovering the extracted coffee oil. In one or more embodiments, the extracted coffee oil can be recovered from the SCFE equipment by one or more separation mechanisms. In at least one embodiment, the extracted coffee oil may be recovered from the SCFE equipment into one or more collection filters connected thereto. In various embodiments, the coffee oil extracted via the SCFE process may be highly purified.

At step 180-B, the process 1000 includes removing the recovered coffee oil from the one or more collection filters (or other receptacle into which the coffee oil is recovered) and storing the coffee oil in one or more coffee oil tanks (e.g., stainless steel vertical tanks) under cryogenic and inert gas conditions. In one or more embodiments, the coffee oil may remain in the one or more coffee oil tanks until the coffee oil may be utilized in other steps of the process 1000 (and other processes discussed herein).

Turning to FIG. 1B, at step 210-B, the extracted coffee oil may be received and stored separate from the extracted fat based on the coffee oil physical state being different from the extracted fat physical state at ambient temperature. In one or more embodiments, while in storage, the coffee oil may remain in one or more oil tanks (e.g., stainless steel tanks) under inert gas atmosphere and kept at a storage temperature while being slowly mixed via scraped-surface mixers configured in each oil tank. In at least one embodiment, additional specialty oils (e.g., additional coffee oil or other oils) may be received and stored into one or more additional oil tanks (under inert gas conditions and at the storage temperature), and the additional specialty oils may be slowly mixed via scraped-surface mixers configured therein.

At step 220-B, the process 1000 includes storing the specialty oil (e.g., coffee oil or other oils) under predetermined temperature conditions. In at least one embodiment, storage can include pumping the coffee oil and/or additional oils to one or more oil storage tanks and storing the coffee oil and/or additional oils in the one or more oil storage tanks under proper temperature conditions (e.g., heated conditions, in some embodiments) until utilization during other steps of the process 1000. In various embodiments, each of the one or more oil storage tanks includes a low-speed scraped-surface-type stirrer that continuously agitates the stored coffee oil and/or additional oils. In one or more embodiments, the one or more storage tanks may be maintained under inert gas conditions at an oil storage temperature dependent on the oil stored to keep the stored coffee oil and/or additional oils in a physical state suitable for utilization at other steps of the process 1000. In one or more embodiments, the oil may be subsequently dosed using positive displacement pump with automatic, pre-set flow control, and may be directed to further processing.

At step 210-A, the process 1000 includes storing the fats and/or oils extracted via the SCFE process. In various embodiments, the extracted fats/oils may be stored in one or more fat tanks (e.g., stainless steel tanks) under inert gas conditions. In at least one embodiment, the extracted fats/oils may be pumped from the SCFE equipment into one or more fat tanks. In one or more embodiments, additional fats/oils may also be stored at step 210-A. For example, additional fats/oils can be pumped into one or more additional fat tanks and stored therein under inert gas conditions.

At step 220-A, the process 1000 includes melting the extracted and stored fats by heating the fats above their melting point. In various embodiments, the extracted fats may be melted with an indirect heating media passed through serpentine melting mechanisms in contact with the extracted fats. In at least one embodiment, the heating media may be water, and the heating media may be heated to a melting temperature above the fat melting point. In one or more embodiments, the extracted fats may be continuously held in a controlled, melted state to prevent over-heating and eventual damage to chemical structures thereof. In various embodiments, the extracted fats may be held in the melted state until utilization of the extracted fats during other steps of the process 1000.

In at least one embodiment, the additional fats stored in one or more additional fat tanks may also be melted (e.g., at step 220A) and held in a melted state until utilization during other steps of the process 1000.

At step 230-A, the process includes storing and, in some embodiments, continuously stirring the melted fats under heated conditions above the fat melting point. In at least one embodiment, the storing can include pumping the melted fats (including the melted extracted fats and additional fats) to one or more melted fat storage tanks and storing the melted fats in one or more melted fat storage tanks until utilization during other steps of the process 1000. In various embodiments, each of the one or more melted fat storage tanks includes a low-speed scraped-surface-type stirrer that continuously agitates the stored fats. In one or more embodiments, the one or more melted fat storage tanks may be maintained under inert gas conditions at a melted storage temperature above the fat melting point to keep the stored fats in a physical state suitable for utilization at other steps of the process 1000. In one or more embodiments, the stored fats may be dosed onto wet-milled coffee particles or other intermediary products described herein.

Returning to FIG. 1A, at step 180-A, the process 1000 includes wet milling the SCFE-treated coffee particles under cryogenic and inert gas conditions and in the absence of oxygen to a predetermined particle size of about 0.1-40.0 microns or about 35.0-40.0 microns (or to less than 40.0 microns). In various embodiments, the wet-milling can include submitting the SCFE-treated coffee particles to an ultra-milling stage of the ultra-mill equipment. In various embodiments, the wet milling of the SCFE-treated coffee particles may create a homogeneous paste (e.g., also referred to as a coffee fraction or coffee liquor) of roasted and ground coffee constituting a semi-finished product. In at least one embodiment, the wet milling can convert the SCFE-treated coarse coffee particles into wet-milled fine coffee particles (e.g., that form the semi-finished product).

In at least one embodiment, the particle size of wet-milled particles may be less than about 30 microns or less than about 40 microns. In one or more embodiments, the particle size may be between about 0.1-40.0 microns. According to one embodiment, the particle size may be between about 0.1-2.0 microns, about 2.0-4.0 microns, about 4.0-8.0 microns, about 8.0-10.0 microns, about 10.0-12.0 microns, about 12.0-14.0 microns, about 14.0-16.0 microns, about 16.0-18.0 microns, about 18.0-20.0 microns, about 20.0-22.0 microns, about 22.0-24.0 microns, about 24.0-26.0 microns, about 26.0-28.0 microns, about 28.0-30.0 microns, about 30.0-32.0 microns, about 32.0-34.0 microns, about 34.0-36.0 microns, about 36.0-38.0 microns, about 38.0-40.0 microns, about 40.0-42.0 microns, about 42.0-44.0 microns, or about 44.0-46.0 microns. In various embodiments, the particle size may be less than about 0.1 microns.

In at least one embodiment, the wet milling may be accomplished using a cryogenic ultra-mill equipment. In various embodiments, the wet milling may be carried out using a cryogenic ultra-mill equipment (for example, similar to equipment manufactured by Hosokawa Alpine, Germany, equipment model MP) or other suitable wet mills, or through a vertical ball mill, operating under cryogenic conditions (for example, similar to equipment manufactured by the Union Process Machines, of Akron, Ohio—USA, manufactured under the Model S-30 Attritor series). In one or more embodiments, during the wet milling, a cryogenic inert gas (such as liquid nitrogen) may be used to maintain a wet-mill processing temperature down to about −190 degrees Celsius and cools the SCFE-treated coffee particles to a pre-wet-milling temperature of about −80 degrees Celsius prior to the wet milling to ensure a glassy (brittle) behavior in the SCFE-treated coffee particles. In at least one embodiment (e.g., such as one involving highly roasted coffee), the wet milling may occur under non-cryogenic conditions by using refrigerated inert gas such that, during the wet milling process, the wet-mill processing temperature and the pre-wet-milling temperature can be maintained below 10 degrees Celsius to prevent the SCFE-treated coffee particles from becoming overheated and ensure glassy (brittle) behavior in the SCFE-treated coffee particles. In at least one embodiment, SCFE-treated coffee roasted with a high roasting profile may be wet-milled under the non-cryogenic conditions.

In one or more embodiments, the wet-milled coffee particles produced from the wet milling may be handled using specialized HEPA filtering equipment to prevent dusting during the handling. In at least one embodiment, the wet-milled coffee particles may be kept under an inert gas condition to prevent rapid aroma deterioration. In one or more embodiments, the cryogenic conditions of the wet milling may allow the wet-milled coffee particles to exhibit electrical colloidal properties. Thus, in various embodiments, the wet-milled coffee particles may behave as colloidal particles electrically charged at the surface. In at least one embodiment, the electrical properties may improve efficiency of processes carried out at other steps of the process 1000, such as coating and hardening processes since the charged behavior improves layer deposition around the wet-milled coffee particles. In various embodiments, during the wet milling, a micronization of the coffee particles can occur. The coffee particles can be dispersed throughout the fat phase (or matrix) in a matrix-type encapsulation.

In one or more embodiments, the wet-milled coffee particles may be subjected to additional wet milling to ensure that particles thereof achieve the desired particle size. In at least one embodiment, the additional wet milling can be carried out using a closed- or semi-closed loop jet mill, cryogenic or refrigerated inert gas mill, or any dry or wet milling-type equipment. In various embodiments, equipment used in the additional wet milling may be similar to equipment manufactured by Fluid Energy, 4300 Bethlehem Pike, Telford, Pa. 18969—USA, and marketed under model Jet-o-Mizer. The equipment may be suitable to operate under cryogenic or refrigerated inert gas closed- or semi-closed loop conditions. According to one embodiment, the additional wet milling may be carried out such that the SCFE-treated coffee particles undergo high-speed inter-particle collisions and the wet-milled coffee particles exhibit the colloidal properties.

Turning to FIG. 1B, at step 310, the process 1000 includes inducing flavor-forming reactions in the wet-milled coffee particles by extruding and/or conching the wet-milled coffee particles (or other pre-refined non-coffee particles). In at least one embodiment, during a processing cycle of about 1-6 hours or about 10 minutes, the wet-milled coffee particles can be pressurized to about 1-5 bar and heated to about 10-80 degrees Celsius while being agitated with an agitation mechanism operating at about 25-150 rpm. In various embodiments, the pressurization, heating, and agitation conches and induces the flavor- and color-forming reactions in the wet-milled coffee or pre-refined non-coffee particles.

According to one embodiment, an extrusion and/or conching process induces and facilitates the completion of one or more flavor- and color-generating reactions in the wet-milled coffee or pre-refined non-coffee particles. In at least one embodiment, the extrusion and/or conching process improves the homogenization of ingredients added thereto (e.g., in other steps of the process 1000). In one or more embodiments, the flavor- and color-generating reactions include, but are not limited to, Maillard reaction or non-enzymatic browning, including Strecker degradations and/or Schiff base. As described herein, Maillard reaction generally refers to a chemical reaction between amino acids and reducing sugars that generates and provides flavor and color compounds to the wet-milled coffee or pre-refined non-coffee particles by a non-enzymatic browning effect. As described herein, Strecker degradations generally refers to chemical reactions that converts, by way of an intermediate, amino acids (such as a-amino acids) into an aldehyde (including the a-amino acid as a side chain) or 2-aminocarbonyl compound or other chemical substance that act as intermediates in the generation of aromas during Maillard reactions. As described herein, a Schiff base (or imine) generally refers to an intermediary product during Maillard reaction, which is involved in the initiation and propagation of the Maillard reaction.

In one or more embodiments, the conching process can be performed in an extruder, such as a double-screw extruder. In at least one embodiment, the extruder can be configured to operate under variable pressures including low- or high-vacuum pressure (e.g., pressure of about –720 torr), medium pressure (e.g., for example pressure of about 1-2 bar or about 14.6 psig), and high pressure (e.g., pressure of about to about 3,500 psig).

In one or more embodiments, at the beginning of the conching process, the wet-milled coffee or pre-refined non-coffee particles may demonstrate a residual moisture content below about 12.5%. In at least one embodiment, the wet-milled coffee particles may be dried or otherwise treated to reduce the residual moisture content thereof below about 12.5%. In various embodiments, the wet-milled coffee or pre-refined non-coffee particles may be loaded into the extruder and the extruder may be depressurized to about 14.6 psig (under inert gas conditions and in the absence of oxygen). In one or more embodiments, the depressurization causes the wet-milled coffee or pre-refined non-coffee particles to expand. In at least one embodiment, following expansion, the wet-milled coffee or pre-refined non-coffee particles can be loaded into the conching system.

In various embodiments, two or more screws of the extruder can continuously agitate the expanded, wet-milled coffee or pre-refined non-coffee particles. According to one embodiment, the two or more screws may include, but are not limited to, threaded screws, rooted screws, crested crews, pitched screws, chamfered screws, and/or specialized dies for providing a particular form or consistency in a conched, wet-milled coffee or pre-refined non-coffee particles produced from the conching process. In at least one embodiment, the extruder can be configured (e.g., via jackets, etc.) to operate under cryogenic conditions and/or at temperature between about 10-70 degrees Celsius. In one or more embodiments, the two or more screws may agitate (e.g., conche) the expanded, wet-milled coffee or pre-refined non-coffee particles for a processing time up to about 1 to 6 hours and at a processing temperature of about 10-70 degrees Celsius, thereby inducing and facilitating the completion of the Maillard reaction. In various embodiments, the agitation performed by the two or more screws conches the expanded, wet-milled coffee or pre-refined non-coffee particles, thereby causing emission of volatiles and other substances that are recovered, stored, and utilized in other steps of the process 1000 as described herein.

In some embodiments, the conching process can include processing the wet-milled coffee or pre-refined non-coffee particles through conching equipment including, but not limited to, a conche system (for example, similar to a conche system supplied by Buehler AG, Uzwil, Switzerland) configured for conching process conditions described herein. In one or more embodiments, the conching process can include only extruder-based processes or only conche system-based processes, or may include both processes, the conche system-based processes being performed on output of the extruder-based processes.

Figure 6:
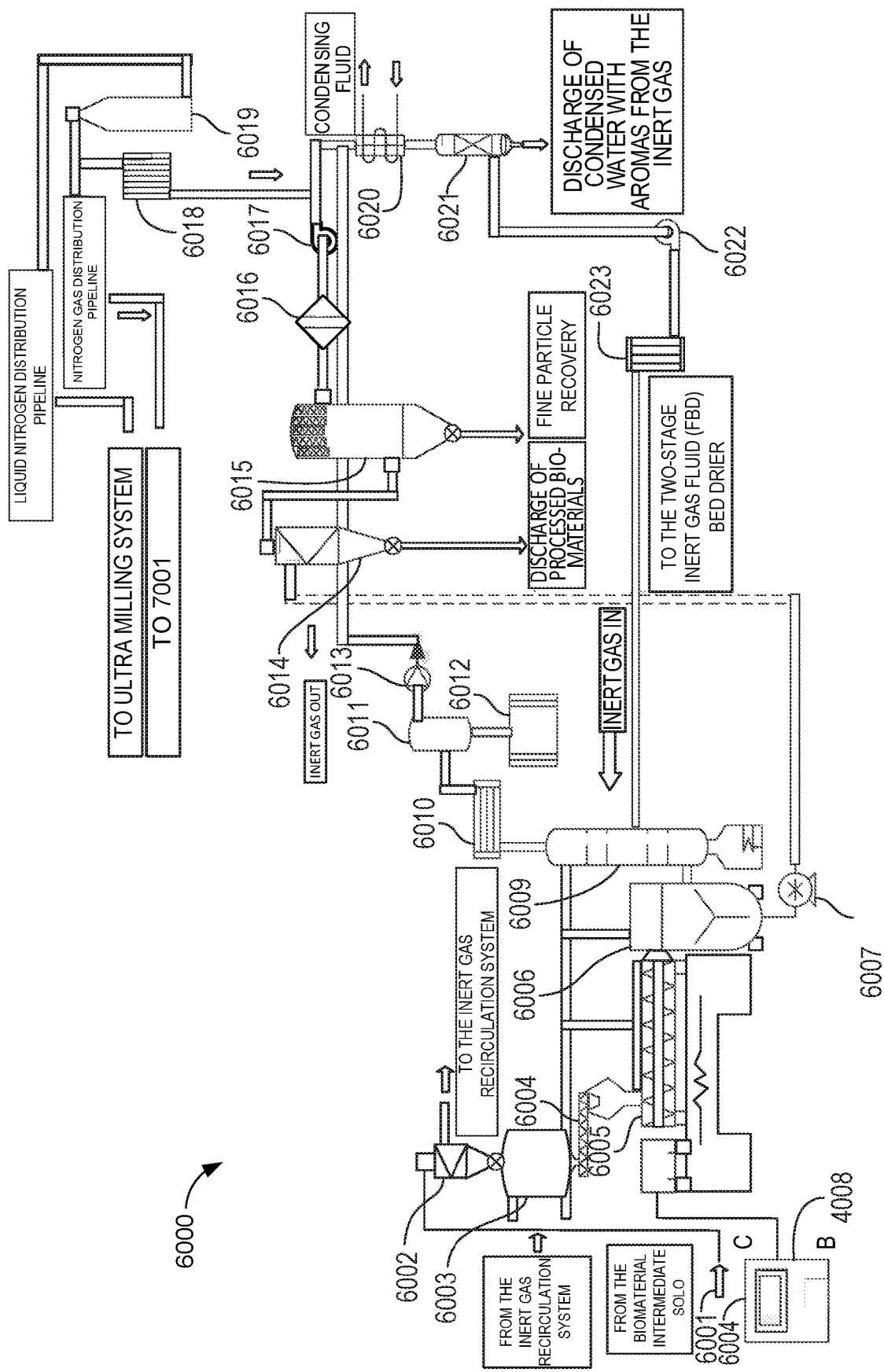
FIG. 6 illustrates an exemplary conche, distillation, and condensation (CDC) system, according to one embodiment of the present disclosure.

In at least one embodiment, the conche system can be configured to operate under inert gas conditions and in the absence of oxygen. In one or more embodiments, the conche system may subject wet-milled coffee particles to conditions including, but not limited to: 1) distinct processing temperature profiles from about 10-80 degrees Celsius or about 10-70 degrees Celsius; 2) operating pressures from about 1-5 bar or about 1-2 bar; 3) processing cycles from about 1-6 hours, or about 10 minutes; 4) agitating shaft rotations at speeds of about 25-150 rpm or about 50 rpm with reverse shaft rotation capabilities; 5) agitating paddles configured to rotate and counter rotate throughout the conching process as described herein; 6) processing times of about 2-7 hours; and 7) injection of condensable stripping inert gases (i.e., overheated inert steam at a minimum of 1-5% by weight of the wet-milled coffee particles) to enable a cryogenic-type aroma recovery of flavor volatiles emitted from the wet-milled coffee particles. In one or more embodiments, the conching equipment may include a conche, distillation, and condensation system described in 6000 (FIG. 6).

In one or more embodiments, the conche system processes and conches the wet-milled coffee or pre-refined non-coffee particles in one or more solid phase reactors and/or industrial conche including an agitating mechanism (e.g., a controllable rotating screw). In various embodiments, the conche system conches the wet-milled coffee or pre-refined non-coffee particles according to the parameters and conditions described herein, thereby inducing and facilitating the completion of the Maillard reaction and causing the emission of volatiles, aromas, and other substances.

In at least one embodiment, the conche system or extruder is connected to a recovery system including one or more fractionating distillation columns. In various embodiments, each fractionating distillation column includes one or more stages. In one or more embodiments, such a stage may include a steam stripping-off system that collects and removes volatiles and other substances associated with off-flavors, thereby eliminating the off-flavors from the conched, wet-milled or pre-refined particles. In at least one embodiment, the base of one or more distillation columns may be connected to an outlet of the conche system or extruder, thereby allowing the passage of volatiles and other substances to the recovery system. In one or more embodiments, the recovery system includes a number of trays (e.g., 3-5 trays). In at least one embodiment, each tray can be connected to a tray outlet and/or a separation outlet designed for fractional condensation of volatiles, aromas, and other substances (under inert gas, vacuum and/or refrigerated/ cryogenic conditions). In certain embodiments, the tray outlets and/or separation outlets may converge to the trays for aroma fractionation and recovery. In one or more embodiments, the recovery system may be similar to an EPIC Processing Systems machine, a manufacturer located at 4141 Meramec Bottom Rd, St. Louis, Mo., USA.

In some embodiments, the conche system or extruder may include a mechanism for facilitating extraction and recovery of volatiles, aromas, and other substances (e.g., in condensable gas form) that are emitted by the conched, wet-milled coffee or pre-refined non-coffee particles. In one or more embodiments, the mechanism injects inert gases from the conche system or extruder into one or more fractionating distillation columns of the recovery system. In at least one embodiment, the injected inert gases contain the volatiles, aromas, and other substances emitted by the conched, wet-milled coffee or pre-refined non-coffee particles. In one or more embodiments, super-heated steam (SHS) of a predetermined quantity can be injected through one or more fractionating distillation columns, thereby stripping, in condensable gas form, the volatiles, aromas, and other substances from the injected inert gases. In one or more embodiments, the predetermined quantity of SHS may be about 1-5% by weight of the wet-milled coffee or pre-refined non-coffee particles. In one or more embodiments, the SHS (including the volatiles, aromas, and other substances) can pass from one or more fractionating distillation columns into one or more cryogenic-type condensers for condensing and recovering the volatiles, aromas, and other substances.

In at least one embodiment, the recovery system coupled to the conche system or extruder may be utilized as a stand-alone fractionated distillation column (or set thereof) for the recovery of volatiles, aromas, and/or other substances from the conched, wet-milled coffee or pre-refined non-coffee particles. In various embodiments, the recovery system can include equipment utilized in chemical, perfumery and cosmetic processing. In one embodiment, the equipment can be similar to equipment available by Bufflovak LLC, of Buffalo, N.Y., USA. In various embodiments, the equipment may be utilized for the cryogenic recovery of volatiles and product add-back of several volatiles that escape through the gas stripping during drying processes of the conching process.

In one or more embodiments, flashing includes partially evaporating a saturated liquid stream (e.g., condensed from recovered inert gases) to reduce a pressure thereof and cause formation of partial (e.g., flashed) vapor that contains volatile compounds that may be in a higher concentration, in the vapor, than in the liquid stream. In at least one embodiment, the flashing can be performed by passing the liquid stream through a throttling device (e.g., a throttling valve) that reduces the pressure (e.g., a vapor pressure) of the stream.

At step 275, the process 1000 includes flashing volatiles, aromas, and other substances present in the inert gases recovered from the conching processes described herein. In one or more embodiments, the flashing may be carried out for the recovery of the volatiles, aromas, and other substances that are emitted during conching processes and/or extrusion processes. In various embodiments, the conche system and/or extruder includes flashing equipment connected to a vent line of the conche system and/or extruder. In one or more embodiments, the equipment may include, but is not limited to, flashing mechanisms and one or more fractioning distillation columns for the recovery of aromatics from the flashed volatiles, aromas, and other substances under cryogenic conditions. In at least one embodiment, the equipment may be equipment utilized in the chemical, perfumery and cosmetic processing industry, and similar to commercially available machines through companies such as Bufflovak LLC, of Buffalo, N.Y.

At step 285, the process 1000 includes fractionating and/or distilling volatiles, aromas, and other substances from the wet-milled coffee or pre-refined non-coffee particles emitted during the conching process described herein. In various embodiments, volatiles distillation and/or fractionation may include equipment which may be connected to a vent line of the special conche. In one or more embodiments, the equipment may include, but is not limited to, a fractionated/distillation column for the recovery of aromatics under cryogenic conditions. In at least one embodiment, the equipment may be equipment utilized in the chemical, perfumery and cosmetic processing industry, and similar to commercially available machines through companies such as Bufflovak LLC, of Buffalo, N.Y.

At step 295, the process 1000 includes storing recovered aromas, distillates, and other substances individually and under cryogenic conditions. In various embodiments, the recovered distillates may be stored in cryogenic tanks for further utilization during add-back processes described herein. In one or more embodiments, the distillates may be utilized for the cryogenic recovery of volatiles and product add-back of several volatiles that may escape through the gas stripping during the one or more drying stages of the conching process described herein.

Returning to FIG. 1, at step 190-A, the process 1000 includes encapsulating the wet-milled coffee with additional oils and fats and/or other ingredients to create microencapsulated coffee particles. In various embodiments, as used and described herein, "encapsulation" and "microencapsulation" typically refer to encapsulating one particle or multiple particles in one or more substances (e.g., solutions, fats, oils, other food ingredients, etc.), and "coating" can refer to coating multiple, agglomerated particles or single particles. In one or more embodiments, encapsulation, microencapsulation and coating (and derivatives thereof) can be used interchangeably herein.

In one or more embodiments, the other ingredients and/or additives may include, but are not limited to, sugar, dairy ingredients and other substances to diversify potential end-products and applications for the encapsulated coffee particles. In at least one embodiment, the fats and oils can include, but are not limited to: 1) natural or deodorized cocoa butter or other suitable oils or fats; 2) medium chain triglyceride (MCT) coconut-fractionated or other drupe-based fats and/or oils; 3) fruit-derived oils and/or fat extractions; 3) nut-derived oils and/or fat extractions; 4) seeds-based oil and/or fat extractions; 5) cereal-based oil and/or fat extractions; 6) animal-derived oils and/or fats, such as butter oil and/or ghee; and 7) melted and stored fats and/or oils, such as the fats and/or oils stored and melted at step 230-A. In at least one embodiment, the oils and/or fats may be in refined, bleached, and deodorized (RBD) form, and may have been cold- or hot-pressed.

In various embodiments, the wet-milled coffee particles can be mixed or blended with a predetermined quantity of the oils and fats and/or other ingredients. In at least one embodiment, the predetermined quantity may be about 0.5-15% by weight of the wet-milled coffee particles. In one or more embodiments, the mixing or blending can be performed using mixing equipment including a ribbon- or sigma-type blender or mixer (or another suitable type of blender or mixer) configured to operate under a closed or semi-closed loop and use a vacuum modified atmosphere of inert gas(es). In at least one embodiment, the mixing equipment can be configured such that atmospheric oxygen (or any oxygen) does not contact the wet-milled coffee particles during the mixing or blending. According to one embodiment, the mixing and/or blending can be performed at speeds of about 20-150 revolutions per minute (rpm), about 100 rpm, or about 10-100 rpm and in capacities up to about 5 kg, up to about 50 kg, or up to about 15,000 kg per processing run (though greater capacities are also contemplated). In one or more embodiments, the mixing equipment can perform the mixing or blending via rotating double-helices that controllably rotate within the mixing equipment (e.g., at the speeds between 20-150 rpm or 10-100 rpm). In at least one embodiment, when melted and stored fats are utilized, the melted and stored fats can be pumped from one or more fats storage tanks into the blender or mixer (or by internal spraying mechanisms thereof) using positive displacement pumps with automatic, pre-set flow controls.

In various embodiments, the fats and oils and/or other ingredients can be added (e.g., mixed or blended in a predetermined quantity) at step 155 as described herein. In at least one embodiment, a first portion of the fats and oils can be extracted with coffee oil from the dry-milled coffee particles at step 160 and a second portion of the fats and oils can remain in the dry-milled coffee particles (e.g., and may or may not be removed during wet-milling processes described herein).

In at least one embodiment, the wet-milled coffee particles can be received in a hermetically sealed interior chamber. In one or more embodiments, the mixing equipment can include an internal spraying mechanism including one or more ultra-fine, double-fluid, atomizer-type nozzles arranged in the interior chamber. In various embodiments, the internal spraying mechanisms can be connected to reservoirs of the oils and/or fats and/or other ingredients. In at least one embodiment, the one or more ultra-fine, two-fluid nozzles can automatically and controllably spray, mist or flow the fats and/or oils and/or the other ingredients into the interior of the mixing equipment and onto the wet-milled coffee particles.

In at least one embodiment, the spray system can controllably spray the fats and/or oils and/or the other ingredients into the interior chamber, thereby encapsulated the wet-milled coffee particles to create encapsulated coffee particles. In one or more embodiments, the spray system can spray the fats and/or oils and/or the other ingredients in a quantity of about 0.5 to 15%, or up to about 200%, by weight of the wet-milled coffee particles. In at least one embodiment, the spray system may spray the fats and/or oils and/or the other ingredients as finely dispersed droplets (e.g., with average drop sizes of up to 100 microns).

In at least one embodiment, the spray system can perform the spraying in one or more running cycles of a predetermined duration (e.g., 1-100 minutes). In one or more embodiments, a predetermined number of one or more running cycles may be performed as a processing run. In one or more embodiments, before, during, and after a processing run, the walls of the internal chamber of the mixing equipment may heat the wet-milled (or coated) coffee particles to a heating temperature equal to a melting point of the fats and/or oils (e.g., about 90 degrees Celsius for some fats and/or oils) and/or cool the wet-milled (or coated) coffee particles to a cooling temperature less than a melting point of the fats and/or oils (or about 10 degrees Celsius). In at least one embodiment, the walls may include or interface with heating and cooling elements to cause the heating and cooling. In various embodiments, during a single processing run, the wet-milled (or coated) coffee particles can be held at the heating temperature for a predetermined heating time period and held at the cooling temperature for a predetermined cooling time period.

At step 195, the process 1000 includes agglomerating and/or microencapsulating the coated coffee particles (or wet-milled coffee particles) with food ingredients and/or additives to create a coffee fraction. In one or more embodiments, the agglomerating and/or microencapsulating protects coffee fraction from oxidation and enhances the dispersibility and stability during the preparation of the coffee fraction (e.g., in liquid dispersions). According to one embodiment, the coated coffee particles may only be agglomerated. According to one embodiment, the coated coffee particles may only be microencapsulated.

Figure 7:
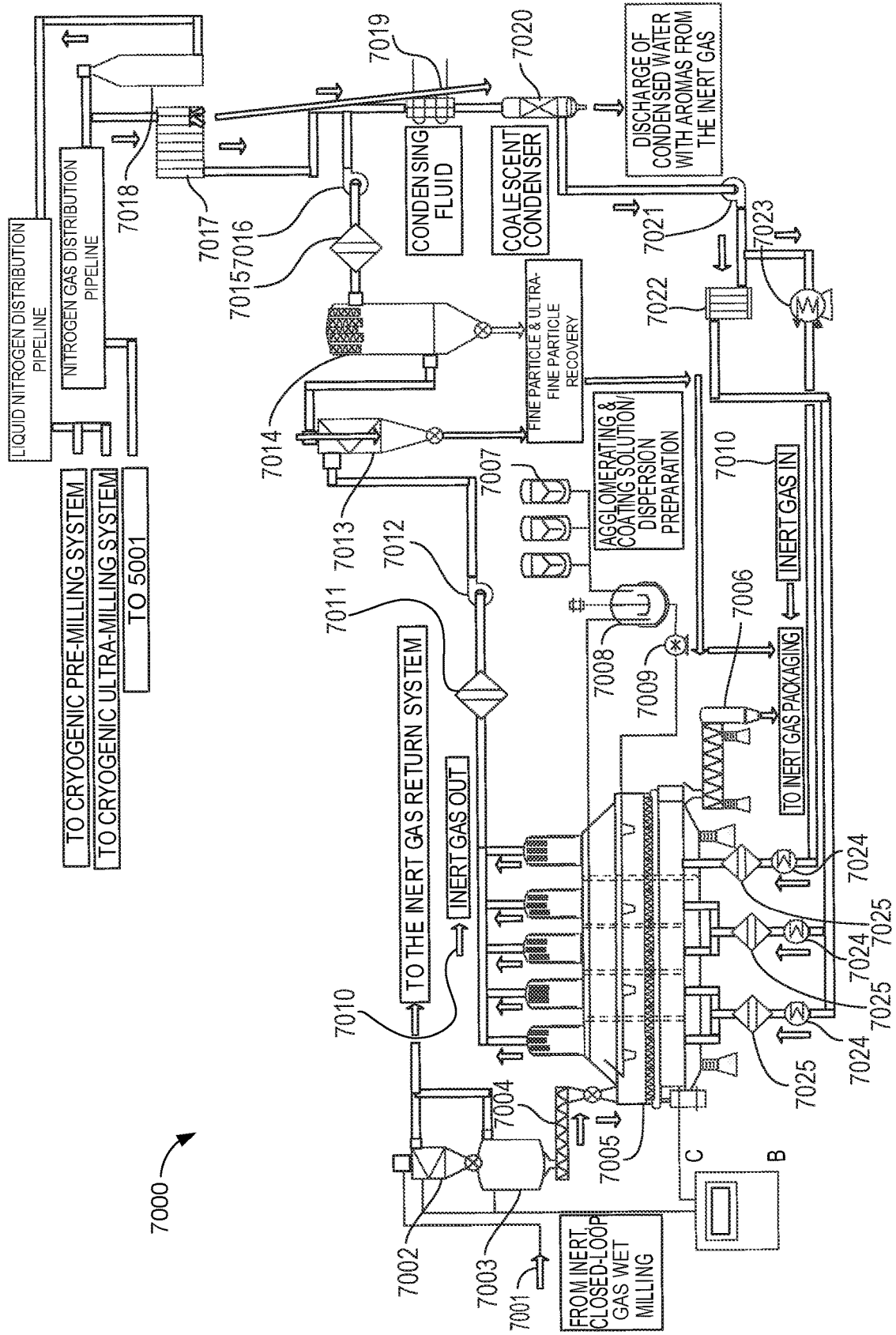
FIG. 7 illustrates an exemplary drying, agglomeration, and coating (DAC) system, according to one embodiment of the present disclosure.

In at least one embodiment, the agglomerating and the microencapsulating can occur within the same equipment. In various embodiments, the equipment can include, but is not limited to, a closed- or semi-closed loop fluid bed drier (FBD). In at least one embodiment, the equipment may include a drying, agglomeration, and coating system 7000 (FIG. 7). In one or more embodiments, the FBD can be configured to controllably dry and cool the coated coffee particles.

In at least one embodiment, the agglomeration can include, but is not limited to: 1) pre-wetting the coated coffee particles with controlled dispersions of water or aqueous solutions at (e.g., that may be at a cold or hot temperature); 2) loading the coated coffee particles into the FBD; 3) agglomerating the coated coffee particles into an agglomerated coffee mass by iteratively wetting and drying the coated coffee particles; and 4) drying the agglomerated coffee mass. In at least one embodiment, the agglomerated coffee mass can be dried by leaving the agglomerated coffee mass within the FBD for a predetermined drying period (e.g., thereby allowing the agglomerated coffee mass to dry). In one or more embodiments, drying the agglomerated coffee mass can include performing residual dehydration by providing dried and low relative humidity conditions inside the FBD. In at least one embodiment, the residual dehydration can prevent the coffee mass from adhering to the FBD interior (and, in some embodiments, to itself). In one or more embodiments, during the agglomerating and the microencapsulating, the FBD can be configured to operate under heated (or refrigerated) inert gas conditions in the absence of oxygen. In various embodiments, the agglomerating can occur on a batch or continuous basis.

In some embodiments, the microencapsulating can include directly spraying the agglomerated coffee mass (or coated coffee particles) with suitable food ingredients and/or additives that (further) microencapsulate coffee particles of the agglomerated coffee mass. In one or more embodiments, the suitable food ingredients and/or additives for microencapsulation may include, but are not limited to, coconut oil and its fractions, palm kernel oil and its fractions, and other materials. In at least one embodiment, the suitable food ingredients and/or additives may be included in their refined, bleached, and deodorized forms, or may be included in one or more other forms. In one or more embodiments, the microencapsulating can confer improved dispersibility and stability to the agglomerated coffee mass (or coated coffee particles).

In some embodiments, the process may be carried out in the FBD (e.g., the FBD being configured to operate under refrigerated inert gas and dehumidified environment conditions). In various embodiments, the FBD can be configured to perform the microencapsulating in batches or continuously. In at least one embodiment, the FBD can include freeze-drying elements that can freeze-dry the agglomerated coffee mass (or derivative thereof).

In various embodiments, the spraying mechanism includes one or more ultra-fine, double-fluid, atomizer-type nozzles arranged in the interior of the FBD. In at least one embodiment, the one or more ultra-fine, two-fluid nozzles can automatically and controllably spray, mist or flow the food ingredients and/or additives onto the agglomerated coffee mass. In one or more embodiments, the spraying mechanism can spray the food ingredients and/or additives in a quantity of about 0.5 to 15%, or up to about 200%, by weight of the agglomerated coffee mass. In at least one embodiment, the spray system may spray the ingredients and/or additives as finely dispersible droplets (e.g., with average drop sizes of up to 100 microns). In at least one embodiment, the ingredients and/or additives can be pulverized into a microencapsulating solution and/or dispersion (e.g., through the spraying system via the one or more two-fluid nozzles).

In at least one embodiment, the spraying mechanism controllably and continuously (or on a batch basis) sprays the microencapsulating solution onto the agglomerated coffee mass (or coated coffee particles) to apply a film coating thereto that microencapsulates coffee particles therein. In at least one embodiment, the microencapsulating solution can be sprayed in a quantity measuring about 0.5-15% by weight of the agglomerated coffee mass. In various embodiments, the quantity may be selected to accommodate a desired level of coating protection to the coffee fraction created from the agglomerated coffee mass. In one or more embodiments, the quantity may be selected to provide, in a product derived from the coffee fraction, desirable physical and/or chemical properties. In one example, the desirable physical and/or chemical properties include a predetermined solubility or dispersion property when the product is dispersed into liquids or foods of particular temperatures (e.g., hot or cold).

In at least one embodiment, additional oils and/or fats can be pumped to the spraying system and sprayed onto the agglomerated coffee mass during microencapsulating. In one or more embodiments, the additional oils and/or fats can include, but are not limited to: 1) stored fats and coffee oils extracted during the roasting processes described herein; and 2) other stored specialty fats and/or oils described herein. In various embodiments, the additional oils and/or fats can be sprayed in a quantity of about 1-30% by weight of the agglomerated coffee mass.

In at least one embodiment, following the agglomerating and microencapsulating, coffee particles of the coffee fraction may each include a coating of a predetermined mass. In one or more embodiments, the predetermined mass may be up to 5% by weight of the coffee particle.

In at least one embodiment, following the agglomerating and microencapsulating, the coffee fraction can be cooled. In one or more embodiments, the coffee fraction can be controllably cooled using a two-stage vibratory fluid bed cooler (FBC). According to one embodiment, the FBC can be included in the FBD described herein. In various embodiments, the FBD may be configured to operate in a closed- or semi-closed loop under inert gas conditions and in the absence of oxygen. In at least one embodiment, the FBC may be similar to a standard model of the Food and Pharma Line, manufactured by Witte, 507 Rt. 31 S. Washington, N.J.—07882—USA.

In various embodiments, the coffee fraction can be cooled to a first cooled temperature between about 50-100 degrees Celsius or about 65-75 degrees Celsius for a first cooling period of about 1 minute. In one or more embodiments, following the first cooling period, the coffee fraction can be cooled to a second cooling temperature of about 18-25 degrees Celsius (e.g., ambient temperatures). In at least one embodiment, the FBC may achieve the cooling by applying pressurized blows of cooled inert gas to the coffee fraction while a vibratory screen (upon which the coffee fraction is placed) transports the coffee fraction through the FBC. In some embodiments, the cooled coffee fraction may be loaded into a tote bin box and system (e.g., to facilitate the loading of the coffee fraction into silos for primary packaging) under inert gas conditions and in the absence of oxygen.

At step 200, the process 1000 includes storing the coffee fraction (in some embodiments, the particles thereof being microencapsulated within a coating that may be hardened, for example, based on oils utilized in previous processes). In various embodiments, the coffee fraction may be a mass with a variable percentage of coffee particles. In at least one embodiment, the coffee fraction may be maintained in the package state until utilized in other steps of the process 1000 described herein.

In some embodiments, the coffee fraction may be packaged under a wide range of packing options, including (but not limited to) aluminum-plastic complex, BOPP, paper, plastic, glass, metal or combinations thereof. In various embodiments, the coffee fraction may be packed under inert gas, vacuum compensated or vacuum conditions, to provide and maintain a selected shelf-life (e.g., at least 1 year). In at least one embodiment, a purpose of the above packaging may be to protect the coffee fraction from staling or other deleterious activities (e.g., such as those that may arise from coating imperfections that may occur during the coating and other processes described herein.

Turning to FIG. 1B, at step 210-C, the process 1000 includes receiving and storing non-coffee ingredients. In one or more embodiments, the non-coffee ingredients may include, but are not limited to: 1) sugars and other carbohydrates; 2) reducing sugar counterparts; 3) dairy derivatives; 4) vegetable derivatives; and 5) other non-coffee ingredients. In various embodiments, the non-coffee ingredients may be received in and emptied from container and may be stored until utilization during other steps of the process 1000. In at least one embodiment, the non-coffee ingredients may be stored under cryogenic or refrigerated conditions.

At step 240, the process 1000 includes pre-refining sugars and/or other non-coffee ingredients. In various embodiments, the sugars and/or other non-coffee ingredients may be retrieved from storage and pre-milled to about 180 microns.

In at least one embodiment, the pre-milling (or pre-refining) can be performed in milling equipment including dry or wet impact-type mills equipped with predetermined mesh-sized screens (e.g., 5.5 mm, 6.5 mm, and 8.0 mm). According to one embodiment, the sugars are loaded into the milling equipment and pre-milled to an average particle size of about 180 microns. In one or more embodiments, the pre-milling may transform a stable, crystalline structure of sugars particles into an unstable, amorphous structure. In various embodiments, the unstable, amorphous structure provides improved and/or increased thermochemical reactiveness at a surface level of the sugar particles, thereby increasing their reactivity with amino groups of the amino acids and proteins present in other non-coffee ingredients that are used, in combination with the sugars, to form a non-coffee fraction. In at least one embodiment, the transformation of the structure of the particles may improve a speed and/or intensity of the Maillard reaction taking place during a conching or extrusion process described herein.

In various embodiments, up to about 50% by weight of the sugar (e.g., in crystalline structure) is substituted with a quantity of reducing sugar counterparts to form a sugar blend that is pre-refined as described herein. In at least one embodiment, the quantity of reducing sugar counterparts may be selected to provide a sweetness level equivalent to the substituted mass of the sugar. In one or more embodiments, the sugar blend improves an intensity and speed of a Maillard reaction occurring, for example, in a solid-phase reactor of a conching process. In one or more embodiments, non-coffee ingredients such as dairy derivatives and vegetable derivatives may be pre-milled. In at least one embodiment, certain non-coffee ingredients may not require to undergo pre-milling step, as they either are not directly involved in the flavor- and color-forming reactions, or may be present in particle sizes that are adequate for the process to take place.

At step 250, the process 1000 includes pre-mixing the pre-refined sugar and other non-coffee ingredients to create a non-coffee pre-mixture. In at least one embodiment, the pre-refined sugar and other non-coffee ingredients can be combined and mixed at about 20-150 rpm for a predetermined time period up to about 1 hour and while being heated to a melting point of the other non-coffee ingredients, which can be about 45-90 degrees Celsius in some embodiments.

In one or more embodiments, the pre-refined sugar and other non-coffee ingredients may be weighed and loaded into a pre-mixer. In one or more embodiments, the pre-mixer may be a sigma- or ribbon-type blender or mixer configured to operate under vacuum or inert gas conditions and in the absence of oxygen. In at least one embodiment, the pre-mixer includes double-helical mixing elements. In various embodiments, the pre-mixer pre-mixes the pre-refined sugar and other non-coffee ingredients at about 20-150 rpm for up to about 1 hour while heating (e.g., via heating elements) the pre-refined sugar and other non-coffee ingredients to a melting point of the other non-coffee ingredients or, in some embodiments, about 45-90 degrees Celsius. In at least one embodiment, the pre-mixing can be performed in batches with an individual capacity up to about 15,000 kg (though greater capacities are also contemplated).

In at least one embodiment, an exemplary formulation of the pre-mixture formed during pre-mixing includes, but is not limited to: 1) about 20-60% natural or RBD fat and/or oil (or cocoa butter substitute or equivalent); 2) about 0-60% pre-refined sugars; 3) about 0.1-60.0% sweeteners; 4) about 0-10% dairy derivatives; 5) about 1-60% protein and/or carbohydrates; 6) about 0-20% cocoa and/or other chocolate ingredients; 7) about 1-30% filler ingredients; 8) about 1-60% other fats and/or oils; 9) about 1-30% other carbohydrates and/or fibers; 10) up to about 5% additives and/or other micro-ingredients; and 11) up to about 10% nutrient sources, vitamins, minerals, zoo- and/or phytochemicals, and/or other bioactive ingredients; and 12) up to about 5% bio-inactive ingredients.

At step 260, the process 1000 includes dual-extrusion of the non-coffee pre-mixture and recovering aromas therefrom to create a non-coffee mass. In at least one embodiment, the process parameters used to form the non-coffee mass allow for high-throughput, homogeneous production formulations. In at least one embodiment, the non-coffee pre-mixture can be pressurized to about 1-5 bar, heated to a melting point of one or more of the non-coffee pre-mixture elements (or about 1-90 degrees Celsius in some embodiments), and agitated for about 10 minutes or about 5-6 hours, thereby inducing and facilitating the completion of one or more flavor-forming reactions and forming the non-coffee mass.

In at least one embodiment, by processing the non-coffee pre-mixture as described herein, the flavor-forming reactions can be induced and improved for reasons including, but not limited to: 1) the non-coffee pre-mixture can demonstrate a residual moisture of less than about 1.5%, thereby favoring the flavor- and color-forming reactions; 2) subjecting the non-coffee pre-mixture to high-process shearing, impacting, and friction (from the agitation) and high temperature facilitates the flavor- and color-forming reactions; and 3) a relatively low-fat content of certain non-coffee pre-mixtures provides for efficient reactive surfaces in solid particles of the non-coffee pre-mixture that increase solid phase reactions, thereby intensifying the flavor- and color-forming reactions.

In at least one embodiment, to form the non-coffee mass, the non-coffee pre-mixture can be loaded into a feed hopper that feeds a dual-extruder via an auger feeder equipped with a feed throat that controls the feeding and/or flow into the extruder. In one or more embodiments, the dual-extruder and components connected thereto can be configured to operate under inert gas conditions and in the absence of oxygen. In at least one embodiment, the dual-extruder may be designed to induce the flavor- and color-forming reactions by means of efficient solid phase reaction initiated by heating and agitating the non-coffee pre-mixture.

In various embodiments, the dual-extruder can include, but is not limited to: 1) a structure including a heavy bed plate where six heavy steel supporting columns may be attached to the dual-extruder (e.g., four for a main twin barrel and two for other elements of the dual-extruder); 2) a screw driver motor equipped with a frequency inverter; 3) a reducing gearbox; 4) the feed hopper; 5) a central panel equipped with a number of essential controls including, but not limited to: A) switches for controlling one or more motors; B) controls of band heaters; C) thermostat, thermistor, and/or thermocouple control switches; D) cryogenic gas expansion valves for a cooling system and/or a piping and instrumentation diagram (PID); E) twin barrel temperature gauges; 6) heating and cooling element controls; 7) the twin barrel including, but not limited to, twin intermeshing screws and efficient systems for both cooling and heating (e.g., per each section of twin screws located along an interior of the barrel); 8) pressure gauges for main reaction areas of the twin barrel, the feed hopper, and an armored revolving screw changer; 9) rotatable inputs and outputs; 10) metering pumps for precise dosing of the non-coffee pre-mixture and other ingredients; 11) feed rate inputs and outputs; 12) a screw torque control; 13) a pipe (or other) die including a die temperature control; 14) a die temperature, rotary knife cutting system; and 15) other safety controls.

In at least one embodiment, the system can precisely control the temperature of the twin barrel between about 1-90 degrees Celsius (or about a pre-mixture element melting point). In one or more embodiments, the twin barrel can be pressurized at about 1 to 5 bar.

In various embodiments, the twin barrel may include, but is not limited to: 1) the twin screws that intermesh to agitate the non-coffee pre-mixture; 2) removable liner for a barrel cover; 3) pressure gauges and sensors located in key transition processing areas of the twin barrel; and 4) insertion areas where ingredients can be added directly in the barrel (e.g., respectively for eventual addition of various/special reactants and for heat-sensitive additives); and 5) an opening to the twin barrel that can be hermetically sealed via the barrel cover. In at least one embodiment, the twin screws can include modifications of one or more aspects including, but not limited to: 1) a screw root; 2) a channel width; 3) a flight; 4) an axial flight width; 5) one or more helix angles; 6) a pitch, such as a variable pitch; 7) a screw clearance; 8) a barrel length; and 9) a barrel diameter. In one or more embodiments, the twin screws may provide more precise and/or controllable solid phase reaction rates, times, and/or temperatures.

In one or more embodiments, a natural vacuum-based degassing port system may be included at an edge of the twin-screw barrel. In various embodiments, the degassing port system may be configured for rapid degassing and volatilization. In at least one embodiment, the degassing port system may be built-in in a breaker plate from where the non-coffee mass may exit in a closed loop chamber with a stream of inert gas that may mix with exhausting gas, and may be directly coupled to a fractionation column for off-flavors vent and volatiles (cryogenic) recovery. In at least one embodiment the breaker plate can include, but is not limited to, an extrusion head, the pipe die, a screen pack, and the rotary knife cutting system.

In various embodiments, the dual extruder can include a secondary vacuum sizing system. In one or more embodiments, the secondary vacuum sizing system may be directly coupled at an outlet of the dual extruder. In at least one embodiment, the secondary vacuum sizing system allows for the solid phase and flavor-forming reactions to occur under vacuum and also allows for the reactions to be cooled with circulation of cooled refrigerant gas. In at least one embodiment, the secondary vacuum sizing system may further facilitate control of end-process reactions and aroma recovery. In at least one embodiment, the dual extruder can include a recovery system (as described herein) that allows for fractionating distillation and cryogenic recovery of volatiles, aromas, and other substances emitted from the non-coffee pre-mixture during the solid phase and flavor-forming reactions. In one or more embodiments, the volatiles, aromas, and other substances can be flashed at step 275, cryogenically distilled at step 285, and recovered and stored at step 295 for further utilization in other steps of the process 1000.

In at least one embodiment, the non-coffee mass (and particles thereof) can be conched according to one or more processes carried out at step 310 and described herein.

At step 320, the process 1000 includes wet milling the non-coffee mass to a predetermined particle size of less than about 30 microns, about 0.1-40 microns, or below 40 microns under cryogenic and inert gas conditions and in the absence of oxygen. In at least one embodiment, an output of the wet milling is a non-coffee fraction. In one or more embodiments, the wet milling can be performed in a ball mill, such as a vertical ball mill, configured for cryogenic and inert gas operation in the absence of oxygen. In at least one embodiment, the ball mill uses a first set of milling balls and a second set of milling balls. In at least one embodiment, the first set of milling balls can include a diameter of about 0.5 mm and the second set of milling balls can include a diameter of about 0.7 mm. According to one embodiment, the non-coffee mass can be loaded into the ball mill (or other suitable milling system).

At step 320, the process 1000 includes wet milling the non-coffee mass to a predetermined particle size of less than about 30 microns, about 0.1-40 microns, or below 40 microns under cryogenic and inert gas conditions and in the absence of oxygen. In at least one embodiment, an output of the wet milling is a non-coffee fraction. In one or more embodiments, the wet milling can be performed in a ball mill, such as a vertical ball mill, configured for cryogenic and inert gas operation in the absence of oxygen. In at least one embodiment, the ball mill uses a first set of milling balls and a second set of milling balls. In at least one embodiment, the first set of milling balls can include a diameter of about 0.5 mm and the second set of milling balls can include a diameter of about 0.7 mm. According to one embodiment, the non-coffee mass can be loaded into the ball mill (or other suitable milling system).

In various embodiments, the non-coffee mass can be cooled through direct contact with cryogenic, inert gas to about −80 degrees Celsius (or a lower temperature). In at least one embodiment, the cooling may only be performed if the non-coffee mass was conched (e.g., at step 310 or elsewhere). In one or more embodiments, the cryogenic inert gas can be sprayed via a spraying mechanism configured inside a screw conveyor that feeds the non-coffee mass into the ball mill. In one or more embodiments, the milling can be initiated when the non-coffee mass reaches about −80 degrees Celsius (or a lower temperature) and is in a glassy (brittle) state. In at least one embodiment, the wet milling may be performed at about 250 rpm for a predetermined milling period of about 20 minutes. According to one embodiment, the output non-coffee fraction demonstrates an average particle size less than about 30 microns.

At step 330-A, the process 1000 includes storing the non-coffee fraction and fats extracted therefrom (e.g., during conching processes and other processes described herein). In one or more embodiments, non-coffee fraction is pumped to one or more tanks each including low-speed scraped-surface-type stirrers that continuously agitate the non-coffee fraction. In at least one embodiment, the one or more tanks maintain the non-coffee fraction under inert gas atmosphere at a temperature above the melting point of the fats and/or oils used. In one or more embodiments, the non-coffee fraction may be subsequently dosed using positive displacement pump with automatic, pre-set flow controls, and may be directed to further processes described herein.

At step 190B, the process 1000 includes adding extracted and stored coffee oil to a blending, homogenization, and plasticization process described herein (and carried out at step 330). In at least one embodiment, the extracted and stored coffee oil can be pumped into an equipment utilized for blending, homogenizing, and plasticizing the coffee and non-coffee fractions described herein. According to one embodiment, the extracted coffee oil can be sprayed onto the coffee and non-coffee fractions.

At step 340, the process 1000 includes preparing and adding additives to coffee and/or non-coffee fractions. In at least one embodiment, the additives may be added to the coffee and non-coffee fractions during blending, homogenization, and plasticization process described herein (e.g., and carried out at step 330-B). For example, the additives can be added to a mixer or blender described herein that contains the coffee and/or non-coffee fractions. In one or more embodiments, additives may include, but are not limited to: 1) salt(s); 2) lecithin(s); 3) polyglycerol polyricinoleate (PGPR); 4) emulsifiers; 5) antioxidants; 6) stabilizers; and 7) various other food-grade additives.

At step 300, the process 1000 includes adding condensed aromas (e.g., obtained from volatile flashing, distillation, and aroma condensing processes performed at steps 275, 285, and 295) to coffee and/or non-coffee fractions. In at least one embodiment, the condensed aromas can be added to the coffee and non-coffee fractions during blending, homogenization, and plasticization process described herein (e.g., and carried out at step 330). For example, the additives can be sprayed into a mixer or blender described herein that contains the coffee and/or non-coffee fractions.

At step 330, the process 1000 includes blending, homogenizing, and plasticizing the coffee and non-coffee fractions into a composite coffee mass. In one or more embodiments, the blending, homogenizing, and plasticizing can include, but is not limited to: 1) combining a predetermined quantity of the coffee fraction and the non-coffee fraction into a composite mixture; 2) cooling or heating the composite mixture to about 1-70 degrees Celsius; 3) blending the composite mixture at about 20-150 rpm or about 10-100 rpm; and 4) spraying the composite mixture with additives and/or solutions (e.g., aromas, coffee oil, additives, etc.) at a quantity of about 200% by weight of the coffee fraction (or composite mixture, in some embodiments) for a predetermined period of about 1-100 minutes or about 5-60 minutes.

In various embodiments, the post-blending and/or homogenization may be carried out in one or more blenders, such as ribbon- or sigma-type blenders (or mixers) configured to operate under inert gas conditions and in the absence of oxygen and/or under vacuum modified atmosphere (with or without inert gases). In one or more embodiments, one or more blenders may receive and blend the coffee and non-coffee fractions at speeds between about 20-150 rpm or about 10-100 rpm utilizing double-helices as blending mechanisms. In at least one embodiment, mixers, blenders and/or homogenizers can operate in capacities up to about 15,000 kg (though greater processing capacities are contemplated).

In various embodiments, the mixers, blenders, and/or homogenizers, may include a built-in spray system device for spraying the additives and solutions described herein onto the coffee and non-coffee fractions during blending, homogenizing, and/or plasticization. In one or more embodiments, the spray system device may incorporate a variable number of special double-fluid pressure atomizers-type nozzles (e.g., located within a hermetically closed processing chamber that includes the coffee and non-coffee fractions). In at least one embodiment, the spray system delivers up to about 200% by weight of the coffee fraction (or composite coffee mass) in additives and/or solutions, such as those described at steps 190-B, 300, and 340. In at least one embodiment, the nozzles may operate in running cycles of 1-100 minutes or about 5-60 minutes.

In various embodiments, the nozzles may deliver controllable, finely dispersible droplets of the solutions, additives, and/or liquid systems (with an average drop size up to about 100 microns) to the coffee and non-coffee fractions. In one or more embodiments, one or more blenders include internal walls that heat the coffee and non-coffee fractions to a melting point of one or more elements thereof (or about 90 degrees Celsius) and cool the coffee and non-coffee fractions below a melting point of the one or more elements thereof (or about 10 degrees Celsius) during the duration of the blending, homogenizing, and plasticization process (e.g., about 1-100 minutes or about 5-60 minutes).

In one or more embodiments, other complementary and micro-ingredients may be added (e.g., following mixing of the other ingredients and additives) to the composite coffee mass. In at least one embodiment, the other complimentary and micro-ingredients include, but are not limited to, aromas and flavoring agents, additives, and other suitable ingredients including colorants, among others.

In one or more embodiments, one or more blenders include sanitary design features that allow for easy sanitization of the one or more blenders. In some embodiments, the one or more blenders may be assembled in a platform to facilitate discharge of the composite coffee product into inert gas locked-in totes, silos, and/or directly to the feeding silos of a packaging line.

In various embodiments, the composite coffee mass may be an edible product imparted with a variable degree of coffee flavor and taste. In at least one embodiment, the composite coffee mass (e.g., at a plasticization phase) may present a homogeneous solid-like form with a variable viscosity that might be fixed, depending on processing parameters. In one or more embodiments, the composite coffee mass is mixed with suitable fat/oil system combinations according to a planned end-use. In various embodiments, the composite coffee mass is versatile for food and beverage applications, such as in formulation of coffee bars, coffee powders, coffee spreads, coffee chunks/morsels/chips, and a variety of applications in refrigerated or frozen desserts, sugar and/or coffee baked goods, breakfast cereals, power bars, etc.

In one or more embodiments, one or more blenders may include a double helicoid rotating shaft, with ancillary paddles and stator devices to facilitate creation of turbulence during blending of the coffee and non-coffee fractions. In various embodiments, a processing temperature can be from about 1-70, about 1-90 degrees, or about 1 to a melting point of the fat used in Celsius (depending on the fat system used and planned end-use), which is ensured through heated and/or cooled jacketed wall of the one or more blenders. In one or more embodiments, the mixing equipment may have a variable rotation speed from about 20-150 rpm or about 10-100 rpm.

At step 350, the process 1000 includes storing the composite coffee mass. In various embodiments, the composite coffee mass may be stored according to specifications of quality. In at least one embodiment, the composite coffee mass is stored in vertical, sanitary, stainless steel jacketed tanks. In one or more embodiments, the tanks may be water-heated (e.g., to a temperature up to about 45 degrees Celsius) and may include a low-speed mixing mechanism that agitates the composite coffee mass at speeds of about 25-100 rpm. In at least one embodiment, the composite coffee mass may be transferred from the tanks by positive displacement pumps to other processes and steps described herein.

At step 355, the process 1000 includes filtering the composite coffee mass to remove contaminants and ensure a high-quality finished product. In one or more embodiments, filtering increases productivity and quality by improving flow rate, eliminating external contaminant build-up and reducing operating noise and maintenance time. In at least one embodiment, filtering ensures a purity of the composite coffee mass by avoiding exposure of the composite coffee mass to non-inert atmosphere conditions and/or oxygen.

In various embodiments, a filtration system is used to perform the filtering, the filtration system may be similar to filtration systems from Russell-Finex Co. of the USA. In one or more embodiments the filtration system includes, but is not limited to: 1) a positive displacement pump that delivers steady flow of a semi-solid liquid presenting high viscosity at a pressure up to about 15,000 centipoise without short time interruption of operation due to partial clogging, while offering a high burst strength of up to 150 psig; 2) a continuous, enclosed-type sanitary filtration system that provides high-quality operating conditions, and ensures and maintains a consistently high flow rate and providing a highest quality filtering of the composite coffee mass; 3) a self-cleaning set-up by mechanically scraping collected debris from the filter screen with a disc that travels up and down the screen, parallel to the liquid flow; and 4) a collection chamber (e.g., at the bottom of the filter system) that automatically purges collected debris without halting production in a process that takes up to about 0.7 seconds or fewer.

In one or more embodiments, the self-cleaning set-up may provide additional benefits including, but not limited to: 1) continuous operation, without interrupting production; 2) improved plant working conditions due to quieter, enclosed system; 3) virtually maintenance-free operations and less frequent replacement of parts, due to fewer moving parts; 4) operation at a consistently low differential pressure; and 5) relatively low initial investment.

At step 360, the process 1000 includes transferring (e.g., via pumps or another transfer mechanism) the filtered composite coffee mass to one or more tanks (similar to other storage tanks described herein) for storage under conditions described herein. In various embodiments, the composite coffee mass can be stored in the tanks until utilization in additional processes, such as packaging operations and/or bulk commercialization.

At step 370, the process 1000 includes transferring (e.g., via pumps or another transfer mechanism) the composite coffee mass to one or more pre-crystallization storage tanks.

At step 380, the process 1000 includes tempering the composite coffee mass. In some embodiments, whether or not to include step 380 can be based on a type of fat used. In one or more embodiments, the tempering includes heating (or cooling) the composite coffee mass to destroy unstable crystals and establish conditions favorable to stable crystal formation. In at least one embodiment, the tempering can be performed via nucleation techniques.

At step 390-A, the process 1000 includes dosing the composite coffee mass into one or more moulds.

At step 390-B, the process 1000 includes dosing the composite coffee mass onto one or more conveyers.

At step 400-A, the process 1000 includes crystallizing the composite coffee mass within one or more pre-crystallization moulds. In at least one embodiment, one or more pre-crystallization moulds can be transported through one or more crystallization tunnels configured to induce the crystallization of the composite coffee mass (e.g., and also enable recovery thereof from the one or more conveyors) within the moulds (e.g., and also enable recovery thereof from the moulds due to contraction of the composite coffee mass).

At step 400-B, the process 1000 includes crystallizing the dosed composite coffee mass atop one or more conveyors. In at least one embodiment, one or more conveyors transport the dosed composite coffee mass through one or more crystallization tunnels configured to induce the crystallization of the composite coffee mass. In at least one embodiment, the crystallized, dosed composite coffee mass can be utilized for composite coffee chunks, morsels, chips, and the like.

At step 410-A, the process 1000 includes demoulding the crystalized composite coffee mass from one or more pre-crystallization moulds.

At step 410-B, the process 1000 includes cutting the crystallized, dosed composite coffee mass. In at least one embodiment, one or more conveyors may transport the dosed composite coffee mass through one or more cutting systems (e.g., shears, knives, wedges, or other cutting elements) that cut the dosed composite coffee mass into strips, chunks, or other predetermined shapes (e.g., squares, circles, rectangles, etc.). In some embodiments the composite coffee mass can be crushed or pulverized into powders, chunks, morsels, or other ingredient forms.

At step 390-C, the process 1000 includes collecting excess composite coffee mass that was not dosed within one or more moulds and de-crystallizing it prior to returning the excess composite coffee mass to one or more pre-crystallization tanks described herein (e.g., the tanks utilized at step 370). In one or more embodiments, the de-crystallizing reduces a presence of stable crystals in the tempered composite coffee mass, thereby reducing a viscosity of the composite coffee mass and easing dosing and/or pumping of the tempered composite coffee mass. According to one embodiment, the tempering and de-crystallizing (of a portion of the tempered mass that is stored and not immediately dosed) provides for template crystals (e.g., crystallized fats) that orient formation of new crystals (e.g., during other and/or subsequent crystallization-related processes).

At step 420, the process 1000 includes performing metal detection on the composite coffee mass. In on embodiment, the composite coffee mass can be passed through one or more metal detectors that generate alerts upon detecting metal in the coffee composite mass. In at least one embodiment, portions of the composite coffee mass that cause activation of one or more metal detectors may be removed from further processing.

At step 430, the process 1000 includes packaging the composite coffee mass in primary packaging, such as, for example, jars, bottles, and other primary packaging structures.

At step 440, the process 1000 includes packaging the primary-packaged composite coffee mass in secondary packaging, such as, for example, boxes, cartons, and other secondary packaging structures.

At step 450, the process 1000 includes performing X-ray inspection on the secondary-packaged composite coffee mass. In at least one embodiment, X-ray inspection detects foreign objects and/or other undesirable elements in the secondary and primary packaging. In various embodiments, any secondary and/or primary packaging determined, via the X-ray inspection, to include foreign objects and/or other undesirable elements can be removed from further processing and/or retrieve for further inspection.

At step 460, the process 1000 includes palletizing the secondary-package composite coffee mass onto one or more pallets for transportation.

At step 470, the process 1000 includes staging the palletized composite coffee mass for a predetermined staging period up to about 48 hours.

At step 480, the process 1000 includes shipping the staged and palletized composite coffee mass to one or more predetermined locations.

In one or more embodiments, an alternate process 1000 can be performed and can yield edible sticks, batons, or the like that are (composite) coffee mass-based. In one embodiment, the alternate process 1000 can include, but is not limited to: 1) performing steps described herein to obtain a composite coffee mass and/or a coffee fraction; 2) dosing, at step 390-B, a quantity of coffee mass (or coffee fraction) onto one or more conveyors; 3) passing the dosed composite coffee mass through a pre-crystallization tunnel to partially crystallize the coffee mass such that the composite coffee mass can be cut without breaking (in one or more embodiments, pre-crystallizing may also be utilized to prepare chunks, morsels, etc. described herein); 4) cutting, at step 410-B, the partially-crystallized and dosed composite coffee mass into one or more batons or sticks (without breaking the composite coffee mass); 5) passing, at step 400-A, the cut composite coffee mass through a crystallization tunnel to complete crystallization of the composite coffee mass; and 6) performing one or more of steps 390-C-470 to complete post-processing and/or packaging of the composite coffee mass.

In at least one embodiment, a second alternate process 1000 can be performed and can yield bulk coffee mass. In one or more embodiments, the second alternate process 1000 can suspend following performance of step 360, and the composite coffee mass stored therein (e.g., in paste, liquid, or solid form) can be packaged for bulk commercialization and/or delivery (e.g., according to one or more packaging processes described herein).

Figure 2A:
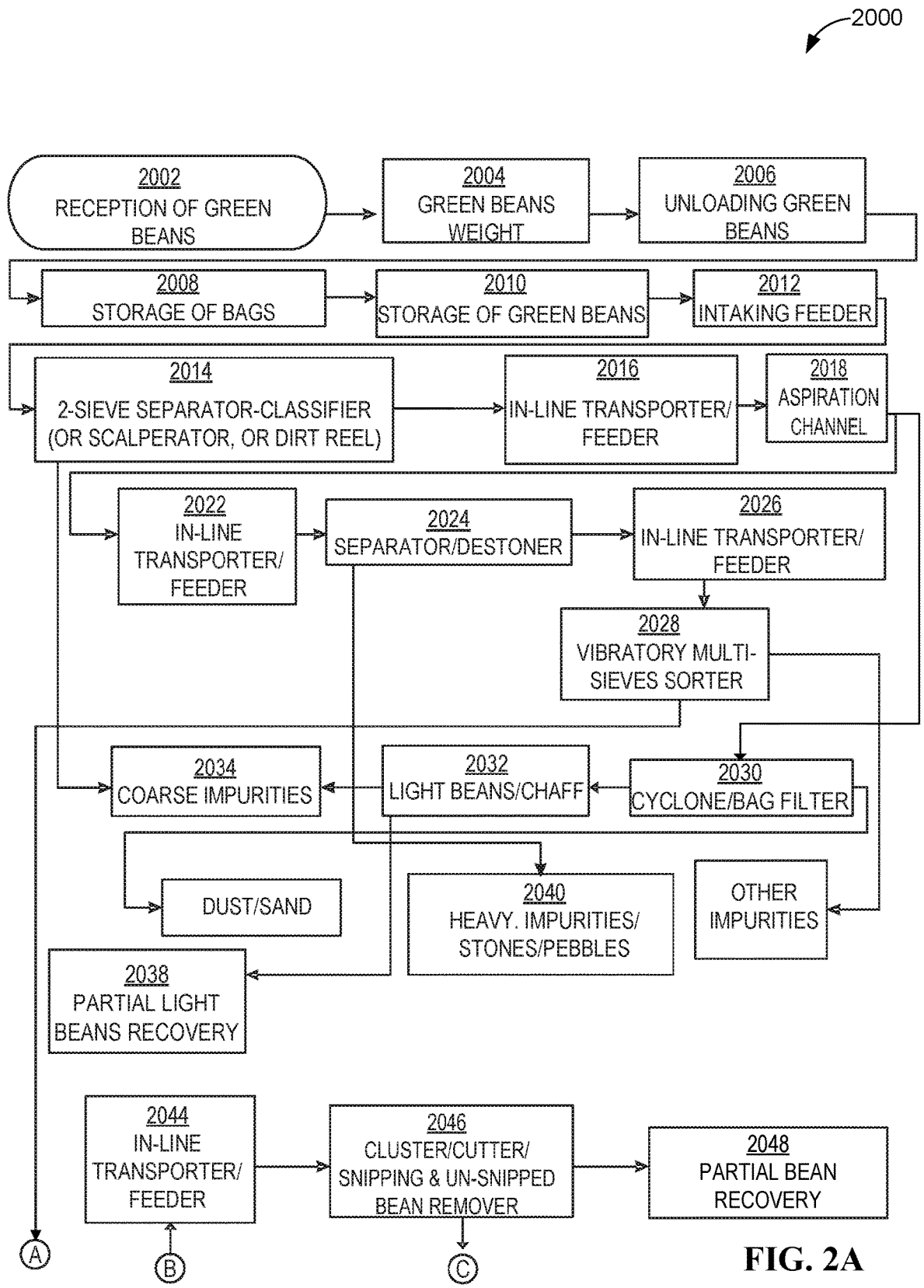
FIGS. 2A, 2B, and 2C illustrate a flowchart showing a cleaning and sorting process, according to one embodiment of the present disclosure.
Figure 2B:
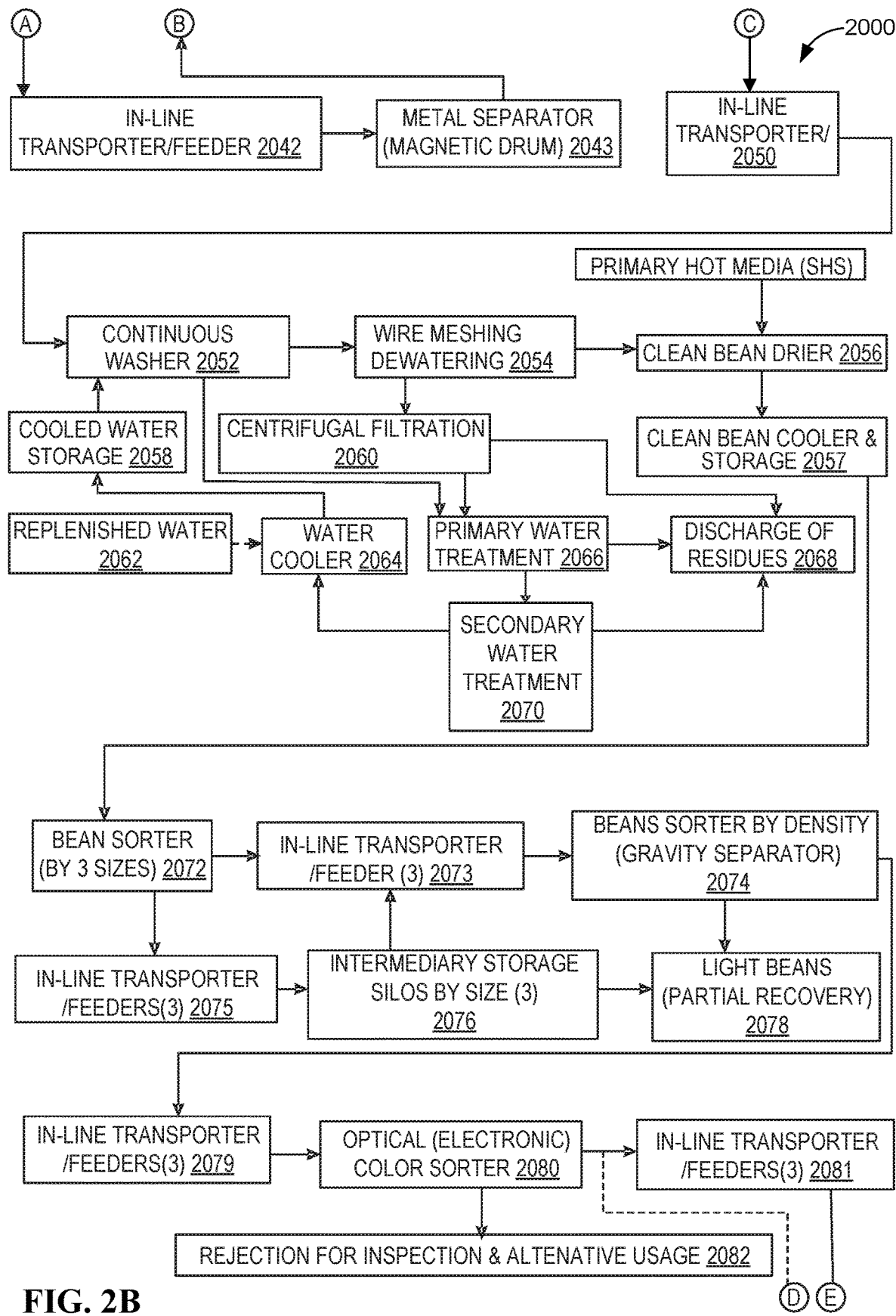
Figure 2C:
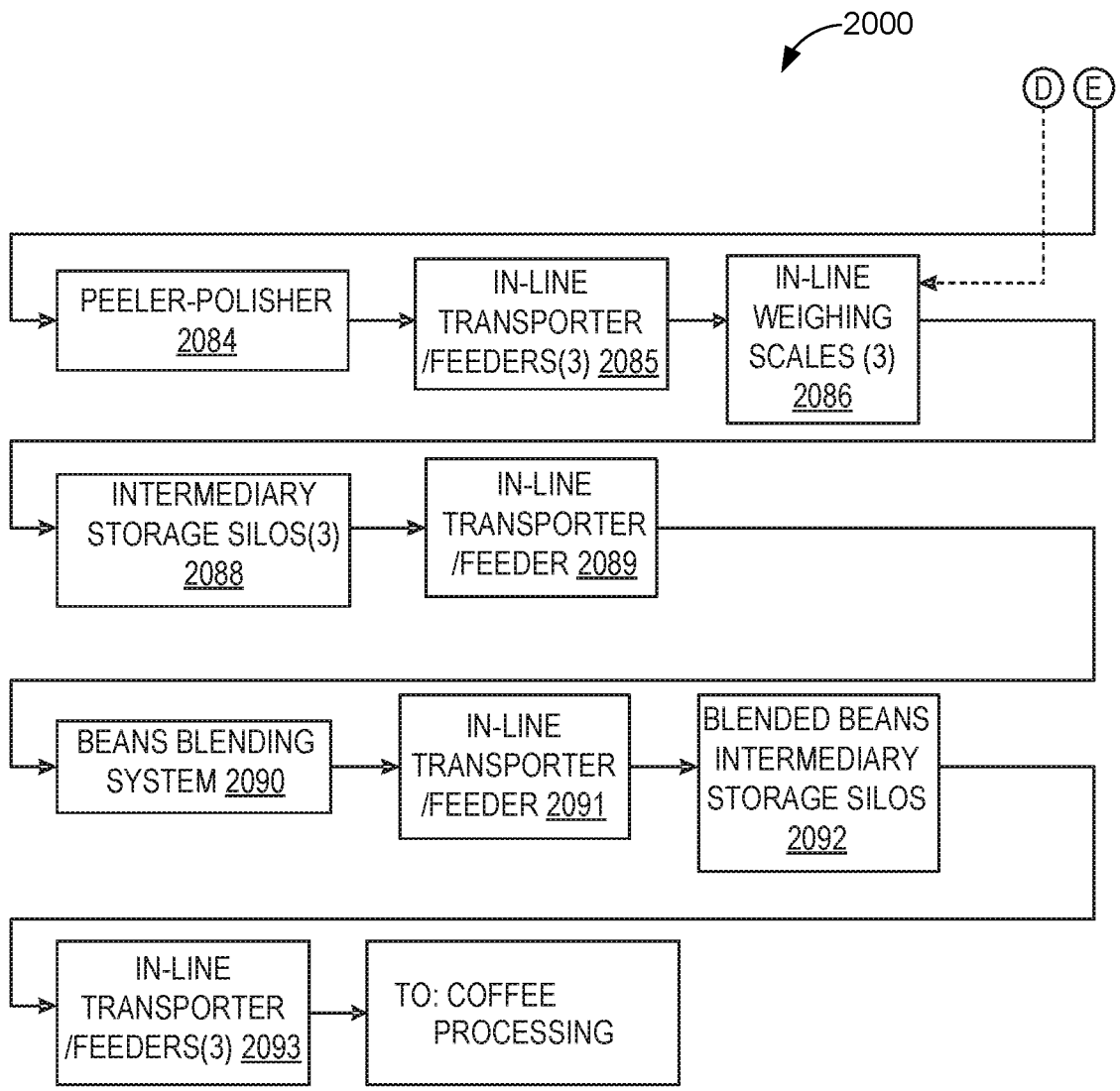

In various embodiments, the process 1000 can omit one or more steps described herein. In at least one embodiment, the process 1000 can include With reference to FIGS. 2A and 2B, shown is a flowchart illustrating a pre-processing process 2000 according to various embodiments of the present disclosure. At step 2002, the process 2000 includes receiving green coffee beans (e.g., in bags) on trucks (or other suitable transport vehicle or vessel).

At step 2004, the process 2000 includes determining the weight of the green coffee beans. In at least one embodiment, determining the weight can include weighing each truck (or other vehicle or vessel) with the green coffee beans thereon and subtracting a known weight of the truck to determine the weight of green coffee beans thereon. In one or more embodiments, the weight can be recorded and/or utilized in determining parameters of other processes described herein including, but not limited to, processing speed, throughput, quantities of additives, ingredients, and other materials utilized during preparation of a composite coffee mass (or other substance described herein).

At step 2006, the process 2000 includes unloading the green coffee beans. In at least one embodiment, the green coffee beans can be initially packed in bags that are unloaded from the trucks (or other vehicles or vessels).

At step 2008, the process 2000 includes storing the bags of green coffee until utilization in other processes described herein.

At step 2010, the process 2000 includes automatically opening and emptying the bags of green coffee into one or more intermediate containers (or directly into an intaking feeder).

At step 2012, the process 2000 includes loading the green coffee beans into one or more intake feeders configured to feed the green coffee beans to one or more separators.

At step 2014, the process 2000 includes removing coarse impurities from the green coffee beans. In at least one embodiment, removing the coarse impurities can include processing the green coffee through one or more separators (such as two-sieve separator-classifiers) that remove the coarse impurities from the green coffee.

At step 2016, the process 2000 includes moving the coffee beans using an inline transporter/feeder to an aspiration channel. The inline transporter/feeder can correspond to any of the feeders described herein among other feeders.

At step 2018, the process 2000 includes removing light beans, chaff, and dust from the green coffee beans. In at least one embodiment, removal can include, but is not limited to, processing the green coffee beans through one or more aspiration channels that aspirate out and remove the light beans, chaff, and dust. According to one embodiment, the removed light beans may be separated, recovered, and stored for utilization in other coffee manufacturing processes or processes. In various embodiments, the one or more aspiration channels can output the light beans, chaff, and dust to a discharge cyclone and/or bag filters for collection, recovery, and/or removal from the process 1000.

At step 2022, the process 2000 can include passing the aspiration-treated coffee beans into another inline transporter/feeder.

At step 2024, the process 2000 can include separating and destoning the coffee beans.

At step 2026, the process 2000 can include passing the destoned separated coffee beans into another inline transporter/feeder.

At step 2028, the process 2000 can pass the coffee into a vibratory multi-sieve sorter from the inline transporter/feeder. The vibratory multi-sieve sorter can sort out multiple size fractions. Material (e.g., coffee beans) can be moved across the vibratory multi-sieve sorter to sort the materials into different sizes. Other impurities can be sorted out and removed from the materials.

At step 2030, the process 2000 can include the use of a cyclone or bag filter to remove dust and sand from the coffee beans. The light beans and chaff can move on for further processing at step 2032. The light beans and shafts can be separated into partial light beans and course impurities, which are discarded at step 2034. The light beans can be partially recovered for further processing at step 2038. At step 2040, the process 2000 can include removing heavy impurities, such as stones and pebbles, from the coffee beans. The stones and pebbles can be separated from the coffee at step 2024.

At step 2042, the coffee output of the vibratory multi-sieve sorter from step 2028 can be passed into an in-line transporter/feeder, and into a metal separator at step 2043. The metal separator can correspond to a magnetic drum, where the coffee beans tumbles in the magnetic drum. Any magnetic impurities among the coffee beans will stick to the magnetic drum rather than moving forward in processing. The metal-free coffee beans will move into another in-line transporter/feeder at step 2044. At step 2046, the process 2000 includes clustering, cutting, and snipping the beans. Any un-snipped beans can be removed, and beans can be partially recovered at step 2048.

At step 2050, the process 2000 can include moving the coffee via an in-line transporter/feeder into a continuous washer. The coffee can be washed in the continuous washer at step 2052. A stainless-steel wire meshing screen can be used to dewater the coffee at step 2054. At step 2056, the beans can be dried in a bean drier. After drying, the beans can be cooled and stored at step 2057. The water used to wash the beans at step 2052 can be treated firstly at step 2066 and secondly at step 2070. The residual water can be discharged at step 2068. The water treated at step 2070 can be cooled at step 2064 and stored for use at step 2058. The water can also include replenished water from step 2062.

At step 2072, the coffee beans stored at step 2057 can be sorted into different sizes. In one embodiment, the coffee is sorted into three different sizes. At step 2073 and 2075, the different sizes of coffee beans can be moved using an in-line transporter/feeder. The beans can be moved into a density-based bean sorter at step 2074. The density-based bean sorter can remove beans (or miscellaneous objects) that have the wrong density from the coffee. In some embodiments, the beans can be moved into intermediate storage at step 2076, and fed back into the in-line transporter/feeder at step 2073 when desired. At step 2078, light beans can be partially recovered. At step 2079, the different sized beans, all having a density within predetermined ranges, can move from the density bean sorter for optical sorting.

At step 2080, an optical sorter can carry out color-based sorting to remove any objects from the coffee that are not within a predetermined threshold set of colors and color gradients corresponding to coffee beans (or another desired material, such as cocoa beans). At step 2082, the beans (or other objects) that do not have the proper color are rejected for further inspection and/or marked for alternative usage. In some embodiments, in-line transporters/feeders at step 2081 move the coffee beans to be processed through a peeler-polisher at step 2084. In these embodiments at step 2085, the in-line transporters/feeders can move the coffee beans into in-line weighing scales at step 2086.

At step 2086, the coffee is weighed either from the in-line transporter/feeders from step 2085. The weighed coffee beans can be stored in intermediary storage silos at step 2088. When further processing is desired, the coffee beans can be moved from the intermediary storage silos to a bean blending system via in-line transporter/feeders at step 2089. At step 2090, the process 2000 can include blending the beans. The blended beans can be transported via in-line transporter/feeders at step 2091. The blended beans can be transported into a storage silo at step 2092. At step 2093, in-line transporter/feeders can move the coffee beans to further processing.

Figure 3A:
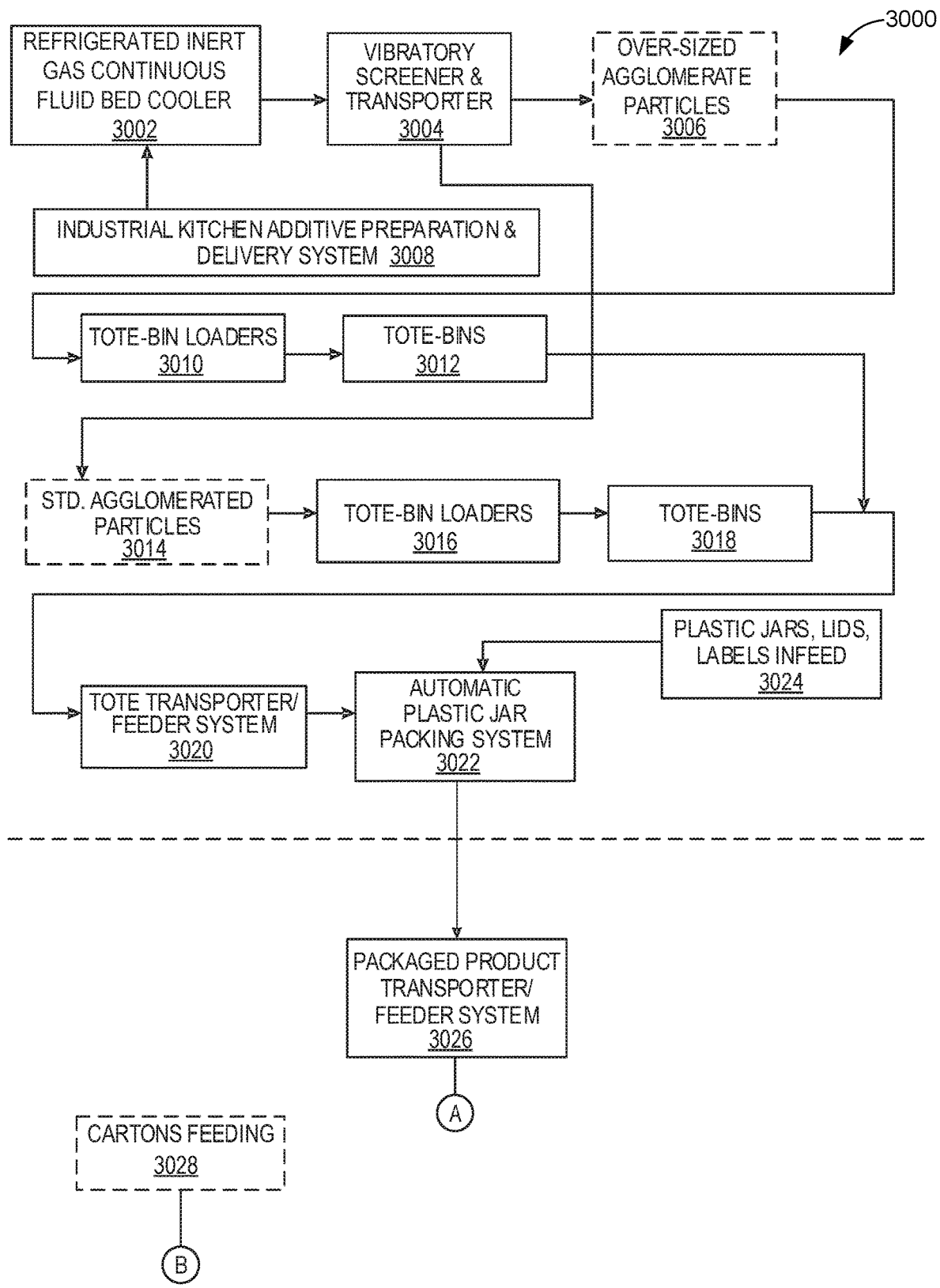
FIGS. 3A and 3B illustrate a flowchart showing a roasting and manufacturing process, according to one embodiment of the present disclosure.
Figure 3B:
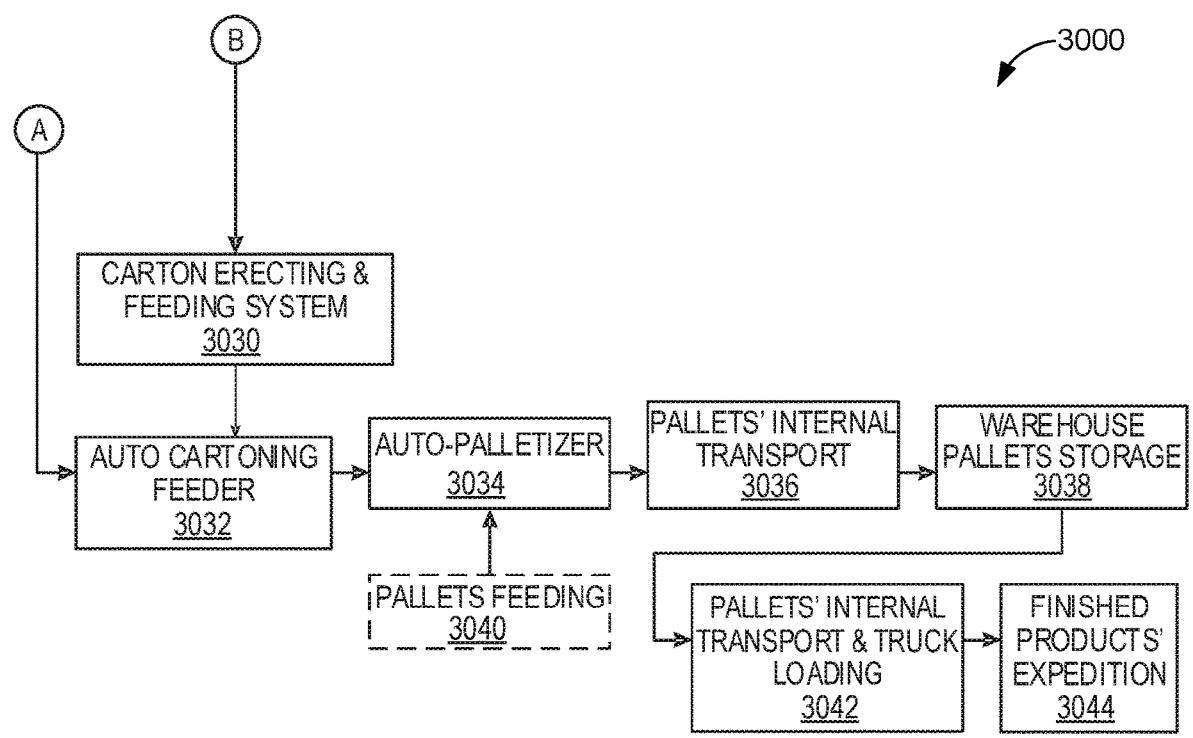

With reference to FIGS. 3A and 3B, shown is a flowchart illustrating a process 3000 according to various embodiments of the present disclosure. At step 3002, the process includes moving the coffee mass on a refrigerating fluid bed cooler in an inert gas environment. According to one embodiment, the coffee mass can be cooled to a predetermined packaging temperature that improve ease of moving and processing the coffee mass through the process 3000. At step 3004, a vibratory screener and transporter can screen and transport the coffee mass. Oversized particles can be moved to tote-bin loaders at steps 3006 and 3008, while standard sized particles can be moved to tote-bin loaders at steps 3014 and 3016. The tote-bin loaders 3010 and 3016 can move the coffee mass to tote-bins 3012 and 3018. In some embodiments, the coffee mass is stored in tote-bins regardless of particle size. From the tote-bins, the coffee mass can be feed into a tote transporter/feeder system at step 3020.

The coffee mass can be placed into plastic jars using a plastic jar packing system at step 3022. Plastic jars, lids, and labels can be infeed to label the packaging at step 3024. A packaged product transporter/feeder system can move the packaged products at step 3026. Cartons can be feed for packaging at step 3028. Cartons can be erected and fed for loading at step 3030. The plastic jars containing the coffee mass can be loaded into the cartons at step 3032. An auto-palletizer can palletize the cartons at step 3034, with pallets being feed at step 3040. In some embodiments, pallets can be manually fed or loaded. The pallets are transported at step 3036. At step 3038, the pallets are stored at a warehouse. At step 3042, the pallets are loaded onto a truck for transport, and at step 3044, the product is delivered.

With reference to FIG. 4, shown is an exemplary roasting system 4000, according to one embodiment of the present disclosure. In at least one embodiment, the roasting system 4000 is configured to perform all operations under inert gas conditions and in the absence of oxygen. Thus, in various embodiments, coffee beans may be processed through the roasting system 4000 and converted into roasted coffee beans without being exposed to atmospheric oxygen.

In at least one embodiment, the roasting system 4000 includes a bean loading mechanism 4001 connected to a discharge cyclone 4002. In various embodiments, the bean loading mechanism 4001 receives clean coffee beans and loads the clean coffee beans into the discharge cyclone 4002. In at least one embodiment, the discharge cyclone 4002 feeds the clean coffee beans into an intermediary storage 4003. In various embodiments, the intermediary storage 4003 is connected to a screw feeding system 4004. In one or more embodiments, the intermediary storage 4003 allows for a controlled flow of the clean coffee beans into the screw feeding system 4004. In one or more embodiments, the screw feeding mechanism 4004 continuously and controllably rotates to draw the clean coffee beans into a bean roaster 4005.

In at least one embodiment, the bean roaster 4005 includes, but is not limited to: 1) a rotary roasting drum 4006 that rotates via an electric motor 4007, the electric motor 4007 including an electronic controller for controlling the rotation; 2) an electric heat source 4008 configured to provide heat to generate and transfer heat to the rotary roasting drum 4006; and 3) a discharge device 4009 for expelling roasted coffee beans from the rotary roasting drum 4006 into a cooling system 5000 (FIG. 5).

In one or more embodiments, the discharge device 4009 provide a discharge 4010 of the roasted coffee beans that is received by the cooling system 5000 (or another system or process described herein).

In at least one embodiment, the roasting system 4000 operates under vacuum (e.g., about 0.1 bar), and/or atmospheric conditions (1 kg/cm$^2$), and/or medium to high pressure (e.g., up to about 10 kg/sq.cm). In at least one embodiment, the roasting system 4000 uses heating media. In one or more embodiments, the heating media may include, but is not limited to, super-heated steam (SHS) and/or any other suitable pre-heated inert gas, such as nitrogen, carbon dioxide, helium, argon, and the like. In various embodiments, the heating media can also be in direct or indirect contact with biomaterials (such as coffee beans) provided to the roasting system 4000. In at least one embodiment, the heating media can be heated by any type of heating source including, but not limited to, electric sources, non-ionizing electromagnetic radiation sources, combustion-based sources. In various embodiments, the heating source can be located externally to the roasting system 4000, or may be located internally. According to one embodiment, the non-ionizing electromagnetic radiation sources can generate non-ionizing radiation including, but not limited to, visible radiation, radio-waves, and others. In various embodiments, the non-ionizing electromagnetic radiation sources can be more advantageous as a more efficient and uniform roasting is achieved compared to previous approaches to roasting coffee beans. In at least one embodiment, the non-ionizing electromagnetic radiation sources may reduce a risk of exposing biomaterials (e.g., coffee beans) to oxygen during roasting.

In various embodiments, the roasting system 4000 includes an inert gas distribution pipeline 4011 that delivers inert gas throughout the system 4000. For example, the distribution pipeline 4011 can provide inert gas to the bean roaster 4005, thereby allowing for roasting of the clean coffee beans under inert gas conditions and in the absence of oxygen. In at least one embodiment, the distribution pipeline 4011 delivers the inert gas to an input of the bean roaster 4005 and receives the inert gas from an output of the bean roaster 4005 (e.g., following movement of the inert gas therein).

In at least one embodiment, the distribution pipeline 4011 passes the inert gas from the output of the bean roaster 4005 through one or more elements including, but not limited to: 1) a HEPA filter 4016 that filters off-products and other substances from the inert gas; 2) an exhaust fan 4017 that accelerates the inert gas and maintains correct directionality in the flow of the inert gas through the distribution pipeline 4011; 3) a cyclone 4018 that discharges dust and/or chaff from the inert gas; 4) a bag filter 4019 that discharges dust and/or chaff from the inert gas; 5) a second HEPA filter 4020 that removes additional off-products and substances from the inert gas; 6) a heat exchanger 4012 that cools the inert gas; 7) an inert gas primary tank 4022 that supplies the inert gas to the roasting system 4000 and other systems and processes described herein; 8) a moisture condenser 4015 that condenses volatiles, aromas, and other substances (e.g., emitted from the clean coffee beans during roasting) out of the inert gas and into liquid form (e.g., water containing the volatiles, aromas, and other substances); 9) a coalescent condenser 4014 that recovers and separates the liquid form (containing the condensed volatiles, aromas, and other substances) from the inert gas and outputs the liquid form to recovery and extraction processes described herein); 10) one or more inert gas fans 4013 that accelerate the inert gas through the distribution pipeline 4011; and 11) a second heat exchanger 4021 that heats the inert gas prior to the distribution pipeline 4011 delivering the inert gas to the input of the bean roaster 4005.

With reference to FIG. 5 shown is an exemplary cooling system 5000, according to one embodiment of the present disclosure. In at least one embodiment, the cooling system 5000 is configured to perform all operations under inert gas conditions and in the absence of oxygen. Thus, in various embodiments, roasted coffee beans may be processed through the cooling system 5000 without being exposed to atmospheric oxygen.

In at least one embodiment, the cooling system 5000 includes a bean loading mechanism 5001 connected to a discharge cyclone 5002. In various embodiments, the bean loading mechanism 5001 receives and loads roasted coffee beans into the discharge cyclone 5002. In at least one embodiment, the discharge cyclone 5002 feeds the roasted coffee beans into an intermediary storage 5003. In various embodiments, the load intermediary storage 5003 is connected to a screw feeding system 5004. In one or more embodiments, the intermediary storage 5003 allows for a controlled flow of the roasted coffee beans into the screw feeding system 5004. In one or more embodiments, the screw feeding mechanism 5004 continuously and controllably rotates to draw the roasted coffee beans into a two-stage inert gas cooler 5005. In at least one embodiment, the inert gas cooler 5005 includes a torrefacto and quenching system configured to perform torrefacto and quenching processes described herein.

In one or more embodiments, the inert gas cooler 5005 includes cooling elements configured to cool the roasted coffee beans according to one or more cooling processes described herein. In one or more embodiments, the inert gas cooler 5005 can blow cooled inert gas throughout an internal chamber and/or through a fluid bed that includes the roasted coffee beans. In one or more embodiments, the inert gas cooler 5005 can cool the roasted coffee beans in the first stage. In at least one embodiment, the torrefacto and quenching system applies, in the second stage, a torrefacto and/or quenching process to the roasted coffee beans.

In at least one embodiment, in the first stage the torrefacto and quenching system may receive and spray only the torrefacto solution (e.g., sugar solution) and the inert gas cooler 5005 may suspend pre-cooling, cooling, and/or post-cooling processes. In one or more embodiments, in a second stage, the inert gas cooler 5005 can carry out the pre-cooling, cooling, and/or post-cooling processes to cool and quench the roasted coffee beans.

In various embodiments, the first stage and the second stage may occur sequentially, simultaneously, or in reverse.

In one or more embodiments, the torrefacto and quenching system of the inert gas cooler 5000 includes spraying mechanisms that receive the sugar solution (described herein) from an enclosed coating boiler 5008. In one or more embodiments, the enclosed coating boiler 5008 receives the sugar solution and/or water from one or more tanks 5007 and heats the sugar solution to about 90 degrees Celsius. In various embodiments, a positive displacement dosing pump 5009 pumps the sugar solution from the enclosed coating boiler 5008 to one or more spraying nozzles of the spray mechanism. In at least one embodiment, one or more spraying nozzles spray the sugar solution onto the roasted coffee beans according to torrefacto and quenching processes described herein. In one or more embodiments, the positive displacement dosing pump 5009 can be configured to pump cooled or heated water to the one or more spraying nozzles that spray the water onto the roasted coffee beans, thereby quenching thermolysis reactions thereof.

In one or more embodiments, the cooling system 5000 includes a discharge screw 5006 that discharges the roasted beans 4024 from the inert gas cool 5005 following completion of pre-cooling, post-cooling, torrefacto, and/or quenching processes therein. In at least one embodiment, the discharge screw 5006 can discharge the roasted beans 4024 to one or more pre-, dry-, and/or wet-milling processes described herein.

In various embodiments, the cooling system 5000 includes an inert gas distribution pipeline 5010 that delivers inert gas throughout the cooling system 5000. For example, the distribution pipeline 5010 can provide inert gas to the inert gas cooler 5005, thereby allowing for pre-cooling, cooling, torrefacto application, and/or quenching of the roasted coffee beans under inert gas conditions and in the absence of oxygen. In at least one embodiment, the distribution pipeline 5010 delivers the inert gas to an input of the inert gas cooler 5005 and receives the inert gas from an output of the inert gas cooler 5005 (e.g., following movement of the inert gas therein).

In at least one embodiment, the distribution pipeline 5010 passes the inert gas from the output of the inert gas cooler 5005 through one or more elements including, but not limited to: 1) a HEPA filter 5011 that filters off-products and other substances from the inert gas; 2) an inert gas exhaust fan 5012 that accelerates the inert gas and maintains correct directionality in the flow of the inert gas through the distribution pipeline 5010; 3) a separation cyclone 5013 that discharges dust and/or chaff from the inert gas; 4) a bag filter 5014 that discharges dust and/or chaff from the inert gas; 5) a second HEPA filter 5015 that removes additional off-products and substances from the inert gas; 6) an inert gas fan 5016 that accelerates the inert gas through the distribution pipeline 5010 and maintains correct directionality in the flow thereof; 7) a heat exchanger 5017 that cools the inert gas; 8) a primary inert gas tank 5018 that supplies the inert gas to the cooling system 5000, and other systems and processes described herein; 9) a condenser 5019 that condenses volatiles, aromas, and other substances (e.g., emitted from the clean coffee beans during roasting) out of the inert gas and into liquid form (e.g., water containing the volatiles, aromas, and other substances); 10) a coalescent condenser and filter 5020 that recovers and separates the liquid containing the condensed volatiles, aromas, and other substances from the inert gas and outputs the liquid part to recovery and extraction processes described herein; 11) one or more inert gas fans 5021 that accelerate the inert gas through the distribution pipeline 5010; and 12) a second heat exchanger 5022 that heats the inert gas prior to the distribution pipeline 5010 delivering the inert gas to the input of the inert gas cooler 5005.

In a particular embodiment, the cooling system 5000 includes a gas exhauster (or extractor) in a closed or semi-closed loop to create a controlled depression of the system and (via synchronization with the gas flux blowing through the screen of the fluid bed of the inert gas cooler 5000) provide enhanced control of the fluid bed cooling effect. In particular embodiments, the gas exhauster can provide for more precise and accurate control of the final post-roasting moisture level and more efficient cooling, thereby providing reduced cooling times.

In at least one embodiment, the cooling system 5000 includes closed-loop systems that synchronize outflow of the inert gas from the inert gas cooler 5005 to the separation cyclone and condenser with the inflow of fresh inert gas into the inert gas cooler 5005. In one or more embodiments, the fresh inert gas transfers heat and mass (such as water under latent heat of evaporation) from the roasted coffee beans into the inert gas. In one or more embodiments, the fresh inert gas can flow, via the distribution pipeline 5010, to the condenser 5019 to be dehumidified under cryogenic conditions (e.g., and for recovery and/or discharge of dust, chaff, and other masses therefrom). In at least one embodiment, the cooling system 5000 may re-inject part of the dehumidified fresh inert gas to compensate any inert gas losses and to maintain a balanced heat and mass transfer.

With reference to FIG. 6, shown is a conche, distillation, and condensation (CDC) system 6000, according to one embodiment of the present disclosure. In at least one embodiment, the CDC system 6000 is configured to perform all operations under inert gas conditions and in the absence of oxygen. Thus, in various embodiments, wet-milled coffee (e.g., obtained from dry-milled, SCFE-treated, roasted coffee beans) may be processed through the CDC system 6000 without being exposed to atmospheric oxygen.

In at least one embodiment, the CDC system 6000 includes a bean loading mechanism 6001 connected to a discharge cyclone 6002. In various embodiments, the bean loading mechanism 6001 receives and loads wet-milled coffee into the discharge cyclone 6002. In at least one embodiment, the discharge cyclone 6002 feeds the wet-milled coffee into a load intermediary storage 6003. In various embodiments, the load intermediary storage 6003 is connected to a screw feeding system 6004. In one or more embodiments, the load intermediary storage 6003 allows for a controlled flow of the wet-milled coffee into the screw feeding system 6004. In one or more embodiments, the screw feeding mechanism 6004 continuously and controllably rotates to draw the wet-milled coffee into a solid phase reactor 6005.

In one or more embodiments, the solid phase reactor 6005 can conche the wet-milled coffee according to parameters and conditions described herein. In one or more embodiments, a conche 6006 can be attached to the solid-phase reactor 6005. In various embodiments, the conche 6006 can conche the wet-milled coffee (as described herein). In at least one embodiment, both the solid-phase reactor 6005 and the conche 6006 can conche the wet-milled coffee. In one or more alternate embodiments, only the conche 6006 conches the wet-milled coffee. In at least one alternate embodiment, only the solid-phase reactor 6005 conches the wet-milled coffee. According to one embodiment, the solid-phase reactor 6005 can perform a first portion of a conching process described herein, and the conche 6006 can perform a second portion of the conching process. Thus, in at least one embodiment, the solid-phase reactor 6005 and conche 6006 may be a single unit with internal stages for conching the wet-milled coffee.

In one or more embodiments, as described herein, conching processes can cause emission of volatiles, aromas, and other substances into the inert gas being pumped through the CDC system 6000 (and/or other systems). In at least one embodiment, an aroma fractionation column 6009 can be attached to the conche 6006 (or solid-phase reactor 6005) and can receive inert gases from conching processes. In various embodiments, the aroma fractionation column 6009 separates out various aromas volatiles from the inert gas based on boiling temperatures thereof.

In at least one embodiment, an inert gas distribution pipeline 6025 transports inert gas into and out of the solid-phase reactor 6005 and/or the conche 6006, and throughout elements of the CDC system 6000 including, but not limited to: 1) the aroma fractionation column 6009; 2) a condenser 6010 that condenses the inert gas (e.g., and/or condenses volatiles, aromas, and/or other substances out of the inert gas); 3) a phase separator 6011 that separates an aqueous phase of the inert gas from an organic phase of the inert gas; 4) a cryogenic aroma collector 6012 that receives the aqueous phase or the organic phase of the inert gas (e.g., for recovery processes described herein); 5) a vacuum pump 6013 that accelerates the inert gas through the distribution pipeline 6025 and prevents backflow of the inert gas; 6) a solid-phase separator 6014 that separates the solid phase (e.g., containing biomaterials (such as coffee particles) out of the inert gas and discharge the solid phase from the CDC system 6000; 7) a post-filtration unit 6015 that filters fine materials out of the inert gas; 8) a HEPA filter 6016 that removes off-products and substances from the inert gas; 9) an exhaust fan 6017 that accelerates the inert gas through the distribution pipeline 6025 and maintains correct directionality in the flow thereof; 10) an inert gas heater 6018 that heats the inert gas; 11) an inert gas primary tank 6019 that supplies the inert gas to the CDC system 6000 and other systems and processes described herein; 12) a condenser 6020 that condenses volatiles, aromas, and other substances (e.g., emitted from the wet-milled coffee during conching) out of the inert gas and into liquid form (e.g., water containing the volatiles, aromas, and other substances); 13) a cryogenic condensing unit 6022 that recovers and separates the liquid containing the condensed volatiles, aromas, and other substances from the inert gas and outputs the liquid part to recovery and extraction processes described herein; 14) one or more inert gas pumps 6022 that accelerate the inert gas through the distribution pipeline 6025; and 15) a heat exchanger 6022 that heats the inert gas prior to the distribution pipeline 5010 delivering the inert gas to the input of the solid phase reactor 6005 and/or conche 6006.

With reference to FIG. 7, shown is a drying, agglomeration, and coating (DAC) system 7000, according to one embodiment of the present disclosure. In various embodiments, the DAC system 7000 can be utilized to perform one or more drying, agglomeration, coating, and microencapsulation processes described herein. In at least one embodiment, the DAC system 7000 is configured to perform all operations under inert gas conditions and in the absence of oxygen. Thus, in various embodiments, wet-milled coffee (e.g., obtained from dry-milled, SCFE-treated, roasted beans 4024, etc.) may be processed through the DAC system 7000 without being exposed to atmospheric oxygen.

In at least one embodiment, the DAC system 7000 includes a bean loading mechanism 7001 connected to a discharge cyclone 7002. In various embodiments, the bean loading mechanism 7001 receives and loads wet-milled coffee into the discharge cyclone 7002. In at least one embodiment, the discharge cyclone 7002 feeds the wet-milled coffee into a load intermediary storage 7003. In various embodiments, the load intermediary storage 7003 is connected to a screw feeding system 7004. In one or more embodiments, the load intermediary storage 7003 allows for a controlled flow of the wet-milled coffee into the screw feeding system 7004. In one or more embodiments, the screw feeding mechanism 7004 continuously and controllably rotates to draw the wet-milled coffee into a fluid bed drier (FBD) unit 7005.

According to one embodiment, the FBD unit 7005 include one or more stages (for example, 4 stages). In various embodiments, the FBD unit 7005 can be configured to operate on a continuous basis, under inert gas conditions, and/or in the absence of oxygen. In various embodiments, the FBD unit 7005 performs drying, agglomerating, and coating processes as described herein. In one example, the FBD unit 7005 performs the drying, agglomerating, and coating processes included in step 195 (and/or other steps) of the coffee manufacturing process 1000 described herein.

In one or more embodiments, the DAC system 7000 includes spraying mechanisms that receive agglomerating and coating solution (described herein) from an enclosed coating boiler 7008. In one or more embodiments, the enclosed coating boiler 7008 receives the agglomerating and coating solution and/or water from one or more tanks 7007 and heats the agglomerating and coating solution to a melting point of one or more fats or to, which can be about 90 degrees Celsius. In various embodiments, a positive displacement dosing pump 7009 pumps the agglomerating and coating solution from the enclosed coating boiler 7008 to one or more spraying nozzles of the spray mechanism. In at least one embodiment, the one or more spraying nozzles spray the agglomerating and coating solution onto the wet-milled coffee according to agglomerating and coating processes described herein.

In one or more embodiments, the DAC system 7000 includes a discharge screw 7006 that discharges the wet-milled coffee from the FBD unit 7005 following completion of drying, agglomerating, and/or cooling processes therein. In at least one embodiment, the discharge screw 7006 can discharge the wet-milled coffee to one or more conching, blending, homogenization, plasticization, filtering, dosing, crystallizing, and/or packaging processes described herein.

In various embodiments, the DAC system 7000 includes an inert gas distribution pipeline 7010 that delivers inert gas throughout the cooling system 7000. For example, the distribution pipeline 7010 can provide inert gas to the FBD unit 7005, thereby allowing for drying, agglomerating and/or coating of the wet-milled coffee under inert gas conditions and in the absence of oxygen. In at least one embodiment, the distribution pipeline 7010 delivers the inert gas to an input of the FBD unit 7005 and receives the inert gas from an output of the FBD unit 7005 (e.g., following movement of the inert gas therein).

In at least one embodiment, the distribution pipeline 7010 passes the inert gas from the output of the FBD 7005 through one or more elements including, but not limited to: 1) a HEPA filter 7011 that filters off-products and other substances from the inert gas; 2) an inert gas exhaust fan 7012 that accelerates the inert gas and maintains correct directionality in the flow of the inert gas through the distribution pipeline 7010; 3) a separation cyclone 7013 that discharges dust and/or chaff from the inert gas; 4) a filter bag tank 7014 that discharges dust and/or chaff from the inert gas; 5) a second HEPA filter 7015 that removes additional off-products and substances from the inert gas; 6) an inert gas fan 7016 that accelerates the inert gas through the distribution pipeline 7010 and maintains correct directionality in the flow thereof; 7) a heat exchanger 7017 that cools the inert gas; 8) a primary inert gas tank 7018 that supplies the inert gas to the DAC system 7000 and other systems and processes described herein; 9) a condenser 7019 that condenses volatiles, aromas, and other substances (e.g., emitted from the wet-milled coffee during drying, agglomerating, and/or coating) out of the inert gas and into liquid form (e.g., water containing the volatiles, aromas, and other substances); 10) a coalescent condenser and filter 7020 that recovers and separates the liquid containing the condensed volatiles, aromas, and other substances from the inert gas, and outputs the liquid part to recovery and extraction processes described herein; 11) one or more inert gas fans 7021 that accelerate the inert gas through the distribution pipeline 7010; 12) a second heat exchanger 7022 that heats the inert gas prior to the distribution pipeline 7010 delivering the inert gas to the input of the inert FBD unit 7005; 13) a post-condenser 7023 that condenses volatiles, aromas, and other substances out of the inert gas; 14) a secondary heat exchanger 7024 that heats the inert gas prior to the distribution pipeline 7010 delivering the inert gas to the input of the FBD unit 7005; and 15) a third HEPA filter 7025 that removes particulates, dust, and other contaminants from the inert gas before delivery into the FBD unit 7005

Exemplary Formulations

In one or more embodiments, provided herein are exemplary formulations for coffee mass (or coffee fraction-based) products. In at least one embodiment, as used herein, "coffee liquor" can generally refer to a coffee mass (or coffee fraction) ingredient, thus, coffee liquor can be used interchangeably herein with the coffee mass (or coffee fraction) described herein. Thus, in various embodiments coffee liquor, coffee mass, and coffee fraction can refer to a liquid, solid, or hybrid thereof (e.g., a paste) prepared, as described herein, from coffee ingredients and other ingredients.

In various embodiments, the formulations described herein (and coffee liquor ingredient included therein) can be produced under inert conditions and in the absence of oxygen, or may be produced (as described herein) in the presence of oxygen (e.g., all other processes occurring as described herein, under ambient atmosphere conditions).

In at least one embodiment, to produce chunks, morsels, batons, sticks, and/or other products, processes described herein can be performed at lower temperatures to avoid premature melting of the chunks, morsels, batons, sticks, and/or other products.

According to one embodiment, dairy ingredients can include equivalent non-dairy substitute ingredients, such as, for example, plant-based dairy alternatives. In one or more embodiments, the formulations described herein can include other biomaterials (e.g., in addition to or substitution of other ingredients), such as teas, flavoring agents, spices, and other biomaterials.

TABLE 1

Exemplary formulation for a coffee mass product.
Fat-Based Ganache

| Ingredient | % Weight |
|---|---|
| Sugar | 45.0-55.0 |
| Lecithin (any) | 0.1-2.0 |
| Dairy Ingredients | 9.5-25.0 |
| Coffee Mass | 5.0-15.0 |
| Vegetable Oil | 10.0-20.0 |
| Vegetable Fat | 9.0-25.0 |

Table 1 includes an exemplary formulation for a coffee-based product, in particular, a fat-based ganache. In one embodiment, the exemplary fat-based ganache formulation includes approximately: 45.0% weight sugar; 0.5% weight lecithin; 16.0% weight dairy ingredients; 10.0% weight coffee mass (as produced/described herein); 15.5% weight vegetable oil; and 14.5% weight vegetable fat.

According to a particular embodiment, the exemplary fat-based ganache formulation includes approximately: 45.0-48.0% weight sugar; 0.1-2.0% weight lecithin; 12.0-19.0% weight dairy ingredients; 6.0-12.0% weight coffee mass (as produced/described herein); 14.0-17.0% weight vegetable oil; and 15.0-18.0% weight vegetable fat.

TABLE 2

Exemplary formulation for a coffee mass product.
Chunks 1

| Ingredient | % Weight |
|---|---|
| Sugar | 25.0-40.0 |
| Lecithin (any) | 0.1-2.0 |
| Dairy Ingredients | 8.0-32.0 |
| Cocoa Butter | 25.0-40.0 |
| Coffee Mass | 5.0-15.0 |
| Vegetable Fat | 1.0-10.0 |
| Vegetable Oil | 1.0-10.0 |

Table 2 includes an exemplary formulation for a coffee-based product, in particular, a first formulation for chunks. In one embodiment, the exemplary first formulation for chunks includes approximately: 33.0% weight sugar; 0.5% weight lecithin; 20.5% weight dairy ingredients; 35.0% weight cocoa butter; 6.5% weight coffee mass (as produced/described herein); 4.0% weight vegetable fat; and 4.0% weight vegetable oil.

According to a particular embodiment, the exemplary first formulation for chunks includes approximately: 31.0-34.0% weight refined sugar; 0.1-2.0% weight lecithin; 13.5-21.5% weight dairy ingredients; 33.0-36.0% weight cocoa butter; 5.0-8.0% weight coffee mass (as produced/described herein); 3.0-5.0% weight vegetable fat; and 3.0-5.0% weight vegetable oil.

TABLE 3

Exemplary formulation for a coffee mass product.
Chunks 2

| Ingredient | % Weight |
|---|---|
| Sugar | 30.0-45.0 |
| Cocoa Butter | 5.0-15.0 |
| Specialty Fat | 15.0-25.0 |
| Lecithin (any) | 0.1-2.0 |
| Dairy Ingredients | 10.0-20.0 |
| Bulk ingredient (e.g., maltodextrin) | 5.0-10.0 |
| Coffee Mass | 5.0-15.0 |

Table 3 includes an exemplary formulation for a coffee-based product, in particular, a second formulation for chunks. In one embodiment, the exemplary second formulation for chunks includes approximately: 38.0% weight sugar; 7.5% weight cocoa butter; 22.0% weight specialty fat; 0.5% weight lecithin; 17.1% weight dairy ingredients; 7.4% weight bulk ingredient (e.g., maltodextrin); and 7.5% weight coffee mass (as produced/described herein).

According to a particular embodiment, the exemplary second formulation for chunks includes approximately: 36.0-39.0% weight sugar; 6.0-10.0% weight cocoa butter; 20.0-24.0% weight specialty fat; 0.1-2.0% weight lecithin; 14.0-20.0% weight dairy ingredients; 6.0-8.0% weight bulk ingredient (e.g., maltodextrin); and 6.0-10.0% weight coffee mass (as produced/described herein).

TABLE 4

Exemplary formulation for a coffee mass product.
Chunks 3

| Ingredient | % Weight |
|---|---|
| Sugar | 25.0-35.0 |
| Cocoa Butter | 25.0-35.0 |
| Inulin | 10.0-20.0 |
| Lecithin (any) | 0.1-2.0 |
| Dairy Ingredients | 10.0-20.0 |
| Coffee Mass | 5.0-15.0 |

Table 4 includes an exemplary formulation for a coffee-based product, in particular, a third formulation for chunks. In one embodiment, the exemplary third formulation for chunks includes approximately: 30.0% weight sugar; 30.0% weight cocoa butter; 15.0% weight inulin; 0.5% weight lecithin; 16.0% weight dairy ingredients; and 8.5% weight coffee mass (as produced/described herein).

According to a particular embodiment, the exemplary third formulation for chunks includes approximately: 29.0-32.0% weight sugar; 29.0-32.0% weight cocoa butter; 13.0-16.0% weight inulin; 0.1-2.0% weight lecithin; 14.0-20.0% weight dairy ingredients; and 6.0-9.0% weight coffee mass (as produced/described herein).

TABLE 5

Exemplary formulation for a coffee mass product.
Chunks 4

| Ingredient | % Weight |
|---|---|
| Cocoa Mass | 1.0-7.0 |
| Cocoa Butter | 7.0-15.0 |
| Cocoa Powder | 5.0-10.0 |
| Dairy Ingredients | 3.0-21.0 |
| Sugar | 30.0-50.0 |
| Lecithin (any) | 0.1-2.0 |

TABLE 5-continued

Exemplary formulation for a coffee mass product.
Chunks 4

| Ingredient | % Weight |
|---|---|
| Specialty Fat | 7.0-15.0 |
| Coffee Mass | 5.0-12.0 |

Table 5 includes an exemplary formulation for a coffee-based product, in particular, a fourth formulation for chunks. In one embodiment, the exemplary fourth formulation for chunks includes approximately: 3.5% weight cocoa mass; 12.0% weight cocoa butter; 6.5% weight cocoa powder; 12.0% weight dairy; 44.5% weight sugar; 0.5% weight lecithin; 12.0% weight specialty fat; and 9.0% weight coffee mass (as produced/described herein).

According to a particular embodiment, the exemplary fourth formulation for chunks includes approximately: 2.0-5.0% weight cocoa mass; 11.0-13.0% weight cocoa butter; 5.0-8.0% weight cocoa powder; 6.0-11.0% weight dairy ingredients; 43.0-46.0% weight sugar; 0.1-2.0% weight lecithin; 11.0-13.0% weight specialty fat; and 7.0-10.0% weight coffee mass (as produced/described herein).

TABLE 6

Exemplary formulation for a coffee mass product.
Chunks 5

| Ingredient | % Weight |
|---|---|
| Refined Sugar | 30.0-45.0 |
| Specialty Fat | 25.0-35.0 |
| Lecithin (any) | 0.1-2.0 |
| Dairy Ingredients | 10.0-20.0 |
| Bulk ingredient (e.g., maltodextrin) | 5.0-10.0 |
| Coffee Mass | 5.0-10.0 |

Table 6 includes an exemplary formulation for a coffee-based product, in particular, a fifth formulation for chunks. In one embodiment, the exemplary pieces formulation includes approximately: 37.5% weight sugar; 30.5% weight specialty fat; 0.5% weight lecithin; 17.0% weight dairy ingredients; 7.0% weight bulk ingredient (e.g., maltodextrin); 7.5% weight coffee mass (as produced/described herein).

According to a particular embodiment, the exemplary pieces formulation includes approximately: 36.0-39.0% weight sugar; 29.0-32.0% weight specialty fat; 0.1-2.0% weight lecithin; 14.0-20.0% weight dairy ingredients; 6.0-8.0% weight bulk ingredient (e.g., maltodextrin); and 6.0-9.0% weight coffee mass (as produced/described herein).

TABLE 7

Exemplary formulation for a coffee mass product.
Icing/Frosting

| Ingredient | % Weight |
|---|---|
| Sugar | 37.0-50.0 |
| Specialty Fat | 7.0-15.0 |
| Lecithin (any) | 0.1-2.0 |
| Dairy Ingredients | 7.5-27.0 |
| Coffee Mass | 5.0-10.0 |
| Vegetable Fat | 5.0-10.0 |
| Vegetable Oil | 10.0-25.0 |

Table 7 includes an exemplary formulation for a coffee-based product, in particular, icing/frosting. In one embodiment, the exemplary icing/frosting formulation includes approximately: 43.5% weight sugar; 12.0% weight specialty fat; 0.5% weight lecithin; 15.5% weight dairy ingredients; 7.0% weight coffee mass (as produced/described herein); 7.5% weight vegetable fat; and 14.0% weight vegetable oil.

According to a particular embodiment, the exemplary icing formulation includes approximately: 42.0-45.0% weight sugar; 10.0-13.0% weight specialty fat; 0.1-2.0% weight lecithin; 10.1-21.5% weight dairy ingredients; 6.0-9.0% weight coffee mass (as produced/described herein); 6.0-9.0% weight vegetable fat; and 11.0-14.0% weight vegetable oil.

TABLE 8

Exemplary formulation for a coffee mass product.
Coating 1

| Ingredient | % Weight |
|---|---|
| Sugar | 40.0-50.0 |
| Specialty Fat | 25.0-35.0 |
| Lecithin (any) | 0.1-2.0 |
| Dairy Ingredients | 3.0-15.0 |
| Bulk ingredient (e.g., maltodextrin) | 1.0-7.0 |
| Coffee Mass | 10.0-15.0 |

Table 8 includes an exemplary formulation for a coffee-based product, in particular, a first coating. In one embodiment, the exemplary first coating formulation includes approximately: 44.5% weight sugar; 27.5% weight specialty fat; 0.5% weight lecithin; 9.5% weight dairy ingredients; 4.5% weight bulk ingredient (e.g., maltodextrin); and 13.5% weight coffee mass (as produced/described herein).

According to a particular embodiment, the exemplary first coating includes approximately: 43.0-46.0% weight sugar; 26.0-29.0% weight specialty fat; 0.1-2.0% weight lecithin; 7.0-13.0% weight dairy ingredients; 3.0-6.0% weight bulk ingredient (e.g., maltodextrin); and 12.0-15.0% weight coffee mass (as produced/described herein).

TABLE 9

Exemplary formulation for a coffee mass product.
Coating 2

| Ingredient | % Weight |
|---|---|
| Sugar | 30.0-45.0 |
| Specialty Fat | 25.0-35.0 |
| Lecithin (any) | 0.1-2.0 |
| Dairy Ingredients | 9.0-22.0 |
| Cocoa Powder | 5.0-15.0 |
| Coffee Mass | 5.0-15.0 |

Table 9 includes an exemplary formulation for a coffee-based product, in particular, a second coating. In one embodiment, the exemplary second coating formulation includes approximately: 35.5% weight sugar; 30.0% weight specialty fat; 0.5% weight lecithin; 16.0% weight dairy ingredients; 9.0% weight cocoa powder; and 9.0% weight coffee mass (as produced/described herein).

According to a particular embodiment, the exemplary second coating includes approximately: 34.0-37.0% weight sugar; 29.0-32.0% weight specialty fat; 0.1-2.0% weight lecithin; 14.0-20.0% weight dairy ingredients; 8.0-11.0% weight cocoa powder; and 8.0-11.0% weight coffee mass (as produced/described herein).

TABLE 10

Exemplary formulation for a coffee mass product.
Coating 3

| Ingredient | % Weight |
|---|---|
| Sugar | 20.0-30.0 |
| Specialty Fat | 25.0-35.0 |
| Lecithin (any) | 0.1-2.0 |
| Dairy Ingredients | 9.0-22.0 |
| Cocoa Powder | 5.0-15.0 |
| Inulin | 5.0-15.0 |
| Coffee Mass | 5.0-15.0 |

Table 10 includes an exemplary formulation for a coffee-based product, in particular, a third coating. In one embodiment, the exemplary third coating formulation includes approximately: 25.5% weight sugar; 30.0% weight specialty fat; 0.5% weight lecithin; 16.0% weight dairy; 9.0% weight cocoa powder; 10.0% weight inulin; and 9.0% weight coffee mass (as produced/described herein).

According to a particular embodiment, the exemplary third coating formulation includes approximately: 24.0-27.0% weight sugar; 29.0-32.0% weight specialty fat; 0.1-2.0% weight lecithin; 14.0-20.0% weight dairy ingredients; 8.0-11.0% weight cocoa powder; 9.0-12.0% weight inulin; and 8.0-11.0% weight coffee mass (as produced/described herein).

Exemplary Multi-Stream Process

In at least one embodiment, particular biomaterial (e.g., coffee) processing steps and non-particular biomaterial (e.g., non-coffee material) processing steps may be separated into two or more separate streams of processing (e.g., dual-stream, tri-stream, etc.). In various embodiments, coffee and non-coffee streams may be separated at the beginning of processing (or at an early processing step), and the coffee and non-coffee streams may be joined (or the materials produced therein may be combined) at later steps in the process (e.g., the end of each stream). According to various aspects of the present disclosure, combination of the coffee and non-coffee streams yields a coffee-based mass that may be shaped into a moulded product or any other form.

As will be understood from discussions herein, in various embodiments, preparation of composite coffee products may require incorporation of a variety of ingredients and additives (e.g., depending on the proposed utilization of the finished products). In one or more embodiments, a wide variety of food and beverage products could be prepared using single coffee mass, using processing technology employed for chocolate products, but heavily modified (e.g., as described herein) due to present technology being very different in many aspects (e.g., given the nature of coffee and/or coffee precursor components). In at least one embodiment, the coffee ingredients described herein (e.g., encapsulated and milled roast and ground coffee, coffee liquor, etc.) may be combined in variable proportions with a plurality of functional food ingredients including, but not limited to, vegetable and animal ingredients, and derivatives thereof, thereby forming one or more consumable formulations. For example, one or more formulations may include, but are not limited to: 1) baked or fried goods; 2) beverages; 3) cereals; 4) yogurts; 5) cheesecakes and other refrigerated desserts; 6) ice creams and other frozen desserts; 7) custards, gelatins and fillings, or the like; 8) toppings; 9) fruits; 10) nuts (whether roasted, coated, or otherwise); 11) syrups and spreads, or the like; 12) dressings, sauces and condiments, or the like; 13) confectionery fruits and/or panned products; 14) dips; 15) sweet and/or savory snacks; 16) chocolates; 17) confectionery sweets; 18) jams and jellies, or the like; and 19) other specialty foods and beverages. There may be specific technological differences between chocolate and coffee processes, due to the distinct nature and properties of the two biomaterials under consideration.

Cocoa liquor (mass), a basic ingredient of chocolate manufacture, contains pre-existing aroma and flavor precursors, developed through the combination of the cocoa fermentation (carried out at the farm level), which were only partly converted into chocolate volatile and non-volatile aromas, tastes and flavors during the roasting process. Because the cocoa liquor typically contains around 52% cocoa butter, these formed compounds (e.g., aromas) are properly retained, locked-in and protected within this functional ingredient. In various embodiments, a conching process in chocolate manufacture performs both key and secondary contribution to the chocolate manufacturing by: 1) stripping residual water (which otherwise contributes for the increase of viscosity) of the cocoa/chocolate mass; 2) completing of over 75% of final aroma and flavor development of the chocolate; and 3) eliminating, through the stripping step, some of the off-flavors associated with the cocoa liquor and other ingredients.

Exemplary differences between chocolate processing technology and edible coffee technology (e.g., one or more aspects of the present technology) may exist. For instance, even in the case of non-fermented dried green coffee beans, the precursors of aroma are already present (in great amount) in the coffee beans. In various embodiments, when the coffee is roasted, over 90% of the volatile and non-volatile chemicals responsible for the coffee aroma and flavor may be formed within the bean constituents, due to the primary presence of both reactive sugars and amino groups. Under high roasting temperatures employed in one or more embodiments, the volatile and non-volatile chemicals may undergo a dramatic sequence of reactions, known as Maillard reaction or non-enzymatic browning. In at least one embodiment, the sequence of reactions culminating with the formation of hundreds of volatiles and non-volatile compounds may be finalized with the accumulation of melanoidins, a powerful antioxidant in roasted coffee. In various embodiments, induction of further flavor development in coffee, through solid-phase reactions may compromise—rather than help the coffee flavor formation and retention.

Moreover, although the coffee flavor volatiles and non-volatiles encompass well over 1,000 compounds, only about 51 chemicals may be directly responsible for the coffee aromatic "bouquet" and non-volatile coffee oil, which is one the main flavor components due to its ability to carry and retain many coffee volatile aromas. In addition, the about 51 chemicals may retain most of the lipo-soluble non-volatile aromas that contribute to the coffee flavor. In various embodiments, the coffee oil (e.g., being a PUFA-type oil prone to earlier/easier oxidation) under the traditional roasting process (e.g., high temperatures, relatively long processing time) and under the presence of $O_2$ may be adversely affected by one or more roasting processes, as demonstrated by its relatively short shelf-life. In at least one embodiment, the adverse effects may be conferred to a finished product (roast and ground coffee), to which the coffee oil is an important component (which can be approximately 14-17% of the total). To avoid such adverse effects, the present technology may ensure (e.g., from the very beginning of the process) the use of effective protective measures for the coffee oil such as roasting in the absence of $O_2$. Additional protective measures presented by the present technology may further include, but are not limited to, division of present processing technology into two streams, wherein the most impactful thermo-mechanical aspects of the present processing technology are reserved to a non-coffee fraction of the coffee formulation. In various embodiments, the two streams may be: 1) a coffee processing phase, resulting in a first fraction (referred to as fraction #1); and 2) a non-coffee processing phase, resulting in a second fraction (referred to as fraction #2).

In one or more embodiments, combination, or lack thereof, of fraction #1 and fraction #2 (e.g., in variable proportions) may define one or more characteristics of a finished product as well as applications of the finished product (e.g., if simple or composite coffee mass). In at least one embodiment, any of the fractions and combination of the two fractions in various proportions may be formed and/or transformed into a commercial finished product that may present one or more features including, but not limited to: 1) being made with one or more entire coffee bean, one or more types of coffee beans, or coffee beans from one or more origins or sources; and 2) being protected against oxidation for over 1 year without addition of any additive and/or, in certain applications, without need of refrigeration for maintaining its physicochemical and organoleptic integrity.

In particular embodiments, in the first stream, coffee (or another biomaterial) may be converted into a coffee liquor and/or coffee liquor mass via special cryogenic milling and other processing steps described herein. In certain embodiments, coffee liquor may be stored as a functional ingredient and may be prepared for blending with other materials and ingredients. In some embodiments, blending processes for blending coffee liquor with other materials and ingredients may be performed in a time period up to about 2 hours. According to one embodiment, blending the coffee liquor with the other materials and ingredients may be performed in a time period of 10 minutes, 30 minutes, 1 hour, or other time periods suitable for homogenously blending the coffee liquor with the other materials and ingredients.

In various embodiments, the system includes one or more secondary processing stream running in parallel to or concurrently with the first stream, which may include non-coffee ingredients for making a coffee liquor product, molded, or otherwise. For example, a secondary stream may process ingredients such as sugars, dairy derivatives, complementary fat systems, bulk ingredients (e.g., maltodextrins, starches), etc. In at least one embodiment, a secondary stream may utilize a modified conching process, which initially eliminates/minimizes off-flavors from selected ingredients, dramatically reduces residual moisture, induces changes in the rheology of the mass, and promotes flavor and color reactions, such as the Maillard reactions through solid-phase reaction.

In certain embodiments, the processing time for loading, dry conching, (partial) wet conching, (partial) homogenization, and wet milling (through recirculation), may be up to about 6-8 hours. According to one embodiment, the processing time may be between about 10-300 minutes. In various embodiments, processing time may depend on one or more factors, such as, for example, the initial quality of distinct biomaterials or the initial quality of distinct ingredients other than biomaterials.

In at least one embodiment, in response to completing processing of one or more secondary streams, the first stream material may be processed in a conche and blended with output material from the one or more secondary stream (e.g., to complete homogenization) to form a homogenous coffee liquor (or other biomaterial) product. In various embodiments, the coffee liquor product may then be prepared for tempering, molding, and packaging.

According to various aspects of the present disclosure, the exemplary multi-stream process may reduce the overall industrial cost, reduce the industrial processing time (typically from up to 13 hours, to less than 5 hours), increase product uniformity of the finished product (e.g., coffee mass homogeneity in particle size and target viscosity), and reduce overall fat percentage levels of the finished coffee product.

In various embodiments, coffee beans of different origins and/or different levels of roasting may be processed in multiple streams and combined to create balanced, full-bodied coffee liquor products. In some embodiments, inclusion of more than one type and roast level of coffee may affect the rheology of the coffee during wet milling processes described herein.

As will be understood, the cellulosic and hemi-cellulosic composition of the coffee beans may behave as a plastic and absorb the impact of the mill, thereby prolonging milling time to mill the coffee to a predetermined size (e.g., about 20 microns). While the coffee is milled, non-coffee biomaterials present in the recipe may be over-milled, down to about 6-8 microns. In at least one embodiment, the non-coffee or coffee materials may include sufficient fats to lubricate the particles.

In various embodiments, the present disclosure provides systems and methods for timely and efficient milling of coffee to small particle sizes (e.g., less than 20 microns). In at least one embodiment, the present systems and methods can achieve coffee (and other biomaterial) milling in less time as compared to the time required by previous approaches, because the present systems and methods allow for coffee particles to transition from a plastic state to a glassy state, thus allowing the breakage (by impact) of plastic-like particles when the coffee particles are re-conditioned to a glassy state.

Modified Conch-Less Processing

In at least one embodiment, the present disclosure provides systems and methods for processing chocolate or other biomaterials via a distinct solid-phase reaction process (rather than previous approaches that perform conventional conching techniques). According to various aspects of the present disclosure, wet milling (through recirculation) can occur following completion of a homogenization/plasticization stage (e.g., and not before a dry conching, as per exemplary Swiss method(s)). In various embodiments, substitution of previous conching techniques may be achieved by implementing unit operations via equipment including, but not limited to: 1) a blender; 2) a two-stage fluid bed dryer-cooler; 3) a twin screw extruder; 4) cryogenic mill; 5) a ribbon mixer; and 6) combined steam stripping with fractionated distillation column (equipped with cryogenic condensers).

In various embodiments, the first unit operation can include loading the biomaterial (except free fat, lecithin, flavoring agents, and additives) into a closed-loop blender (sigma, ribbon or conical screw-type mixer), operating under inert gas atmosphere and blended until reaching a homogeneous mixture.

In at least one embodiment, the homogenous mixture may be dried (e.g., to below about 1.5% residual moisture) and/or cooled via a two-stage fluid bed dryer-cooler. In various embodiments, the two-stage fluid bed dryer-cooler may operate in a closed-loop and may utilize inert gas(es) to prevent any contact of the homogenous mixture with atmospheric oxygen (at both the drying and the cooling phases of the process).

In one or more embodiments, the dried and cooled homogenous mixture (which may have a residual moisture of less than about 1.5%) may be loaded into a feed hopper that feeds an extruder. In at least one embodiment, the feed hopper may include an auger feeder with a feed-throat to control the flow through the hopper. In various embodiments, the feed hopper may receive and deliver the homogenous mixture under inert gas conditions and in complete absence of atmospheric oxygen.

In at least one embodiment, the extruder may cause transformation of the homogenous mixture into a homogenous non-coffee fraction by causing efficient solid-phase reactions. In one or more embodiments, the extruder may increase the flavor formation reactions, due to at least the following: 1) low moisture of the homogenous mixture favors the Maillard reaction (and other sequential reactions), thereby facilitating immediate reaction that transitions the homogenous mixture into the non-coffee fraction; 2) the combination of high-process shearing, impacting, friction, and temperature within the extruder facilitates a higher intensity degree of the Maillard reaction; 3) the low-fat content of a pre-mix provides efficient reactive surface for the solid particles to increase solid-phase reactions due to precise processing conditions within the extruder, thereby accelerating conching effect processes (e.g., from about 5-6 hours to less than about 10-30 minutes); and 4) process parameter optimization allows for obtaining high throughputs of non-coffee fraction formulations.

In at least one embodiment, the extruder may include an intermeshing twin-screw configuration. In various embodiments, the extruder may be assembled in a structure including a heavy bed plate where six heavy steel supporting columns may be attached to the extruder (e.g., four columns for supporting a main barrel, and two columns supporting the remaining elements of the extruder). In at least one embodiment, the extruder may include, but is not limited to, a screwdriver motor equipped with a frequency inverter, reducing gearbox and hopper feeder.

In various embodiments, a central panel may be equipped with a plurality of elements for controlling the extruder, the plurality of elements including, but not limited to: motor switches, band heater controllers, thermostat, thermistor and/or thermocouple control switches, cryogenic gas expansion valves for a cooling system, barrel (PID) temperature gauges, heating and cooling elements controls, controls for opening and closing of the twin screw main body (e.g., the twin barrel or a stator), pressure gauges for reaction areas of the main barrel, controls for a screws feeder, the armored revolving screw changer, screws rotating input/output, metering pumps dosing, feed rate input/output, screws torque, die temperature, rotary knife (cutting system) rotation, safety controls, and other controls for the system.

In a particular embodiment, the barrel may be jacketed and equipped with efficient systems for both cooling and heating (per each section of the twin screws along the processing extruder barrel), with precise temperature controls, from 1 to 90 degrees Celsius (or about a melting point of one or more coffee mass ingredients described herein) or higher, at pressures ranging from 1 to 5 Bar. In at least one embodiment, the system may also include removable liners for the barrel covers, pressure gauges and sensors in the key transition (processing) areas of the barrel, two other insertion areas where ingredients can be added directly in the barrels (respectively for eventual addition of various/special reactants and for heat-sensitive additives).

In at least one embodiment, the twin-screws may be specially designed, where the screws may be designed or modified to include fabrication changes to: 1) the screws root; 2) the channel width; 3) the flight; 4) the axial flight width; 5) the helix angles; 6) the pitches (variable); 7) the screw clearance; 8) the barrel length; 9) the barrel diameter; and 10) special twin-screw designs for providing precise and controllable reaction rates, time-temperature and reaction times.

In at least one embodiment, the edge of the twin-screw barrel may include a vacuum degassing port system for degassing and volatilization, integrated with the breaker plate, where there is an extrusion head, a pipe die, a screen pack, and a rotary knife cutting system, from which the extruder product exits in a closed loop chamber with a stream of inert gas that mixes with the exhausting gas, and is directly coupled to a fractionation column for off-flavors vent and volatile (cryogenic) recovery.

According to various aspects of the present disclosure, for selected special roasted products, the equipment may also be additionally equipped with a secondary vacuum sizing system, which may be coupled to the outlet of the main extruder, which allows for the process to operate under vacuum, controlled reaction (e.g., cooled with circulation of cooled refrigerant gas), thus further facilitating the control of the end-process reaction.

In at least one embodiment, the product from the twin-screw extruder may be subsequently (e.g., immediately) cooled through direct contact with the cryogenic (inert) gas, through means of a spray placed inside the screw conveyor that feeds the mill from the top.

In various embodiments, the product may be processed when its temperature reaches about −80 degrees Celsius, so that the biomaterial is completely in a brittle form.

In a particular embodiment, the process may implement stainless steel milling balls of various diameters, for example diameters of 0.5 and 0.7 mm, milling at a speed of 250 rpm.

According to various aspects of the present disclosure, the process may mill particles to lower than 20 microns in around 20 minutes (under industrial scale conditions).

In certain embodiments, the extruded product may be a type of chocolate in flavor and taste, and furthermore in a somewhat irregular solid form (depending on the die utilized in the process). In particular embodiments, for using the product as chocolate, the product may be mixed with cocoa butter and/or other suitable fat/oil system combinations, according to its planned end use. The finished product may be versatile for use in food and beverage applications, such as in (but not limited to): formulation of chocolate bars, chocolate powders, chocolate spreads, and a variety of applications in refrigerated or frozen desserts, sugar and/or chocolate baked and fried goods, breakfast cereals, power bars, etc.

In at least one embodiment, the ribbon mixer equipment may include a double helicoid rotating shaft with ancillary paddles and stator devices to facilitate the creation of turbulence during the mixing operation. In various embodiments, the mixer may be designed to operate in closed-loop and under a suitable inert gas. Depending on the end use of the product, the processing temperature may range between 1-70 degrees Celsius via heated and/or cooled equipment walls. In some embodiments, the mixer may exhibit variable rotation ranging from 10 to 100 rpm.

In various embodiments, the ribbon mixer may be equipped with an efficient fat/oil spraying system, to facilitate uniform incorporation into the mass. Other ingredients and additives may be employed at this stage, such as lecithin, polyglycerol polyricinoleate ("PGPR"), and various other food-grade additives. The equipment may exhibit sanitary design and may be easy to clean and sanitize. Processing times may be variable; however, they may typically be between 5 min to 1 hour. The equipment may be assembled in a platform to facilitate the discharge to inert gas locked-in totes, silos, or directly to the feeding silos of the packaging line.

In at least one embodiment, the system may combine an initial steam stripping operation (e.g., injection of 1-15% of water vapor, and/or SHS e.g., super-heated steam), to eliminate the initial off-flavors through the distillation column venting. In some embodiments, the system temperatures may reach about 65° C. According to various aspects of the present disclosure, extraction and cryogenic condensation of the volatile organic compounds ("VOCs") may be achieved through a controlled injection of any suitable inert gas (through the fractionation column). Within the fractionation column, the stream of gases (volatiles) may pass through successive trays (typically 3 to 5 trays), which may be differentiated through inner circulation of cryogenic liquids or gases at various pressures and/or temperatures. In various embodiments, the volatile gases (e.g., flavor compounds) may be finally recovered as condensates (from the collection streams of the trays) of these streams, under cryogenic conditions, and the recovered flavor fractions may be added back to the main processed mass. According to various aspects of the present disclosure, the process may be semi-continuous and may operate in synchronization with the previous blending stage(s).

Exemplary Agri-Industrial Processing Steps

In at least one embodiment, the systems and methods herein may include (cocoa is exemplary, any biomaterial may be used as appropriate): a) cocoa harvesting; b) cocoa beans fermentation; c) cocoa beans drying, bagging and storage; d) cocoa beans industrial intake; e) cocoa beans dry cleaning; f) cocoa beans wet cleaning; g) cocoa bean drying; h) cocoa bean roasting in absence of oxygen; i) cocoa bean dehulling; j) cocoa nibs cryogenic pre-milling (coarse); k) fat extraction from crushed cocoa nibs through SCFE; and l) conch-less processing as described above, implementing unit operations via equipment including, but not limited to: 1) a blender; 2) a two-stage fluid bed dryer-cooler; 3) a twin screw extruder; 4) cryogenic mill; 5) a ribbon mixer; and 6) combined steam stripping with fractionated distillation column (equipped with cryogenic condensers)).

According to various aspects of the present disclosure, the wet milling (through recirculation) may be carried out at the end of the homogenization/plasticization stage (and not before dry conching, as per traditional methods). An exemplary process for manufacturing instant powdered cocoa (and other products) includes: a) cocoa harvesting; b) cocoa beans fermentation; c) cocoa beans drying, bagging and storage; d) cocoa beans industrial intake; e) cocoa beans dry cleaning; f) cocoa beans wet cleaning; g) cocoa bean drying; h) cocoa bean roasting in absence of oxygen; i) cocoa bean dehulling; j) cocoa nibs cryogenic pre-milling (coarse); k) fat extraction from crushed cocoa nibs through SCFE; and l) conch-less processing as described above, implementing unit operations via equipment including, but not limited to: 1) a blender; 2) a two-stage fluid bed dryer-cooler; 3) a twin screw extruder; 4) cryogenic mill; and 5) a ribbon mixer (omitting the combined steam stripping with fractionated distillation column (equipped with cryogenic condensers)); m) fluid bed agglomeration/instantization/cooling, under closed-loop, inert gas system; and n) instant cocoa or chocolate powder packaging.

Exemplary Processing with Alternative Oils

In various embodiments, oils from various biomaterials such as avocados, almonds, and hazelnuts, may be added to processed (or pre-processed) coffee (e.g., coffee processed as discussed herein). In particular embodiments, the oils may be derived from fruits or nuts, and the oils may be refined, bleached, and deodorized (RBD) to avoid the introduction of additional off-flavors. In a particular embodiment, processing the oils and coffee may include pre-selecting the roasted beans to be milled, thus eliminating the substandard particles and beans, and the process may be based on ultra-milled coffee liquor under cryogenic conditions, allowing for optimal use of the product in food and beverages.

In at least one embodiment, the above coffee-oil preparations may be used in the following exemplary ways: 1) sold as a brewed coffee 'gourmet' enhancer, ready to use (e.g., as concentrated liquid) and readily soluble/dispersible; 2) used in commercial preparation of beverages, such as ready-to-drink (RTD) beverages, hot coffee, hot chocolate, or hot tea beverages—primarily in the form of coffee enhancer and dairy cream, both as non-dairy and dairy cream substitute; 3) in coffee liquor (e.g., 20-40% (coffee enhancer only) and special additives (oils) or with butter oil (coffee dairy cream) and special additives (oils)); and 4) adapted to be suitable also as for cold brew (serving) option. Exemplary equipment and steps for manufacturing the above may include one or more of: a) a line to prepare coffee liquor (from roasted coffee); b) cryogenic milling equipment; c) a package line (e.g., product to be packaged in pails or individual units); d) a line for filling out in cream-type individual or jar type dosing pet packages with removable aluminum seal.

Exemplary Alternative Coffee Liquor Manufacturing Processes

In an alternative embodiment, the systems and methods herein include alternative processing for coffee liquor via the following steps: a) reception and storage of the ingredients (oils, fats, green coffee beans); b) green coffee beans dry and wet cleaning/drying and storage; c) green coffee beans roasting under inert atmosphere; d) roasted coffee dry-milling (e.g., to 50-120 microns) under inert atmosphere; e) melting and storage of the fats and/or oils (under inert gas); f) weighing an transfer of ingredients to a ribbon or sigma mixer (operating under inert gas conditions); g) mixing (e.g., for 1-30 min)/addition of optional (other) ingredients; h) under cryogenic conditions, wet milling (using a horizontal or vertical cryogenic ball mill) the coffee mass to 10-40 microns to, in part, prevent oxidation of the mass at high temperature; i) conching under inert gas conditions; j) blending with other conched, refined ingredients; k) tempering; l) molding or optional chips dosing; m) cooling tunnel pre-crystallization; n) product un-molding; o) primary and secondary packaging; p) storage and post-crystallization; and q) shipment.

In some embodiments, the above alternative processes may be used for: i) creating products used as a solid coffee mass, in the form of bars, chips, morsels, chunks, etc.; ii)

creating products utilized alone or as a functional ingredient in commercial preparation of hot or cold coffee—primarily as a black coffee enhancer, or in food applications, when combined with baked or fried goods, ice creams, cookies and crackers, frozen or refrigerated desserts, pies and tarts, etc.; iii) creating coffee mass with 5-40% (as black coffee enhancer only) (if combined with special additives); iv) creating coffee mass with 40-95% (as coffee dairy cream), if combined with butter oil and special additives); v) creating instant liquid formulas (ready-to-drink-type (RTD)) could be adapted to be suitable also as hot or cold coffee (serving) option. In at least one embodiment, a coffee enhancer formulation can include, in addition to coffee composite mass and/or other coffee-based ingredients described herein, about 7% by weight cocoa powder and 4% cocoa liquor, and other ingredients described herein.

In at least one embodiment, exemplary equipment for carrying out the above exemplary alternative processes includes: A) a line to prepare coffee mass (from green coffee); B) cryogenic milling equipment; C) direct dosing and/or moulding and tempering line; D) a secondary package line. As will be understood from discussions herein, coffee liquor in solid form may be shipped to a co-packer for filling out in cream-type individual or jar type dosing pet packages with removable aluminum seal.

In one or more embodiments, if formulated with other ingredients, the product may be shipped as a business-to-business arrangement, where other food and beverage lines of products may utilize the product as a functional ingredient to their products.

Exemplary Aroma Capture and Controlled Release

In various embodiments, aromas from the biomaterials (e.g., roasted coffee) may be captured and implemented for fragrance purposes. In particular embodiments, the coffee aromas may be captured via cosmetic preparation techniques to create a perfume (or similar compound) including various chemical functional groups such as (but not limited to): aldehydes, esters, alcohols, ketones, lactone, ethers, nitriles, etc. According to various embodiments, the biomaterials may be blended with various natural and/or synthetic materials for creating a stable and controllable fragrance compound. In certain embodiments, to increase the efficacy of any fragrance or flavoring, controlled release of the volatiles in implemented. In at least one embodiment, active volatiles may be released to the atmosphere at a desired place, time, and rate. This may be influenced by heat, temperature, pH-sensitive ingredients, etc.

In particular embodiments, the controlled release of the volatiles may be: 1) delayed; 2) sustained (prolonged); and/or 3) burst released. According to various aspects of the present disclosure, controlled release of volatiles may be achieved via encapsulation/microencapsulation, coacervation, co-crystallization, molecular inclusion, adsorption, etc. Accordingly, the controlled release mechanisms involve diffusion-controlled release, osmotic-controlled release, swelling-controlling release, solvent activated controlled release, or moisture-triggered controlled release, among others. In various embodiments, the controlled release of the aromas may be initiated by pressure, melting, pH changes, or changes in temperature, among others.

According to various aspects of the present disclosure, these active volatiles may be captured and stored within a material such as a rigid or flexible pad, natural and/or artificial flavoring (e.g., in solid, liquid, or gas form). In particular embodiments, these pads, flavors, or other materials may be included within the layers of particular packaging (e.g., within composite packaging laminates). In at least one embodiment, the packaging may include bags, boxes, or other forms of secondary and/or tertiary packages, and the packaging materials may be porous or semi-permeable to allow for the active volatiles to release through the packaging layers. In some embodiments, the active volatiles may be included on the exterior of the packaging, or the active volatiles may be included in a location proximate to one or more units of packaging to provide an area with the aroma. As such, the aroma provided by the active volatiles may influence human behavior (e.g., a consumer may purchase coffee beans in response to smelling the aroma provided by the active volatiles).

Process for Reduced Residual Moisture

Because of required application of both quenching and cooling unit operations (respectively to interrupt the thermolysis, followed by its stabilization), roasted coffee beans may contain up to 5% of entrapped moisture. This may present a limitation for the utilization of this functional ingredient in the formulation of products, molded or otherwise. In various embodiments, any residual moisture in the finished product beyond a predetermined residual threshold (e.g., about 1.25-5%) may be capable of significantly increasing the viscosity of the coffee mass, thus creating a hurdle for the moulding process, due to difficulties for proper dosing and filling the coffee mass into the moulds.

Discussed below is an alternative process for eliminating the residual moisture of roasted coffee beans without affecting the quality and intensity of the coffee aroma. In various embodiments, aspects of the present disclosure may allow for finished coffee products of lower viscosity and full natural coffee flavor, compared to what already may be true for some chocolate products.

In at least one embodiment, the process may include the following steps: 1) roasting coffee beans in the absence of oxygen; 2) dry milling of the coffee into a convenient particle size while in absence of oxygen, and under controlled low temperature, preferable under cryogenic conditions; 3) freeze-drying the roasted ground coffee under cryogenic conditions from 1 to 36 hours of total processing time, during which the coffee particles may be progressively heated in order to facilitate the sublimation of water. In some embodiments, the above process may be batch or continuous. In at least one embodiment, the process is continuous, and the freeze-drying chamber may be connected to a cryogenic condenser to recover the aromas in water, which would be followed by an aroma recovery column equipped with a secondary cryogenic condenser. According to a particular embodiment, the concentrated coffee aroma may then be added back at the end of the production process. In further embodiments, coffee (which may be dehydrated) may follow the coffee liquor production processes discussed herein until the liquor is ready and stored, and thus waiting to be proportionally blended with the conched-less coffee and refined product, so that the coffee mass is ready for tempering, dosing, moulding, demoulding, and packaged as finished product.

Quality Control Considerations

In various embodiments, one or more quality requirements of the present systems, methods, processes and products may be distinct (e.g., relative to one or more industry standards). For instance, other industry commercial grades of green coffee, a certain maximum number and types of defects are accepted, as it is assumed that these defects would not interfere in the overall brewed quality of the prepared coffee cups. Other industry brewing processes use a filter, and, thus, present a low extraction yield of the operation (typically around 20%). Other industry brewing processes present a residual moisture of the commercial brewed coffee as high as 5% due to the alleged need of industrial quenching practiced at the end of the roasting operation.

In various embodiments, systems and methods herein roast coffee (and related beverage materials) in absence of oxygen and quench roasted coffee (and other biomaterials at a lower level of residual moisture, to prevent staling (quenching may be feasible even if the residual moisture of the roasted coffee is as low as 1.14%). Thus, in various embodiments, the above-referred (and other) practices may be incompatible with the standards of quality envisaged for the novel edible coffee product and corresponding processing technology. Hence, as an entire bean may be utilized in the present systems, methods, and processes, the presence of defects in beans (e.g., immature, black, insect-perforated, fermented, etc.) is much less tolerated because the beans may be submitted to ultrafine-milling, wherein such defects may be highly amplified, due to the dramatic increase in surface area of the micro-particles generated.

In one example, to justify this negative amplification effect in the quality of edible coffee, depending on the percentage of defects in the green coffee raw material: 1) on average, 1 gram of regular grind coffee for other industry brewing processes has 1.0 mm particle size, thus counting around 1,296 particles/g and, therefore, presenting approx. 48 sq. Ft. (0.74 sq. m) of surface area; and 2) one gram of an ultra-ground coffee (defective) with an average of 20 microns (0.02 mm) particle size, counting around 100,646,912 particles/g, would present approx. 2,048 sq. ft. (190.3 sq. m) of surface area—a dramatic 77,660 (×) fold increase in the number of particles/g, i.e., with the negative potential impact to the resulting flavor of the edible coffee product, of course proportional to the percentage of the defects initially present in the raw material.

Thus, the present methods, systems and processes may call for the almost complete removal of the green coffee defects (e.g., to avoid propagation of defects such as described above). The present equipment, methods, systems and processes may be non-conventional, because one or more present equipment, methods, systems and processes may never been utilized (e.g., in other industry practices) in post-cleaning of commercial graded green coffees, due to the motives previously informed. In various embodiments, the present technology may be specifically designed to encompass two levels of cleaning (e.g., dry and wet), which, previously, may not be utilized in the coffee industry.

Exemplary Method for Further Extending Product Shelf Life

As will be understood from discussion herein, traditional roasting and milling of green coffee (and other biomaterials) can create staling of coffee aroma and taste (e.g., flavor). In addition, green coffee may slowly oxidize over a period of time (e.g., 6 months) dependent upon: 1) residual moisture (may become critical around 12% and higher); 2) temperature (may become critical around 30 degrees Celsius and higher); 3) relative humidity (may become critical around 55% and higher); 4) storage conditions (e.g., ideal conditions include clean and fresh ventilation); and 5) the presence of commercial impurities (exasperate effects of which may be exasperated during milling).

In addition, roasting coffee (and other biomaterials) can decrease aroma and taste, along with shelf life. The following may contribute to the degradation of aroma, taste and shelf life: a) direct or indirect heat system; b) roasting in atmosphere, which is deleterious for staling; c) quenching, where either the roasted hot coffee is spread with water, or simply dumped in an external rotary screen to cool down the roasted beans using blowing air (such quenching may accelerate an oxidation process due to high temperature); d) roasting processes may generate a relatively large amount (e.g, up to 5%) of pyrolysis gases, and entrap pyrolysis gases in coffee bean tissue (e.g., about 1-2% may remain in the coffee after up to 75 days storage). The pyrolysis gases may include about 87% carbon dioxide, 7.3% carbon monoxide, 5.3% nitrogen and approximately 0.4% volatile organic compounds, although other ratios can be used. In various embodiments, the consequence of the above is that roasted coffee (and other biomaterials) has a shelf life of a few weeks.

Milling may further accelerate staling and reduce product shelf life due to the following: i) a high volume of air during milling; ii) mechanical milling generates additional heat that may at partially flash-out certain volatiles, weakening aroma; and iii) expulsion of entrapped pyrolysis gases, rapidly reducing them from about 40-73% of the original content (once the pyrolysis gasses are removed, atmospheric oxygen may directly interact with coffee particles).

In addition to the processes described herein, shelf-life may be increased by blending, under inert gas conditions, a stoichiometric balanced quality of the following: calcium oxide or calcium hydroxide; magnesium oxide or magnesium hydroxide; sodium oxide or sodium hydroxide; and/or potassium oxide or potassium hydroxide.

In at least one embodiment, once the material (e.g., roast coffee) is blended with one or more of minerals above, the system may then cryogenically mill the roasted, blended material in the presence of one or more fats to encapsulate the roasted, blended material. In various embodiments, the resulting powdered product is protected from oxidation until the moment it is placed in contact with hot (or cold) water. In some embodiments, a stoichiometric reaction takes place, and, depending on the chemical/mineral additives present, there will be formation of the corresponding salts (e.g., carbon dioxide and calcium oxide form calcium carbonate; carbon dioxide and magnesium oxide form magnesium carbonate; carbon dioxide and sodium oxide form sodium carbonate; carbon dioxide and potassium oxide form potassium carbonate). As will be understood, the above salts are water-soluble and food-grade in particular quantities.

According to particular embodiments, a modified proposed process includes: 1) utilizing green coffees of superior grade only, e.g., with few visible defects; 2) cleaning, (dry and wet), followed by dehydration under inert gas; 3) roasting in absence of oxygen; 4) blending the roasted coffee with minerals discussed above (or others) under stoichiometric conditions; 5) conduct wet milling under cryogenic conditions; 6) adding 1-15% of specialty oils and fats to milling process once particle size is less than or equal to 40 microns (neutral oils or fats, such as refined, bleached, and deodorized oils/fats); 7) further cryogenic milling (e.g., to less than 0.1 to 2 microns); adding any additional ingredients, such as lecithin, salts, aromas, emulsifiers, antioxidants, stabilizers, etc., depending on specific application.

Exemplary Soft Inclusion

Various formulations of processed biomaterial may be suitable for use in frozen and refrigerated products, including desserts. It may be advantageous to provide chips or chunks of biomaterials, such as coffee, for inclusion in frozen or refrigerated food applications by creating a solid chip, chunk, or morsel of edible coffee (or other biomaterial) that is soft at 18-22 degrees Celsius (controlled ambient temperature), but would need to be solid at ice cream storage conditions (−22-−40 degrees Celsius). Also, the chips or chunks need to be soft enough that a consumer can consume them (cold, e.g., in ice cream), with a low risk that the consumer would find the chips/chunks difficult to chew.

The present systems and methods, in some embodiments, overcome the above technical challenges by creating a eutectic depression. In one embodiment, the system combines recognized incompatible fats to compound into a two, three, or multiple fat/oil phase system, that is tailored for desirable melting (or fusion). In at least one embodiment, the characteristics of the product become relatively soft while the ice-cream is consumed (at the mouth temperature), and its corresponding cooling effect while this consumption is progressed. In some embodiments, the system combines types of fat/oil system(s) in such a faction to create purposeful eutectic depression by distorting both the solid crystallization and crystal melting curves such that the melting characteristics of the resulting product are solid at the ambient temperature and soft at low temperature.

In at least one embodiment, the soft inclusion formula includes: 1) cocoa butter (or a substitute or equivalent thereof) as a main fat ingredient in a at least binary phase system; and 2) at least one cocoa-incompatible fat as a percentage of the cocoa butter (e.g., butter oil), or a CBS fat system in a proportion of the formula total fat phase system (e.g., in a tertiary system). As will be understood, the proportions of fats may be defined by: conducting differential scanning calorimetry (DSC) analyses; analyzing heat flow graphics (e.g., corresponding to the melting curves and crystallization curves of the fat systems into consideration); analyzing the latent heat of crystal melting and the latent heat of crystallization, which indicates the depression points (of the melting and crystallization of the system).

In various embodiments, the system may include adding a viscous liquid (e.g., the processes biomaterial designed and produced as discussed herein) to an ice-cream mass (generally added at the fruit dosing unit and located at the processing phase immediately before the overrun machine). In some embodiments, the viscous liquid, in contact with the ice-cream mass will immediately solidify. As will be understood, the rotation shaft of the fruit dosing unit will define the size of the particles (where lower rotation implies bigger flakes).

The above approach is generally disfavored in the chocolate industry, at least partially due to inclusion of lauric fatty or other incompatible fats (e.g. milk fat in white or milk chocolates; or cocoa butter substitutes (CBS), in dark chocolates). Moreover, the chocolate industry avoids combining cocoa butter with any type of CBS and/or fats or oils capable of generating a eutectic depression during fusion or crystallization curves within what is considered the adequate temperature zone for the processing technology of solid chocolates.

Exemplary Coating

According to various aspects, the systems and methods may include adding a coating to the biomaterials discussed herein, which may extend shelf life of various products. The coating process is carried out using selected processed materials that presents physical, chemical & sensorial characteristics of edible films. This way, while they present a physical barrier to atmospheric oxygen, they extent the shelf-life of the roasted coffee (before it is milled), allowing for prolonged storage under normal packaging conditions.

It some embodiments, the systems and methods include: 1) roasting cleaned green coffee in the absence of oxygen; 2) coating each roasted coffee bean inside an apparatus (typically an especial fluid bed drier and cooler) operating under absence of oxygen; 3) sealing the roasted, coated coffee beans in the absence of oxygen until further processing; 4) milling the roasted, coated coffee beans. In various embodiments, the coating is a suitable combination of proteins, oils, fats, extracts, carbohydrates, cellulose (and its derivatives), and starch (and its derivatives) and is (one or more of): a) 100% food grade; b) biodegradable; c) impermeable to coffee volatiles release; d) preventative of microbial penetration or growth; e) able to maintain film integrity under reasonable cold or hot storage conditions; f) preventative of water loss or absorption; g) hydro-soluble and/or liposoluble; h) calories free or low calorie; i) preventative of oxygen penetration; j) of a high elongated film tensile strength; k) mechanically resistive to friction wear; and l) absent flavor (i.e., neutral) or is of a suitable flavor.

According to particular embodiments, the system may include one or more fluid bed microencapsulation or coating systems and processes, which may improve dispersibility and increase protection against oxygen while adding-back of natural fats and/or oils and other biomaterials, to potentially improve natural flavoring. In various embodiments, a powder (e.g., as created from processes discussed herein) may be microencapsulated or agglomerated and coated.

In one embodiment, powder is sprayed with food ingredients and/or additives in a closed- or semi-closed loop fluid bed drier (or cooler), under refrigerated inert gas conditions. In various embodiments, the powder is sprayed in batch or continuous fluid bed-type equipment via a spray (drier, cooler or freezer), or freeze drier.

In some embodiments, microencapsulating powder by spraying food ingredients and/or additives in a closed or semi-closed loop fluid-bed drier (or cooler) within a refrigerated inert gas environment results in coated powder particles. In one or more embodiments, coffee oil and specific food or additive microencapsulating solutions and/or dispersions may be simultaneously pulverized through spray nozzles configured to coat the individual powder particles.

According to particular embodiments, powder (ultrafine or otherwise) is agglomerated under refrigerated inert gas conditions, in a closed-loop or semi-closed loop fluid bed (dryer or cooler)-type "agglomerator" (batch or continuous). In various embodiments, the resulting powder (either from the micro-encapsulated step, or from the agglomerated particles) may be kept inside a chamber in dried conditions. In at least one embodiment, storage under dried conditions may prevent the micro-encapsulated ultra-fine milled coffee particles or agglomerated ultrafine powder from adhering to each other, or to the inner wall of the fluid bed unit.

In a further embodiment, an exemplary microencapsulation or coating process may include wetting (with cold water), agglomeration, drying, and cooling. In some embodiments, the system continuously micro-sprays suitable food grade ingredient or additives solution through nozzles that are configured to apply film coating to the agglomerated particles with a total spread content from about 0.5% to 15% weight/weight of a powder (e.g., depending on a desired level of protection and properties of the agglomerates).

Conclusion

Additional aspects, features, and methodologies of the claimed systems, methods, formulations, and products will be readily discernible from the description herein, by those having ordinary skill in the art. Many embodiments and adaptations of the disclosure and claimed systems, methods, formulations, and products other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems, methods, formulations, and products. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems, methods, formulations, and products. In addition, some steps may be carried out simultaneously, contemporaneously, or in synchronization with other steps.

The embodiments were chosen and described in order to explain the principles of the claimed systems, methods, formulations, and products and their practical application so as to enable others skilled in the art to utilize the systems, methods, formulations, and products and various embodiments and with various modifications as are suited to the particular use contemplated. Alternative embodiments will become apparent to those skilled in the art to which the claimed systems, methods, formulations, and products pertain without departing from their spirit and scope. Accordingly, the scope of the claimed systems, methods, formulations, and products are defined by the appended claims rather than the foregoing description and the exemplary embodiments described therein.

Clause 1. A system for producing coffee liquor, comprising: a dry cleaning and separating system configured to receive a quantity of coffee beans, the dry cleaning and separating system comprising: a two-sieve separator configured to remove coarse impurities from the quantity of coffee beans; an aspirator channel configured to be connected to the two-sieve separator and to remove dust, sand, light beans, and bean chaffs from the quantity of coffee beans; a separator configured to be connected to the aspirator channel and to remove heavy impurities, stones, and pebbles from the quantity of coffee beans; a metal separator configured to be connected to the separator and to remove metal contaminants from the quantity of coffee beans; and a cluster mechanism configured to be connected to the metal separator and to recover a portion of the quantity of coffee beans, and output a second quantity of coffee; a wet cleaning and separating system configured to be connected to the dry cleaning and separating system, the wet cleaning and separating system comprising: a continuous bean washer configured to remove residues from the second quantity of coffee beans; a wire meshing screen configured to be connected to the continuous bean washer and to remove excess water from the second quantity of coffee beans; a clean bean dryer configured to be connected to the wire meshing screen and to dry the second quantity of coffee beans; a bean size sorter configured to be connected to the clean bean dryer and to separate out one or more portions of the second quantity of coffee beans based on coffee bean size; a bean density sorter configured to be connected to the bean size sorter and to separate out one or more secondary portions of the second quantity of coffee beans and the one or more portions based on coffee bean density; an optical color sorter configured to be connected to the bean density sorter and to separate out one or more portions of the second quantity of coffee beans and the one or more secondary portions based on coffee bean color to produce a sorted quantity of beans and one or more tertiary portions; a peeler-polisher configured to be connected to the optical color sorter and to polish and peel the sorted quantity of beans to create a quantity of peeled beans and the one or more tertiary portions to create one or more quaternary portions; and a clean green coffee blender configured to be connected to the peeler-polisher and to blend the quantity of peeled beans and the one or more quaternary portions into a quantity of clean beans; a drying mechanism configured to be connected to the wet cleaning and separating system and to dry the quantity of clean beans and produce a quantity of dry beans; a three-size classification system configured to be connected to the drying mechanism and to separate the quantity of dry beans into one or more sized portions based on bean size; a roasting system configured to be connected to the three-size classification system and to roast each of the one or more sized portions under inert gas conditions and in the absence of oxygen, wherein the roasting system comprises: a bean chamber configured to receive each of the one or more sized portions, wherein the bean chamber is contained within a roasting chamber; the roasting chamber, wherein: the roasting chamber is surrounded by heating media configured to heat the roasting chamber to a predetermined roasting temperature for a predetermined roasting time period, thereby roasting of each of the one or more size portions to produce roasted coffee; and the roasting chamber is configured to be pressurized with inert gas to a predetermined roasting pressure for the predetermined time period; a torrefacto system configured to be connected to the roasting system, the torrefacto system comprising: a two-stage vibratory fluid bed cooler configured to transport the roasted coffee under inert gas conditions and in the absence of oxygen; a spray mechanism configured to coat the roasted coffee with a solution during transportation by the fluid bed cooler, wherein the solution encapsulates and substantially prevents oxidation of the roasted coffee; a pre-cooling system configured to be connected to the torrefacto system and to cool the roasted coffee in the absence of oxygen through direct contact with a refrigerated inert gas to a first cooled temperature for a predetermined cooling time period; a post-cooling system configured to be connected to the pre-cooling system and to further cool the roasted coffee in the absence of oxygen and under inert gas conditions to a second cooled temperature, wherein the roasted coffee is kept at the second cooled temperature and ambient pressure for a predetermined degassing time period while the roasted coffee undergoes degassing; a dry mill configured to be connected to the post-cooling system and to mill the roasted coffee beans to a predetermined size under cryogenic and inert conditions and in the absence of oxygen to produce dry milled coffee; a supercritical fluid extraction (SCFE) system configured to be connected to the dry mill and to extract fats and coffee oil from the dry milled coffee to produce a coffee product, wherein the SCFE system comprises: two or more extraction columns, each extraction column configured to introduce supercritical liquid carbon dioxide to a permeation column;

and each permeation column configured to introduce the supercritical liquid carbon dioxide to the dry milled coffee at a predetermined SCFE pressure while the dry milled coffee is kept at a predetermined SCFE temperature, wherein introducing the supercritical liquid carbon dioxide causes separation and extraction of the fats and coffee oil from the dry milled coffee and yields the coffee product; a wet mill configured to be connected to the SCFE system and to mill the coffee product to a second predetermined size under inert gas conditions and in the absence of oxygen to produce coffee powder, wherein the wet mill operates below a predetermined wet mill temperature and the coffee product is kept at a second predetermined wet mill temperature; a first mixer configured to be connected to the wet mill and to mix the coffee powder with one or more oils and one or more fats under inert gas conditions and in the absence of oxygen to produce a coffee fraction; a second mixer configured to be connected to the first mixer and to mix the coffee fraction with a non-coffee fraction to produce a composite coffee mass, wherein the second mixer comprises a spray mechanism for adding one or more ingredients to the coffee oil to the composite coffee mass; and a filtration system configured to be connected to the second mixer, comprising: a positive displacement pump configured to pump the coffee mass through one or more filter screens; the one or more filter screens configured to filter selected media from the coffee mass; one or more cleaning mechanisms attached to each of the one or more filter screens, wherein each cleaning mechanism comprises a disc configured to travel up and down the filter screen, parallel to the flow of the coffee product to scrape the selected media off the filter screen; and one or more collection chambers configured to be attached to each of the one or more filter screens, wherein each collection chamber is configured to receive the selected media scraped by the one or more cleaning mechanisms and automatically purge the selected media within a predetermined purge period.

Clause 2. The system of clause 1 or any other clause herein, wherein the cleaning and separated system reduces defects in the coffee beans by a factor of about 10×.

Clause 3. The system of clause 1 or any other clause herein, wherein the three-size classification system comprises: a small screen for capturing a small bean quantity and comprising small apertures, wherein each small aperture is sized to about 5.5 mm; a medium screen for capturing a medium bean quantity and comprising medium apertures, wherein each medium aperture is sized to about 6.5 mm; and a large screen for capturing a large bean quantity and comprising large apertures sized to about 8.0 mm.

Clause 4. The system of clause 1 or any other clause herein, wherein the bean chamber comprises one or more rotary cylinders that rotate within the roasting chamber.

Clause 5. The system of clause 1 or any other clause herein, wherein the bean chamber is a fluid bed chamber.

Clause 6. The system of clause 1 or any other clause herein, wherein the predetermined roasting temperature, predetermined roasting time period and predetermined roasting pressure are based on a low, medium, or high roasting profile.

Clause 7. The system of clause 1 or any other clause herein, wherein: the predetermined roasting temperature is between about 100-230 degrees Celsius; the predetermined roasting time period is between about 2-60 minutes; and the predetermined roasting pressure is between about 1-10 bar.

Clause 8. The system of clause 1 or any other clause herein, wherein the roasted coffee chaff separation further comprises a mechanism for providing continuous aspiration through a separation cyclone to return clean inert gas to the roasting chamber.

Clause 9. The system of clause 1 or any other clause herein, wherein the solution comprises about 10-60% solids by weight of the solution.

Clause 10. The system of clause 9 or any other clause herein, wherein the solution comprises sugar.

Clause 11. The system of clause 1 or any other clause herein, wherein the first cooled temperature is between about 50-100 degrees Celsius.

Clause 12. The system clause of 11 or any other clause herein, wherein the first cooled temperature is between about 65-75 degrees Celsius.

Clause 13. The system of clause 12 or any other clause herein, wherein the predetermined cooling time period is about 1 minute.

Clause 14. The system of clause 13 or any other clause herein, wherein: the second cooled temperature is ambient temperature; and the predetermined degassing time period is about one day.

Clause 15. The system of clause 1 or any other clause herein, wherein the post cooling system and the degassing system comprise a mechanical vibratory screen that transports the roasted coffee beans while the refrigerated inert gas contacts and cools the roasted coffee beans.

Clause 16. The system of clause 1 or any other clause herein, wherein the predetermined size is between about 75-500 microns.

Clause 17. The system of clause 16 or any other clause herein, wherein the predetermined size is between about 100-300 microns and the predetermined size is selected to prevent filter plugging.

Clause 18. The system of clause 16 or any other clause herein, wherein the dry milling occurs at a temperature between about −190 to (+) 10 degrees Celsius.

Clause 19. The system of clause 1 or any other clause herein, wherein: the predetermined SCFE temperature is between about 30-90 degrees Celsius; and the predetermined SCFE pressure is about 150 to 450 bars.

Clause 20. The system of clause 19 or any other clause herein, wherein the supercritical liquid carbon dioxide is introduced to the dry milled coffee until a portion of oil in the dry milled coffee reaches a predetermined oil threshold.

Clause 21. The system of clause 20 or any other clause herein, wherein the predetermined oil threshold is about 7% or less oil remaining in the dry milled coffee.

Clause 22. The system of clause 21 or any other clause herein, wherein the oil and fat are stored individually under cryogenic conditions.

Clause 23. The system of clause 22 or any other clause herein, wherein the oil and fat are collected and separated through two or more fluid collectors.

Clause 24. The system of clause 23 or any other clause herein, wherein the fats are stored in a pumpable condition under inert gas conditions at 40-45 degrees Celsius.

Clause 25. The system of clause 1 or any other clause herein, wherein: the second predetermined size is between about 0.1-10.0 microns; the predetermined wet mill temperature is between about −190 to (+) 10 degrees Celsius; the second predetermined wet mill temperature is between about −80 to (+) 10 degrees Celsius; and the coffee powder is kept under inert gas conditions to prevent aroma deterioration.

Clause 26. The system of clause 25 or any other clause herein, wherein the second predetermined size is less than about 2 microns.

Clause 27. The system of clause 1 or any other clause herein, wherein the mixer is a ribbon mixer.

Clause 28. The system of clause 1 or any other clause herein, wherein the mixer is a sigma mixer.

Clause 29. The system of clause 27 or any other clause herein, wherein: the mixer performs mixing at a speed between about 20-150 rpm; the one or more oils comprise one or more oils selected from the group comprising MCT coconut fraction or other drupe-based oils, fruit-based oils, seed-based oils, cereal-based oils, butter oil, and ghee; the one or more fats comprise one or more fats selected from the group comprising seed-based fat extracts, cereal-based fat extracts, and ghee; and the one or more oils and the one or more fats comprise between about 0.5-15.0% by weight of the coffee powder.

Clause 30. The system of clause 27 or any other clause herein, wherein the mixer comprises a spray system configured to: coat the coffee powder with up to 200% by weight of the coffee powder of the one or more oils and the one or more fats; perform coating in cycles running between about 1-100 minutes, wherein the spray system sprays the one or more oils and the one or more fats in droplets measuring less than about 100 microns.

Clause 31. The system of clause 27 or any other clause herein, wherein the mixer is further configured to heat the coffee powder to about 90 degrees Celsius and the cool the coffee powder to about 10 degrees Celsius.

Clause 32. The system of clause 1 or any other clause herein, wherein: the one or more ingredients are selected from the group comprising the coffee oil, the fats, aromas, and one or more additives; and the spray mechanism is configured to spray the one or more ingredients in up to 200% the mass of the composite coffee mass, in droplets measuring less than about 100 microns, in one or more processing cycles each measuring 1-100 minutes; the second mixer is further configured to: heat the composite coffee mass up to about 90 degrees Celsius and cool the composite coffee mass down to about 10 degrees Celsius during a processing run measuring between about 5-60 minutes; and mix the coffee fraction and the non-coffee fraction at about 10-100 rpm with a double helicoid rotating shaft comprising ancillary paddles and stator devices to create turbulence during the mixing.

Clause 33. The system of clause 32 or any other clause herein, wherein the one or more additives comprise one or more additives selected from the group comprising salts, lecithin, polyglycerol polyricinoleate, emulsifiers, antioxidants, stabilizers, and other food-grade additives.

Clause 34. The system of clause 33 or any other clause herein, wherein the second mixer is a ribbon mixer.

Clause 35. The system of clause 34 or any other clause herein, wherein the second mixer is a sigma mixer.

Clause 36. The system of clause 1 or any other clause herein, wherein the predetermined purge period is about 0.7 seconds.

Clause 37. A system for dry cleaning and separating coffee beans, comprising: a two-sieve separator configured to remove coarse impurities from the quantity of coffee beans; an aspirator channel connected to the two-sieve separator and configured to remove dust, sand, light beans, and bean chaffs from the quantity of coffee beans; a separator connected to the aspirator channel and configured to remove heavy impurities, stones, and pebbles from the quantity of coffee beans; a metal separator connected to the separator and configured to remove metal contaminants from the quantity of coffee beans; and a cluster mechanism connected to the metal separator and configured to recover a portion of the quantity of coffee beans, wherein the cluster mechanism outputs a second quantity of coffee.

Clause 38. A process for dry cleaning and separating coffee beans, comprising: removing coarse impurities from a quantity of coffee beans by processing the quantity of coffee beans through a two-sieve separator; removing dust, sand, light beans, and bean chaffs from the quantity of coffee beans by processing the quantity of coffee beans through an aspirator channel; removing heavy impurities, stones, and pebbles from the quantity of coffee beans by processing the quantity of coffee beans through one or more separators; removing metal contaminants from the quantity of coffee beans by processing the quantity of coffee beans through one or more metal separators; and recovering a portion of coffee beans removed from the quantity of coffee beans.

Clause 39. A system for wet cleaning and separating coffee beans, comprising: a continuous bean washer configured to remove residues from a quantity of coffee beans; a wire meshing screen connected to the continuous bean washer and configured to remove excess water from the quantity of coffee beans; a clean bean dryer connected to the wire meshing screen and configured to dry the quantity of coffee beans; a bean size sorter connected to the clean bean dryer and configured to separate out one or more portions of the quantity of coffee beans based on coffee bean size; a bean density sorter connected to the bean size sorter and configured to separate out one or more secondary portions of the quantity of coffee beans and the one or more portions based on coffee bean density; an optical color sorter connected to the bean density sorter and configured to separate out one or more portions of the quantity of coffee beans and the one or more secondary portions based on coffee bean color to produce a sorted quantity of beans and one or more tertiary portions; a peeler-polisher connected to the optical color sorter and configured to polish and peel the sorted quantity of beans to create a quantity of peeled beans and the one or more tertiary portions to create one or more quaternary portions; and a clean green coffee blender connected to the peeler-polisher and configured to blend the quantity of peeled beans and the one or more quaternary portions into a quantity of clean beans.

Clause 40. A process for dry cleaning and separating coffee beans, comprising: removing residues from a quantity of coffee beans by processing the quantity of coffee beans through a continuous bean washer; removing excess water from the quantity of coffee beans by processing the quantity of beans through a wire meshing screen; drying the quantity of beans by processing the quantity of beans through a clean bean dryer; separating one or more portions from the quantity of coffee beans based on coffee bean size by processing the quantity of coffee beans through a bean size sorter; separating one or more secondary portions from the quantity of coffee beans based on coffee bean density by processing the quantity of coffee beans through a bean density sorter; separating one or more tertiary portions from the quantity of coffee beans based on coffee bean color by processing the quantity of coffee beans through an optical color sorter, wherein separating the one or more tertiary portions yields a quantity of sorted coffee beans; peeling and polishing the sorted quantity of coffee beans and the one or more tertiary portions by processing sorted quantity of coffee beans and the one or more tertiary portions through a peeler-polisher, wherein peeling and polishing the sorted quantity of beans yields a quantity of peeled beans, and peeling and polishing the one or more tertiary portions yields one or more quaternary portions; and blending the quantity of peeled beans and the one or more quaternary portions in a clean green coffee blender, wherein blending yields a quantity of clean beans.

Clause 41. A system for producing a coffee fraction, comprising: a roasting system connected to configured to roast a quantity of beans under inert gas conditions and in the absence of oxygen, wherein the roasting system comprises: a bean chamber that receives each of the quantity of beans, wherein the bean chamber is contained within a roasting chamber; and the roasting chamber, wherein: the roasting chamber is surrounded by heating media configured to heat the roasting chamber to a predetermined roasting temperature for a predetermined roasting time period, thereby roasting the quantity of beans to produce roasted coffee; and the roasting chamber is pressurized with inert gas to a predetermined roasting pressure for the predetermined time period; a torrefacto system connected to the roasting system, the torrefacto system comprising: a two-stage vibratory fluid bed cooler that transports the roasted coffee under inert gas conditions and in the absence of oxygen; a spray mechanism that coats the roasted coffee with a solution during transportation by the fluid bed cooler, wherein the solution encapsulates and substantially prevents oxidation of the roasted coffee; a pre-cooling system connected to the torrefacto system and configured to cool the roasted coffee in the absence of oxygen through direct contact with a refrigerated inert gas to a first cooled temperature for a predetermined cooling time period; a post-cooling system connected to the pre-cooling system and configured to further cool the roasted coffee in the absence of oxygen and under inert gas conditions to a second cooled temperature, wherein the roasted coffee is kept at the second cooled temperature and ambient pressure for a predetermined degassing time period while the roasted coffee undergoes degassing; a dry mill connected to the post-cooling system and configured to mill the roasted coffee beans to a predetermined size under cryogenic and inert conditions and in the absence of oxygen to produce dry milled coffee; a supercritical fluid extraction (SCFE) system connected to the dry mill and configured to extract fats and coffee oil from the dry milled coffee to produce a coffee product, wherein the SCFE system comprises: two or more extraction columns, each extraction column configured to introduce supercritical liquid carbon dioxide to a permeation column; and each permeation column configured to introduce the supercritical liquid carbon dioxide to the dry milled coffee at a predetermined SCFE pressure while the dry milled coffee is kept at a predetermined SCFE temperature, wherein introducing the supercritical liquid carbon dioxide causes separation and extraction of the fats and coffee oil from the dry milled coffee and yields the coffee product; a wet mill connected to the SCFE system and configured to mill the coffee product to a second predetermined size under inert gas conditions and in the absence of oxygen to produce coffee powder, wherein the wet mill operates below a predetermined wet mill temperature and the coffee product is kept at a second predetermined wet mill temperature; and a first mixer connected to the wet mill and configured to mix the coffee powder with one or more oils and one or more fats under inert gas conditions and in the absence of oxygen to produce a coffee fraction.

Clause 42. A process for producing a coffee fraction, comprising: delivering a quantity of coffee beans into a bean chamber contained within a roasting chamber: heating the roasting chamber via heating media to a predetermined roasting temperature for a predetermined roasting time period to roast the quantity of coffee beans and produce roasted coffee; transporting the roasted coffee via a two-stage vibratory fluid bed cooler under inert gas conditions and in the absence of oxygen; spraying the roasted coffee with a solution via a spray mechanism, wherein the solution encapsulates and substantially prevents oxidation of the roasted coffee; cooling the roasted coffee in the absence of oxygen to a first cooled temperature for a predetermined cooling period; cooling the roasted coffee in the absence of oxygen to a second cooled temperature; degassing the roasted coffee by maintaining the roasted coffee at the second cooled temperature and at ambient pressure for a predetermined degassing time period; dry milling the roasted coffee to a predetermined size under cryogenic and inert gas conditions and in the absence of oxygen to produce dry milled coffee; extracting fats and coffee oil from the dry milled coffee via a supercritical fluid extraction (SCFE) system to produce coffee product, the SCFE system comprising: two or more extraction columns, each extraction column configured to introduce supercritical liquid carbon dioxide to a permeation column; and each permeation column configured to introduce the supercritical liquid carbon dioxide to the dry milled coffee at a predetermined SCFE pressure while the dry milled coffee is kept at a predetermined SCFE temperature, wherein introducing the supercritical liquid carbon dioxide causes separation and extraction of the fats and coffee oil from the dry milled coffee and yields the coffee product; wet milling the coffee product to a second predetermined size under inert gas conditions and in the absence of oxygen to produce coffee powder, wherein the wet milling is performed below a predetermined wet mill temperature while the coffee product is kept at a second predetermined wet mill temperature; mixing, in a mixer, the coffee powder with one or more oils and one or more fats under inert gas conditions and in the absence of oxygen to produce a coffee fraction.

Clause 43. A system for producing a composite coffee mass, comprising: a mixer configured to mix a coffee fraction and a non-coffee fraction to produce a composite coffee mass, wherein the mixer comprises a spray mechanism for adding one or more ingredients to the coffee oil to the composite coffee mass; and a filtration system connected to the mixer, comprising: a positive displacement pump configured to pump the coffee mass through one or more filter screens; the one or more filter screens configured to filter selected media from the coffee mass; one or more cleaning mechanisms attached to each of the one or more filter screens, wherein each cleaning mechanism comprises a disc configured to travel up and down the filter screen, parallel to the flow of the coffee product to scrape the selected media off the filter screen; and one or more collection chambers attached to each of the one or more filter screens, wherein each collection chamber is configured to receive the selected media scraped by the one or more cleaning mechanisms and automatically purge the selected media within a predetermined purge period.

Clause 44. A process for producing a composite coffee mass, comprising:

mixing, in a mixer, a coffee fraction and a non-coffee fraction to produce a composite coffee mass; spraying, via a spray mechanism, the composite coffee mass with one or more ingredients; and pumping, via a positive displacement pump, the composite coffee mass through one or more filter screens; filtering, via the one or more filter screens, selected media out of the composite coffee mass; scraping the selected media from the one or more filter screens via one or more cleaning mechanisms attached to each filter screen, wherein each cleaning mechanisms comprises a disc configured to travel up and down the filter screen and scrape the selected media into one or more collection chambers; and purging the selected media from the one or more collection periods within a predetermined purge period.

Clause 45. An edible coffee liquor mass comprising: coffee liquor manufactured under inert conditions and in the absence of oxygen, wherein the coffee liquor comprises: coffee particles milled to a particle size between about 0.1 to 40 microns and a moisture content of less than about 1.25%, wherein the coffee particles are milled under cryogenic and inert gas conditions in the absence of oxygen from coffee beans roasted under inert gas conditions and in the absence of oxygen; a solution encapsulating the coffee particles, wherein: the solution substantially prevents oxidation of the coffee particles; and the solution comprises up to about 5% by weight of the coffee liquor; one or more additives selected from the group comprising fats, oils, and aromas, wherein the one or more additives comprise about 1-15% by weight of the coffee liquor; and wherein the edible coffee liquor mass demonstrates a shelf life of at least one year under ambient temperature and pressure.

Clause 46. A system for producing a non-coffee fraction, comprising: a ribbon blender configured to: receive a plurality of ingredients; mix the plurality of ingredients into a substantially homogenous mixture under inert gas conditions and in the absence of oxygen; a two-stage fluid bed dryer-cooler configured to dry and cool the substantially homogenous mixture under inert gas conditions and in the absence of oxygen, wherein: the fluid bed dryer-cooler dries the substantially homogeneous mixture to a moisture level below a predetermined moisture threshold under inert gas conditions and in the absence of o; and the fluid bed dryer-cooler cools the substantially homogenous mixture to a temperature below a predetermined temperature threshold; an extruder comprising two or more intermeshing screws configured to shear the substantially homogenous mixture under inert gas conditions and in the absence of oxygen, wherein the shearing causes friction, heat, and pressure that induces a Maillard reaction in the section mixture that produces a second mixture; a milling system configured to cool and mill the second mixture under inert gas conditions and in the absence of oxygen, wherein: the milling system cools the second mixture below a second predetermined temperature threshold; and the milling system mills the cooled second mixture at a predetermined speed to a predetermined diameter for a predetermined time period to create a third mixture; and a ribbon mixer configured to mix the third mixture under inert gas conditions and in the absence of oxygen, wherein the mixer comprises: a double helicoid rotating shaft for mixing the third mixture at a second predetermined speed and within a third predetermined temperature threshold, wherein the double helicoid rotating shaft comprises ancillary paddles and stator devices that create turbulence during the mixing; and a spraying system configured to spray and encapsulate the third mixture with one or more fats, oils, and other ingredients to preserve flavor and improve shelf life of the non-coffee fraction; and a fractionated distillation column that injects super-heated steam into the third mixture, wherein: the super-heated steam comprises 1-15% by weight of the third mixture; the super-heated steam removes volatiles from the third mixture; and the super-heated steam passes through a succession of trays differentiated through cryogenic liquids and gasses at a plurality of temperatures and pressures, wherein the succession of trays cause condensation of the volatiles and the condensed volatiles are collected from the succession of trays under cryogenic conditions.

Clause 47. The system of clause 46 or any other clause herein, wherein the predetermined moisture threshold is about 1.5%.

Clause 48. The system of clause 46 or any other clause herein, wherein the extruder further comprises: a screw barrel attached to and surrounding the two or more intermeshing screws, the screw barrel comprising a natural vacuum degassing port integrate with a breaker plate; an extrusion head connected to the breaker plate; a pipe die connected to the extrusion head; a screen pack connected to the pipe die; and a rotary cutting system connected to the screen pack, wherein the second mixture exits the extruder via the rotary cutting system.

Clause 49. The system of 48 or any other clause herein, wherein the second mixture exits the extruder with a stream of inert gas that mixes with the exhausting gas and is coupled to a fractionation column for off-flavor venting and volatile recovery.

Clause 50. The system of 48 or any other clause herein, wherein the screw barrel further comprises one or more cooling and heating mechanisms along a length of the each two or more intermeshing screws, each of the one or more cooling and heating mechanisms configured to heat the second mixture to between about 1 to 90 degrees Celsius.

Clause 51. The system of clause 46 or any other clause herein, wherein the extruder is further configured to apply pressure to the substantially homogeneous product between about 1 to 5 Bar.

Clause 52. The system of clause 46 or any other clause herein, wherein the barrel includes insertion areas for adding ingredients to the second mixture.

Clause 53. The system of clause 46 or any other clause herein, wherein: the second predetermined temperature threshold is about −80 degrees Celsius; the predetermined speed is about 250 rpm; the predetermined diameter is less than about 20 microns; and the predetermined time period is about 20 minutes.

Clause 54. The system of 53 or any other clause herein, wherein the second predetermined speed is between about 10 to 100 rpm and the third predetermined temperature threshold is between about 1 to 70 degrees Celsius.

Clause 55. The system of clause 46 or any other clause herein, wherein the moisture level increases a rate of the Maillard reaction.

Clause 56. A coffee enhancer, comprising: a first portion comprising coffee liquor produced under the absence of oxygen; and a second portion mixed with the first portion under the absence of oxygen, the second portion comprising additives.

Clause 57. The coffee enhancer of clause 56 or any other clause herein, wherein the first portion comprises about 5-40% percent by weight of the coffee enhancer.

Clause 58. The coffee enhancer of clause 56 or any other clause herein, wherein the first portion comprises about 40-95% percent by weight of the coffee enhancer.

Clause 59. The coffee enhancer of clause 56 or any other clause herein, wherein the additives comprise butter oil.

Clause 60. The coffee enhancer of 56 or any other clause herein, wherein the butter oil is cocoa butter oil.

Clause 61. The coffee enhancer of 56 or any other clause herein, wherein the butter oil is cocoa butter substitute (CBS) oil.

Clause 62. The coffee enhancer of clause 56 or any other clause herein, wherein the coffee enhancer is a solid.

Clause 63. The coffee enhancer of clause 56 or any other clause herein, wherein the coffee enhancer does not require pasteurization, cool storage, or in-house packaging.

Clause 64 The coffee enhancer of clause 56 or any other clause herein, wherein the first portion and second portion comprise a particle size of about 10-30 microns.

Clause 65. A method for producing coffee enhancer, comprising: receiving a first portion comprising coffee liquor produced in the absence of oxygen; milling the first portion to about 50-120 microns under cryogenic conditions in the absence of oxygen; mixing, in a mixer and in the absence of oxygen, the first portion with a second portion for a predetermined time period to produce a coffee enhancer; milling the coffee enhancer to about 10-30 microns under cryogenic conditions in the absence of oxygen; tempering the milled coffee enhancer in the absence of oxygen; and prior to crystallization occurring, cooling the tempered coffee enhancer in a cooling tunnel in the absence of oxygen.

Clause 66. The method of clause 65 or any other clause herein, wherein the predetermined time period is about 1-30 minutes.

Clause 67. The method of clause 66 or any other clause herein, wherein the mixer is a ribbon mixer operating under inert gas conditions in the absence of oxygen.

Clause 68. The method of clause 66 or any other clause herein, wherein the mixer is a sigma mixer operating under inert gas conditions in the absence of oxygen.

Clause 69. The method of clause 66 or any other clause herein, wherein the first portion comprises about 5-40% by weight of the coffee enhancer.

Clause 70. The method of clause 66 or any other clause herein, wherein the first portion comprises about 40-95% by weight of the coffee enhancer.

Clause 71. The method of clause 66 or any other clause herein, wherein the milling is performed in a horizontal or vertical ball mill.

Clause 72. The method of clause 71 or any other clause herein, further comprising conching the milled coffee enhancer under inert gas conditions in the absence of oxygen.

Clause 73. The method of clause 72 or any other clause herein, further comprising blending the conched coffee enhancer with a quantity of conched, refined ingredients.

Clause 74. The method of clause 73 or any other clause herein, wherein the second portion comprises butter oil.

Clause 75. The method of clause 74 or any other clause herein, wherein the butter oil is cocoa butter oil.

Clause 76. The method of clause 74 or any other clause herein, wherein the butter oil is cocoa butter substitute (CBS) oil.

Clause 77. A method, comprising: performing a wet cleaning on a plurality of biomaterials; performing a dry cleaning on the plurality of biomaterials; roasting the plurality of biomaterials under inert gas conditions and in an absence of oxygen; cooling the plurality of biomaterials under the inert gas conditions and in the absence of oxygen; performing a cryogenic pre-milling on the plurality of biomaterials under the inert gas conditions and in the absence of oxygen; performing a supercritical fluid extraction on the plurality of biomaterials under the inert gas conditions and in the absence of oxygen to extract oil from the plurality of biomaterials; and generating a liquor based on the plurality of biomaterials.

Clause 78. The method of clause 77 or any other clause herein, further comprising, subsequent to performing the supercritical fluid extraction, milling the plurality of biomaterials under the inert gas conditions and in the absence of oxygen.

Clause 79. The method of clause 78 or any other clause herein, further comprising conching the plurality of biomaterials under the inert gas conditions and in the absence of oxygen.

Clause 80. The method of clause 77 or any other clause herein, further comprising: agglomerating the plurality of biomaterials under the inert gas conditions and in the absence of oxygen; and coating the plurality of biomaterials under the inert gas conditions and in the absence of oxygen.

Clause 81. The method of clause 77 or any other clause herein, further comprising packaging the plurality of biomaterials under the inert gas conditions and in the absence of oxygen.

Clause 82. The method of clause 77 or any other clause herein, further comprising: drying the plurality of biomaterials under the inert gas conditions and in the absence of oxygen; and discharging condensed water from inert gas accumulated during the drying.

Clause 83. A method, comprising: roasting a plurality of biomaterials under inert gas conditions and in an absence of oxygen; crushing the plurality of biomaterials to extract oil under the inert gas conditions and in the absence of oxygen; mixing the plurality of biomaterials in a mixer under the inert gas conditions and in the absence of oxygen; drying the plurality of biomaterials in a dryer under the inert gas conditions and in the absence of oxygen; cooling the plurality of biomaterials under the inert gas conditions and in the absence of oxygen; extruding the plurality of biomaterials under the inert gas conditions and in the absence of oxygen; and mixing the plurality of biomaterials with a fat under the inert gas conditions and in the absence of oxygen.

Clause 84. The method of clause 83 or any other clause herein, further comprising receiving the plurality of biomaterials in a close loop mixer.

Clause 85. The method of clause 84 or any other clause herein, further comprising generating an inert gas atmosphere in the close loop mixer.

Clause 86. The method of clause 83 or any other clause herein, further comprising transferring the plurality of biomaterials from the mixer into the dryer under the inert gas conditions and in the absence of oxygen;

Clause 87. The method of clause 83 or any other clause herein, wherein the cooled dried mixture comprises a moisture of less than 1.5%.

Clause 88. The method of clause 83 or any other clause herein, wherein the fat comprises a deodorized cocoa butter.

Clause 89. The method of clause 83 or any other clause herein, further comprising: performing a wet cleaning on the plurality of biomaterials; and performing a dry cleaning on the plurality of biomaterials.

Clause 90. The method of clause 89 or any other clause herein, further comprising performing a fluid bed agglomeration of the plurality of biomaterials under the inert gas conditions and in the absence of oxygen; and generating at least one of an instant cocoa or a chocolate powder based at least in part on the plurality of biomaterials.

Clause 91. The method of clause 83 or any other clause herein, wherein the plurality of biomaterials comprises a plurality of tea leaves, the method further comprising generating at least one of a tea liquor based at least in part on the plurality of biomaterials.

Clause 92. The method of clause 83 or any other clause herein, wherein the plurality of biomaterials comprises a plurality of coffee beans, the method further comprising generating at least one of a coffee liquor based at least in part on the plurality of biomaterials.

Clause 93. A system comprising: an inert gas system; a blender coupled to the inert gas system configured to mix the plurality of biomaterials under inert gas conditions created by the inert gas system; a roaster coupled to the inert gas system, the roaster configured to roast a plurality of biomaterials under the inert gas conditions created by the inert gas system; and a fluid bed dryer coupled to the inert gas system, the fluid bed dryer configured to dry the plurality of biomaterials under the inert gas conditions created by the inert gas system.

Clause 94. The system of clause 93 or any other clause herein, wherein the inert gas system comprises: an pipeline network configured to transport inert gas throughout the inert gas system; a line filter configured to remove particles from the inert gas; a separation cyclone configured to recover any solid particulates from the plurality of biomaterials; a heat exchanger configured to reduce the temperature of the inert gas; and a condenser configured to condense volatiles from the inert gas.

Clause 95. The system of clause 93 or any other clause herein, further comprising an extruder coupled to the inert gas system, wherein the extruder is configured to extrude the plurality of biomaterials under the inert gas conditions created by the inert gas system.

Clause 96. The system of clause 93 or any other clause herein, further comprising a mixer coupled to the inert gas system, the mixer configured to mix the plurality of biomaterials under the inert gas conditions created by the inert gas system.

What is claimed is:

1. A process for producing a coffee fraction comprising:
cleaning and drying green coffee beans;
roasting the cleaned and dried green coffee beans to produce roasted coffee beans via a roasting chamber, wherein the cleaned and dried green coffee beans are roasted in the absence of oxygen at a temperature of about 100-230 degrees Celsius at a pressure of about 1-10 bar for about 2-60 minutes;
cooling and transporting the roasted coffee beans via a two-stage vibratory fluid bed cooler in the absence of oxygen, wherein cooling the roasted coffee beans comprises spraying the roasted coffee beans with a solution to quench thermolysis reactions;
cryogenically dry milling the roasted coffee beans in the absence of oxygen to a particle size of approximately 75-100 microns at a temperature of about −190 to 10 degrees Celsius;
extracting fluids from the milled, roasted coffee beans in the absence of oxygen via a supercritical fluid extraction (SCFE) system to produce a coffee product, wherein the SCFE system comprises:
two or more extraction columns, each extraction column configured to introduce supercritical liquid carbon dioxide to a permeation column; and
each permeation column configured to introduce the supercritical liquid carbon dioxide to the milled, roasted coffee beans thereby causing separation and extraction of the fluids from the milled roasted coffee beans;
wet milling the coffee product in the absence of oxygen at a temperature below about 10 degrees Celsius to produce a coffee powder comprising particles of less than about 40.0 microns; and
mixing the coffee powder with one or more oils and/or fats in the absence of oxygen at a temperature of about 10-80 degrees Celsius and at a pressure of about 1-5 bar to produce a coffee fraction comprising the coffee powder particles microencapsulated in the one or more oils and/or fats.

2. The process of claim 1, wherein the cleaned and dried green coffee beans are roasted in the presence of an inert gas.

3. The process of claim 2, wherein the roasting chamber is surrounded by a heating media for roasting the cleaned and dried green coffee beans.

4. The process of claim 3, wherein the heating media comprises super-heated steam.

5. The process of claim 3, wherein the heating media comprises an inert gas.

6. The process of claim 3, wherein the process further comprises coating the coffee fraction via a coating sprayer.

7. The process of claim 6, wherein the coating sprayer is operatively connected to a coating vibratory fluid bed.

8. The process of claim 7, wherein the solution comprises water.

9. The process of claim 8, wherein the solution comprises about 1-60% sugar.

10. The process of claim 9, wherein the inert gas is nitrogen.

11. A process for producing a coffee fraction comprising:
cleaning and drying green coffee beans;
roasting the cleaned and dried green coffee beans to produce roasted coffee beans via a roasting chamber, wherein the cleaned and dried green coffee beans are roasted in the presence of an inert gas and in the absence of oxygen at a temperature of about 100-230 degrees Celsius at a pressure of about 1-10 bar for about 2-60 minutes;
cooling and transporting the roasted coffee beans via a two-stage vibratory fluid bed cooler in the absence of oxygen, wherein cooling the roasted coffee beans comprises spraying the roasted coffee beans with solution;
cryogenically dry milling the roasted coffee beans in the absence of oxygen to a particle size of approximately 75-100 microns at a temperature of about −190 to 10 degrees Celsius;
extracting fluids from the milled, roasted coffee beans in the absence of oxygen via a supercritical fluid extraction (SCFE) system to produce a coffee product, wherein the SCFE system comprises:
two or more extraction columns, each extraction column configured to introduce supercritical liquid carbon dioxide to a permeation column; and
each permeation column configured to introduce the supercritical liquid carbon dioxide to the milled, roasted coffee beans thereby causing separation and extraction of the fluids from the milled roasted coffee beans;
wet milling the coffee product in the absence of oxygen at a temperature below about 10 degrees Celsius to produce a coffee powder comprising particles of less than 40.0 microns; and
mixing the coffee powder with one or more oils and/or fats in the absence of oxygen at a temperature of about 10-80 degrees Celsius and at a pressure of about 1-5 bar to produce a coffee fraction comprising the coffee powder microencapsulated in the one or more oils and/or fats.

12. The process of claim 11, wherein the roasting chamber is surrounded by a heating media for roasting the cleaned and dried green coffee beans.

13. The process of claim 12, wherein the heating media comprises super-heated steam.

14. The process of claim 13, wherein the heating media comprises an inert gas.

15. The process of claim 13, wherein the process further comprises coating the coffee fraction via a coating sprayer.

16. The process of claim 15, wherein the coating sprayer is operatively connected to a coating vibratory fluid bed.

17. The process of claim 16, wherein the solution comprises water.

18. The process of claim 17, wherein the solution comprises about 1-60% sugar.

19. The process of claim 18, wherein the process further comprises agglomerating the coffee powder under the inert gas conditions and in the absence of oxygen.

20. The process of claim 19, wherein the process further comprises coating the coffee powder under the inert gas conditions and in the absence of oxygen.

* * * * *